United States Patent
Psota et al.

(10) Patent No.: US 9,639,874 B2
(45) Date of Patent: *May 2, 2017

(54) RANKED ENTITY SEARCHING OF PUBLIC TRANSACTION RECORDS

(71) Applicant: Panjiva, Inc., New York, NY (US)

(72) Inventors: James Ryan Psota, Cambridge, MA (US); Joshua Green, New York, NY (US)

(73) Assignee: Panjiva, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/906,007

(22) Filed: May 30, 2013

(65) Prior Publication Data

US 2013/0268403 A1     Oct. 10, 2013

Related U.S. Application Data

(63) Continuation of application No. 12/271,593, filed on Nov. 14, 2008, now Pat. No. 8,473,354.

(60) Provisional application No. 60/987,989, filed on Nov. 14, 2007.

(51) Int. Cl.
    *G06Q 30/06*     (2012.01)
    *G06Q 10/08*     (2012.01)

(52) U.S. Cl.
    CPC ....... *G06Q 30/0609* (2013.01); *G06Q 10/083* (2013.01); *G06Q 30/06* (2013.01)

(58) Field of Classification Search
    CPC .. G06Q 10/083; G06Q 30/0609; G06Q 30/06; G06Q 40/02; G06Q 30/02
    USPC ............... 705/26.1, 26.35, 30, 347, 330, 34; 715/201, 205, 226
    See application file for complete search history.

(56) References Cited

U.S. PATENT DOCUMENTS

| | | |
|---|---|---|
| 5,570,291 A | 10/1996 | Dudle |
| 5,970,475 A | 10/1999 | Barnes et al. |
| 5,987,429 A | 11/1999 | Maritzen |

(Continued)

FOREIGN PATENT DOCUMENTS

| | | |
|---|---|---|
| CN | 1499403 | 5/2004 |
| EP | 2212839 A4 | 6/2012 |

(Continued)

OTHER PUBLICATIONS

"Chinese Application Serial No. 200880124775.2, Fourth Office Action dated Feb. 8, 2014", English and Chinese Translations, 17 pages.

(Continued)

*Primary Examiner* — Vanel Frenel
(74) *Attorney, Agent, or Firm* — GTC Law Group PC & Affiliates

(57) ABSTRACT

A platform facilitates buyers, sellers, and third parties in obtaining information related to each other's transaction histories, such as a supplier's shipment history, the types of materials typically shipped, a supplier's customers, a supplier's expertise, what materials and how much a buyer purchases, buyer and shipper reliability, similarity between buyers, similarity between suppliers, and the like. The platform aggregates data from a variety of sources, including, without limitation, customs data associated with actual import/export transactions and facilitates the generation of reports as to the quality of buyers and suppliers, the reports relating to a variety of parameters that are associated with buyer and supplier quality.

9 Claims, 32 Drawing Sheets

(56) References Cited

U.S. PATENT DOCUMENTS

| | | |
|---|---|---|
| 7,610,233 B1 | 10/2009 | Leong |
| 7,617,136 B1 | 11/2009 | Lessing et al. |
| 7,912,865 B2 | 3/2011 | Akerman et al. |
| 8,473,354 B2 | 6/2013 | Psota et al. |
| 2001/0056379 A1 | 12/2001 | Fujinaga et al. |
| 2002/0194050 A1 | 12/2002 | Nabe et al. |
| 2003/0046220 A1 | 3/2003 | Kamiya |
| 2003/0187716 A1 | 10/2003 | Lee |
| 2003/0212609 A1 | 11/2003 | Blair et al. |
| 2004/0039598 A1 | 2/2004 | Kim |
| 2004/0122942 A1 | 6/2004 | Green et al. |
| 2004/0236666 A1 | 11/2004 | Clark et al. |
| 2004/0243503 A1 | 12/2004 | Eng et al. |
| 2005/0021527 A1 | 1/2005 | Zhang et al. |
| 2005/0144052 A1 | 6/2005 | Harding et al. |
| 2007/0239577 A1 | 10/2007 | Grody et al. |
| 2007/0260521 A1 | 11/2007 | Van Der Riet |
| 2008/0040329 A1 | 2/2008 | Cussen et al. |
| 2008/0082528 A1 | 4/2008 | Bonzi et al. |
| 2008/0120129 A1 | 5/2008 | Seubert et al. |
| 2008/0162297 A1 | 7/2008 | Hershkovitz et al. |
| 2009/0144070 A1 | 6/2009 | Psota et al. |
| 2009/0326995 A1 | 12/2009 | Sorisi |
| 2011/0137705 A1 | 6/2011 | Srinivasan |
| 2011/0173093 A1 | 7/2011 | Psota et al. |
| 2012/0191619 A1 | 7/2012 | Gross |
| 2012/0203708 A1 | 8/2012 | Psota et al. |
| 2013/0317954 A1 | 11/2013 | Psota et al. |
| 2014/0095353 A1 | 4/2014 | Psota et al. |
| 2014/0156513 A1 | 6/2014 | Psota |

FOREIGN PATENT DOCUMENTS

| | | |
|---|---|---|
| WO | WO-2009/065029 A1 | 5/2009 |
| WO | WO-2011085360 A1 | 7/2011 |

OTHER PUBLICATIONS

"U.S. Appl. No. 13/343,354.", Aug. 9, 2012 , 1 page.
"CPEL1051157P,", English translation and Chinese Translations Aug. 3, 2012 , 13 pages.
Mooney M, R J. et al., "Adaptive duplicate detection using learnable string similarity measure", Internet Citation, Aug. 2003, XP002475117. Retrieved from the Internet: URL:http://citeseer.ist.psu.edu/bilenko03adaptive.html [retrieved on Apr. 4, 2008], Aug. 2003 , 10 Pages.
"U.S. Appl. No. 12/271,593, Notice of Allowance mailed May 11, 2012", 8 pages.
"U.S. Appl. No. 13/004,368, Non-Final Office Action mailed Apr. 27, 2012", 12 pages.
ISA, "International Search Report", for US Patent Application No. PCT/US2008/083623, mailed on Apr. 16, 2009, 12 Pages.
Garcias, S M. et al., "Immunization 1-15 Registries DeDuplication and Record Matching", Internet Citation—Retrieved from the Internet: URL:www.imnunizationregistries.comjwhite papersj—WHP006A deduplication recordmatching.pdf [retrieved on Oct. 27, 2003], 1999 , 12 pages.
"The Four Challenges of Customer-Centric Data Warehousing", Internet Citation—XP002259648, Retrieved from the Internet: URL:http://www.ctiforum.com/technology/CRMjwhitepaperjdwo.pdf [retrieved on Oct. 27, 2003], Nov. 1998 , 16 pages.
Elmagarmid, A K. et al., "Duplicate Record Detection: ASurvey", IEEE Transactions on Knowledge and Data Engineering, IEEE Service Center, Los Alamitos, CA, US, XP011151234, ISSN: 1041-4347 vo 1. 18, No. 1, Jan. 1, 2007 , pp. 1-16.
"EP Search Report", EP08850236, May 21, 2012 , 8 pages.
"U.S. Appl. No. 13/004,386, Notice of Allowance mailed Jan. 8, 2013", , 15 Pages.
"Application Serial No. CN200880124775.2, English and Chinese Translations, 1st Office Action dated Jul. 13, 2011", , 19 pages.
"Application Serial No. CN200880124775.2, English and Chinese Translations, 3rd Office Action dated Apr. 2, 2013", , 7 pages.
"U.S. Appl. No. 12/271,593, Final Office Action mailed May 16, 2011", 11 pages.
"U.S. Appl. No. 12/271,593, Non-Final Office Action mailed Oct. 14, 2010", 7 Pages.
"U.S. Appl. No. 12/271,593, Notice of Allowance mailed May 1, 2013", 20 pages.
"U.S. Appl. No. 13/343,354, Non-Final Office Action mailed Mar. 15, 2013", 14 pages.
"International Application Serial No. PCT/US11/20807, Search Report and Written Opinion mailed Apr. 20, 2011", 10 Pages.
"U.S. Appl. No. 13/343,354, Notice of Allowance mailed Sep. 6, 2013", 19 pages.
"U.S. Appl. No. 13/790,049, Non-Final Office Action mailed Sep. 12, 2014", 18 pages.
EPO, "EP Application Serial No. 08850236.4, European Office Action mailed Nov. 4, 2014", 6 Pages.
"Chinese Application No. 200880124775.2, Fifth Office Action dated Sep. 25, 2014", Chinese and English translations, 7 pages.
"U.S. Appl. No. 13/790,049, Non-Final Office Action mailed Jan. 23, 2015", 13 pages.
"U.S. Appl. No. 14/096,662, Non-Final Office Action mailed Feb. 13, 2015", 20 pages.
"U.S. Appl. No. 14/097,474, Non-Final Office Action mailed Feb. 2, 2015", 23 pages.
Canadian Patent Office, "CA Application No. 2,742,395 Office Action mailed Nov. 10, 2015", 3 pages.
"U.S. Appl. No. 13/790,049, Final Office Action mailed Jul. 10, 2015", 15 pages.
"U.S. Appl. No. 14/096,662, Final Office Action mailed Oct. 1, 2015", 22 pages.
"U.S. Appl. No. 14/097,474, Final Office Action mailed Sep. 15, 2015", 12 pages.
CIPO, "Application Serial No. 2,742,395, 1st Office Action dated Feb. 18, 2015", 4 pages.

FIG. 1

| SHIPPER | CONSIGNEE | NOTIFY_PARTY | ALSO_NOTIFY | WEIGHT | QUANTITY | BL NUMBER | COUNTRY | DATA | COMMODITY | HS CODE |
|---|---|---|---|---|---|---|---|---|---|---|
| 1004A | 1004B | 1004C | 1004D | 1004E | 1004F | 1004G | 1004H | 1004I | 1004J | 1004K |
| | | | | | | | | | | |

CRITICAL FIELDS FROM CUSTOMS RECORDS 1002

FIG. 10

| SHIPPER 1004A | CONSIGNEE 1004B | NOTIFY_PARTY | ALSO_NOTIFY 1004D | WEIGHT | QUANTITY | BL NUMBER | COUNTRY | DATE 1004I | COMMODITY | HS CODE 1004K |
|---|---|---|---|---|---|---|---|---|---|---|
| SHANGHAI BADA TEXTILE | NO FEAR INC. | NO FEAR INC. | | 12584 g | 118 | CITVC2050 3037C | CHINA | 1/2/2005 | MEM PLOY JERSEY WEST | 621143 |

1102

| SHIPPER | CONSIGNEE | NOTIFY_PARTY | ALSO_NOTIFY | WEIGHT | QUANTITY | BL NUMBER | COUNTRY | DATE | COMMODITY | HS CODE |
|---|---|---|---|---|---|---|---|---|---|---|
| SHANGHAI BADA TEXTILE | NO FEAR INC. | NO FEAR INC. | | 12584 g | 118 | CITVC2050 3037C | CHINA | 2/4/2005 | MEM PLOY JERSEY WEST | 621143 |

1104

| SHIPPER | CONSIGNEE | NOTIFY_PARTY | ALSO_NOTIFY | WEIGHT | QUANTITY | BL NUMBER | COUNTRY | DATE | COMMODITY | HS CODE |
|---|---|---|---|---|---|---|---|---|---|---|
| SHANGHAI BADA TEXTILE CO | ORDER | | NO FEAR | 840 g | 93 | CITVC2437 9671C | CHINA | 3/8/2005 | LADLES POLY WEST | 621149 |

1108

| SHIPPER | CONSIGNEE | NOTIFY_PARTY | ALSO_NOTIFY | WEIGHT | QUANTITY | BL NUMBER | COUNTRY | DATE | COMMODITY | HS CODE |
|---|---|---|---|---|---|---|---|---|---|---|
| GUANGZHOU TEXTILE CO | NO FEAR | | NO FEAR | 1203 g | 93 | CITVC2437 9671C | CHINA | 5/8/2005 | LADLES POLY WEST | 621149 |

| SHIPPER 1004A | CONSIGNEE 1004B | NOTIFY_PARTY | ALSO_NOTIFY 1004D | WEIGHT | QUANTITY | BL NUMBER | COUNTRY | DATE 1004I | COMMODITY | HS CODE 1004K | 1502 |
|---|---|---|---|---|---|---|---|---|---|---|---|
| SHANGHAI BADA TEXTILE | NO FEAR INC. | NO FEAR INC. | | 12584 g | 118 | CITVC2050 3037C | CHINA | 1/2/2005 | MEM PLOY JERSEY WEST | 621143 | |

| SHIPPER | CONSIGNEE | NOTIFY_PARTY | ALSO_NOTIFY | WEIGHT | QUANTITY | BL NUMBER | COUNTRY | DATE | COMMODITY | HS CODE | 1504 |
|---|---|---|---|---|---|---|---|---|---|---|---|
| SHANGHAI BADA TEXTILE | NO FEAR INC. | NO FEAR INC. | | 12584 g | 118 | CITVC2050 3037C | CHINA | 2/4/2005 | MEM PLOY JERSEY WEST | 621143 | |

| SHIPPER | CONSIGNEE | NOTIFY_PARTY | ALSO_NOTIFY | WEIGHT | QUANTITY | BL NUMBER | COUNTRY | DATE | COMMODITY | HS CODE | 1508 |
|---|---|---|---|---|---|---|---|---|---|---|---|
| SHANGHAI BADA TEXTILE CO | ORDER | | NO FEAR | 840 g | 93 | CITVC2437 9671C | CHINA | 3/8/2005 | LADLES POLY WEST | 621149 | |

| SHIPPER | CONSIGNEE | NOTIFY_PARTY | ALSO_NOTIFY | WEIGHT | QUANTITY | BL NUMBER | COUNTRY | DATE | COMMODITY | HS CODE | 1510 |
|---|---|---|---|---|---|---|---|---|---|---|---|
| GUANGZHOU TEXTILE CO. | NO FEAR | | NO FEAR | 1203 g | 93 | CITVC2437 9671C | CHINA | 5/8/2005 | LADLES POLY WEST | 621149 | |

FIG. 15

| COMMODITY | HS CODE *1004K* |
|---|---|
| MEM PLOY JERSEY WEST | 621143 |

| COMMODITY | HS CODE |
|---|---|
| MEM PLOY JERSEY WEST | 621143 |

| COMMODITY | HS CODE |
|---|---|
| MEM PLOY JERSEY WEST | 621147 |

CUSTOMS DATA—*1602*

*FIG. 16*

| WEIGHT | QUANTITY | BL NUMBER | COUNTRY | DATE |
|---|---|---|---|---|
| 1250KG | 118 | CITVC2050 3037C | CHINA | 1/2/2005 |

| WEIGHT | QUANTITY | BL NUMBER | COUNTRY | DATE |
|---|---|---|---|---|
| 1250KG | 118 | CITVC2050 3037C | CHINA | 2/5/2005 |

| WEIGHT | QUANTITY | BL NUMBER | COUNTRY | DATE |
|---|---|---|---|---|
| 840KG | 93 | CITVC2050 3037C | CHINA | 3/8/2005 |

CUSTOMS DATA—*1702*

*FIG. 17*

| SHIPPER | CONSIGNEE 1004B | NOTIFY_PARTY | ALSO_NOTIFY 1004D |
|---|---|---|---|
| SHANGHAI BADA TEXTILE | (NO FEAR INC.) | NO FEAR INC. | |

| SHIPPER | CONSIGNEE 1004B | NOTIFY_PARTY | ALSO_NOTIFY 1004D |
|---|---|---|---|
| SHANGHAI BADA TEXTILE | (NO FEAR INC.) | NO FEAR INC. | |

| SHIPPER | CONSIGNEE 1004B | NOTIFY_PARTY | ALSO_NOTIFY 1004D |
|---|---|---|---|
| SHANGHAI BADA TEXTILE CO. | ORDER | NO FEAR INC. | (NO FEAR INC.) |

CUSTOMS DATA —1802

| RATING 110 | SUPPLIER NAME 1908 | LOCATION 1910 | DETAILS 1912 |
|---|---|---|---|
| 87 | SUPPLIER AAA | CHINA | PAGE 8 |
| 83 | SUPPLIER BBB | CHINA | PAGE 11 |
| 81 | SUPPLIER CCC | CHINA | PAGE 14 |
| 80 | SUPPLIER 4DD | CHINA | PAGE 17 |
| 78 | SUPPLIER EEE | HONG KONG | PAGE 20 |
| 78 | SUPPLIER FFF | CHINA | PAGE 23 |
| 77 | SUPPLIER GGG | CHINA | PAGE 22 |

*FIG. 19*

STAND-OUT SUPPLIERS ~ 2000

HIGHEST CUSTOMER LOYAL ~ 2002A

| LOYALTY RATING 2004A | SUPPLIER NAME 2008 | LOCATION 2010 | DETAILS 2012 |
|---|---|---|---|
| 99 | SUPPLIER AAA | CHINA | PAGE 23 |
| 98 | SUPPLIER BBB | CHINA | PAGE 153 |
| 98 | SUPPLIER CCC | HONG KONG | PAGE 152 |
| 97 | SUPPLIER 4DD | CHINA | PAGE 122 |
| 83 | SUPPLIER EEE | HONG KONG | PAGE 41 |

MOST U.S. SHIPPING EXPERIENCE ~ 2002B

| EXPERIENCE RATING 2004B | SUPPLIER NAME 2008 | LOCATION 2010 | DETAILS 2012 |
|---|---|---|---|
| 87 | SUPPLIER 31VV | CHINA | PAGE 8 |
| 83 | SUPPLIER WWW | CHINA | PAGE 26 |
| 81 | SUPPLIER XXX | CHINA | PAGE 38 |
| 80 | SUPPLIER YYY | CHINA | PAGE 65 |
| 79 | SUPPLIER ZZZ | HONG KONG | PAGE 53 |

*FIG. 20*

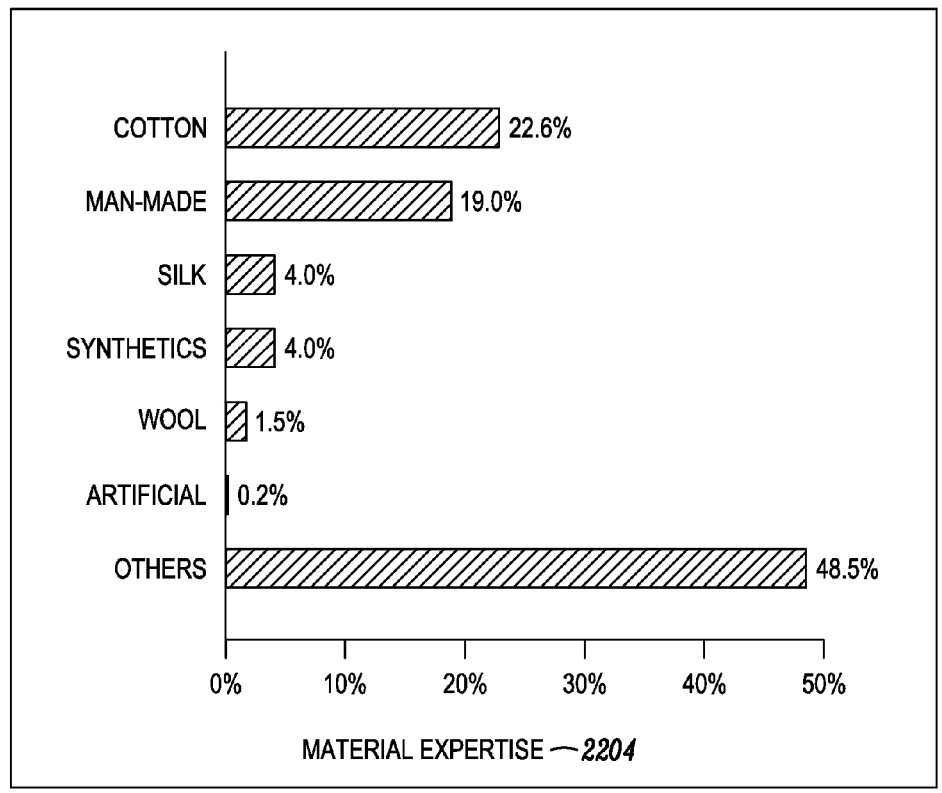
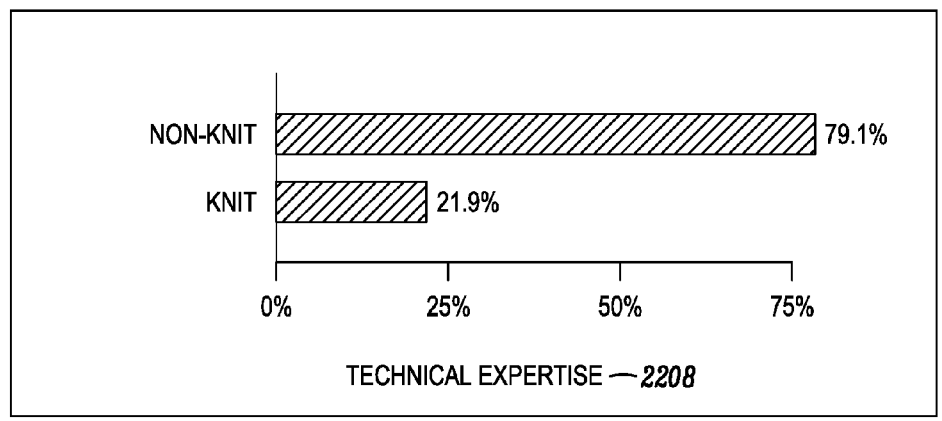
FIG. 22B

RANKED ENTITY SEARCHING OF PUBLIC TRANSACTION RECORDS

CROSS-REFERENCE TO RELATED APPLICATIONS

This application is a continuation of U.S. application Ser. No. 12/271,593 filed Nov. 14, 2008, which claims the benefit of U.S. Provisional App. No. 60/987,989 filed Nov. 14, 2007, each of which is hereby incorporated by reference in its entirety.

BACKGROUND

Field

The present invention is related to electronic commerce, and more particularly to rating systems.

Description of the Related Art

Buyers who are interested in working with suppliers, particularly overseas suppliers, may have many suppliers from which they can choose. For instance, in the apparel industry there are an estimated 40,000 apparel factories in China alone, with some 80,000 worldwide. In order to select a supplier, a buyer traditionally has had to rely on direct experience with the supplier or work through a middleman that facilitates contracting with suppliers. However, working with a middle-man may incur commissions for their services, and working directly with the supplier may present the buyer with a large degree of uncertainty, such as relating to the quality and reliability of the supplier, who the supplier typically works with, what type of products the supplier typically supplies, materials used, customers served, and the like. Some information about suppliers can be obtained from other sources, such as trade fairs, online directories, referrals, and the like. These disparate sources of information are, however, difficult to sort through, and at present there is a distinct lack of reliable and objective information that buyers can use to assess suppliers around the world. As a result, buyers must proceed largely on their own, and at considerable risk and expense.

A need exists for ways for buyers to more easily select suppliers.

SUMMARY

Methods and systems are disclosed herein for a platform by which buyers, sellers, and third parties can obtain information related to each other's transaction histories, such as a supplier's shipment history, the types of materials typically shipped, a supplier's customers, a supplier's expertise, what materials and how much a buyer purchases, buyer and shipper reliability, similarity between buyers, similarity between suppliers, and the like. The platform may aggregate data from a variety of sources, including, without limitation, customs data associated with actual import/export transactions, and facilitates the generation of reports as to the quality of buyers and suppliers, the reports relating to a variety of parameters that are associated with quality buyers and suppliers, and the like.

In an aspect of the invention, methods and systems may include: using a computer implemented facility to collect and store a plurality of records of transactions among a plurality of buyers and a plurality of suppliers; aggregating the transactions; associating the transactions with entities; and rating an entity based on analysis of the aggregated transactions. In the aspect a rating is tailored based on criteria defined by an end user.

In the aspect a rating is for one or more of: suppliers using aggregated transactional customs data, a supplier based on customs data related to transactions by the supplier with a third party, a buyer using aggregated transactional customs data, a buyer based on customs data related to transactions of the buyer with a third party, a supplier based on loyalty as indicated by analysis of customs transactions, a supplier based on amount of experience as indicated by customs transactions, a supplier based on evaluating the number of shipments, a supplier based on duration of experience as indicated by shipments, a supplier based on size of transactions as indicated by past shipments, a supplier based on extent of international experience as indicated by past shipments, a supplier based on extent of country-relevant experience as indicated by past shipments, a buyer based on loyalty as indicated by analysis of customs transactions, a buyer based on amount of experience as indicated by customs transactions, a buyer based on evaluating the number of shipments, a buyer based on duration of experience as indicated by shipments, a buyer based on size of transactions as indicated by past shipments, a buyer based on extent of international experience as indicated by past shipments, a buyer based on extent of country-relevant experience as indicated by past shipments, a supplier based on customer loyalty and supplier experience as indicated by past shipments reflected in customs records.

In the aspect, the rating is further based on at least two factors selected from the group consisting of: a country context of a party, a business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, and certifications with respect to specific vendor standards.

In the aspect, the rating is based on one of: a country context of a party, a business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, and certifications with respect to specific vendor standards In the aspect, weights are given in the rating process. The weights are based on timeliness of data. The weights are given based on size of transaction. The weights for transactions are given based on the quality of the transacting parties; the quality of a transacting party is based on a prior rating for that party. The weights are based on relevance of data.

In the aspect the rating is for a plurality of factories of an entity.

In the aspect the rating includes providing a human-aided assessment of supplier skills as a factor in a rating. Alternatively the rating includes using an indicator of an entity's financial health as a factor in a rating.

In another aspect of the invention, methods and systems, such as computer implemented methods and systems, include: using a computer implemented facility to collect and store a plurality of records of customs transactions among a plurality of buyers and a plurality of suppliers; aggregating the transactions; associating the transactions with entities; and providing an entity score for an entity based on analysis of the aggregated transactions. In the aspect the entity score is based at least in part on transactional data about shipments by the entity. In the aspect the entity score includes factors selected from the group consisting of country context, business legitimacy information, public recognition, amount of experience, caliber of customers of the supplier, customer loyalty for the supplier, degree of specialization of the supplier, and feedback from previous customers. In the aspect the entity score for the suppliers is based on aggregated transactional customs data. In the aspect the entity score is based on a criteria defined by an end user. In the aspect the entity score for a supplier is based on customs data related to transactions by the supplier with a third party. In the aspect the entity score is based on at least two factors selected from the group consisting of: a country context of a party, a business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, and certifications with respect to specific vendor standards. In the aspect the entity score is based upon one of: a country context of a party, a business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, and certifications with respect to specific vendor standards.

In the aspect, the entity score for a supplier is based on one or more of: loyalty as indicated by analysis of customs transactions, an amount of experience as indicated by customs transactions, evaluating the number of shipments, a duration of experience as indicated by shipments, size of transactions as indicated by past shipments, extent of international experience as indicated by past shipments, on extent of country-relevant experience as indicated by past shipments, and customer loyalty and supplier experience as indicated by past shipments reflected in customs records. In the aspect the entity score for a buyer is based on one or more of: loyalty as indicated by analysis of customs transactions, an amount of experience as indicated by customs transactions, evaluating the number of shipments, a duration of experience as indicated by shipments, a size of transactions as indicated by past shipments, an extent of international experience as indicated by past shipments, aggregated transactional customs data, customs data related to transactions of the buyer with a third party, and an extent of country-relevant experience as indicated by past shipments. In the aspect the entity score is for a plurality of factories of an entity. In the aspect, methods and systems further include providing a human-aided assessment of supplier skills as a factor in a entity score or include using an indicator of an entity's financial health as a factor in a entity score.

In another aspect of the invention, methods and systems, such as computer implemented methods and systems, include: using a computer implemented facility to collect and store a plurality of records of customs transactions among a plurality of buyers and a plurality of suppliers; aggregating the transactions; associating the transactions with entities; and determining a risk profile based on analysis of the aggregated transactions. In the aspect the risk profile is provided with respect to a supplier based on transactional customs data for the supplier. In the aspect, the risk is related to at least one of: counterfeiting, capacity, subcontracting, a political factor, a geographic factor, a weather factor, a geology factor, a financial risk, a probability of non-performance of a contract, a probability of termination of a contract, intellectual property, achieving a targeted delivery date. In the aspect the risk profile is provided with respect to a supplier based on transactional customs data for a party other than the supplier. In this aspect, the risk is related to at least one of: counterfeiting, capacity, subcontracting, a political factor, a geographic factor, a weather factor, a geology factor, a financial risk, a probability of non-performance of a contract, a probability of termination of a contract, intellectual property, achieving a targeted delivery date.

In the aspect, the risk profile is provided with respect to a buyer based on transactional customs data for the buyer. The risk is related to non-payment or the likelihood that a buyer will move to an alternative supplier.

In the aspect, the risk profile is provided with respect to a buyer based on transactional customs data for a party other than the buyer. The risk is related to non-payment or the likelihood that a buyer will move to an alternative supplier.

In the aspect, the risk profile is provided for a party using customs data and using the risk profile as a basis for determining terms and conditions of insurance.

In another aspect of the invention, methods and systems, such as computer implemented methods and systems, include: using a computer implemented facility to collect and store a plurality of records of customs transactions among a plurality of buyers and a plurality of suppliers; aggregating the transactions; associating the transactions with entities; and providing an indicator of economic leverage with respect to an entity based on analysis of the aggregated transactions. In the aspect, the indicator of economic leverage is with respect to at least one of: a supplier based on transactional customs data for the supplier, a supplier based on transactional customs data for a party other than the supplier, a buyer based on transactional customs data for the buyer, a buyer based on transactional customs data for a party other than the buyer. In the aspect, the transactional customs data corresponds to a price. Alternatively in the aspect, the transactional customs data corresponds to a delivery date or an order quantity.

In another aspect of the invention, methods and systems, such as computer implemented methods and systems, include using a computer implemented facility to collect and store a plurality of records of customs transactions among a plurality of buyers and a plurality of suppliers; aggregating the transactions; associating the transactions with entities; and predicting an action of an entity based on analysis of the aggregated transactions. In the aspect the prediction is of an action of a buyer based on analysis of customs data for transactions by the buyer. In the aspect the prediction is related to at least one of: price, a change in price, a change in supplier, and a quantity ordered by the buyer. In the aspect the prediction is of an action of a buyer based on analysis of customs data for transactions by a party other than the buyer. The prediction is related to a price, a change in price, a change in supplier, or a quantity ordered by a buyer. In the aspect, the prediction is of an action of a supplier based on analysis of customs data for transactions by the buyer. The prediction is related to a price, a change in price, a change in availability of an item, whether a supplier will work with a buyer of a given size, or whether a supplier will work with orders of a given size. In the aspect the prediction is of an action of a supplier based on analysis of customs data for transactions by a party other than the buyer. The prediction is related to a price, a change in price, a change in availability of an item, a potential closure of a subsidiary, a potential closure of a factory, or a potential closure of a company.

In another aspect of the invention, methods and systems, such as computer implemented methods and systems, include: using a computer implemented facility to collect and store a plurality of records of customs transactions among a plurality of buyers and a plurality of suppliers; aggregating the transactions; associating the transactions with entities; and making a recommendation based on analysis of the aggregated transactions. In the aspect the recommendation is based on analysis of customs data for transactions by the buyer, analysis of customs data for transactions by a party other than the buyer, analysis of customs data for transactions by the buyer, analysis of customs data for transactions by a party other than the buyer, prioritization of factors by a user, or a user-specified rating factor.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and associating an entity type with at least one of the entities. In the aspect, a data merging facility automatically merges records based on similarity of data elements with a customs record. The data elements correspond to a name of the entity or an address of the entity. Alternatively in the aspect, a data merging facility suggests an association between records and a single entity. The entity type is derived from one or more commodity fields in the transactions, and at least one of the commodity fields includes a harmonic tariff system code, a commodity type, or both. In the aspect, associating an entity type is based on an analysis of free text data in a plurality of data fields of the transactions. Associating an entity may alternatively be based on machine learning of entity types from customs transactional data records. The transactions may be customs transactions.

In another aspect of the invention, methods and systems, such as computer implemented methods and systems, include: using a computer implemented facility to collect and store a plurality of records of customs transactions among a plurality of buyers and a plurality of suppliers; aggregating the transactions; and processing the data to associate a plurality of transactions associated with a plurality of different entity names to a single entity based on analysis of customs record data for the transactions associated with the plurality of different entity names. In the aspect, the processing is based on, a name of the supplier, a name of the buyer, an order quantity, a billing amount, a location of the buyer, a location of the supplier, a delivery date, order data, at least one string associated with a supplier name, or at least one string associated with a buyer name. In the aspect the processing involves removing blank spaces from a supplier name field or removing blank spaces from a buyer name field. In the aspect, the transaction is associated with a region of interest, an industry, past shipment data, a country-relevant experience, a number of shipments, a material, a product category, a technique, a name of the entity, an order quantity, a billing address, a targeted delivery date, or a capacity of the supplier.

In another aspect of the invention, methods and systems, such as computer implemented methods and systems, include: using a computer implemented facility to collect and store a plurality of public records of transactions among a plurality of buyers and a plurality of suppliers; aggregating the transactions; associating the transactions with entities; and evaluating legitimacy of feedback about an entity based on analysis of whether the feedback is associated with a transaction reflected in public records. The evaluation of legitimacy of feedback associated with the supplier is based on validation by a third party. The evaluation of legitimacy of feedback associated with the buyer is based on validation by a third party.

In the aspect the transaction is associated with a name of the entity, an order quantity, a billing address, a targeted delivery date, a capacity of the supplier, transaction customs data, a region of interest, an industry, a past shipment, a country-relevant experience, a number of shipments, a material, a product category, or a technique.

In another aspect of the invention, methods and systems, such as computer implemented methods and systems, include: using a computer implemented facility to collect and store a plurality of public records of transactions among a plurality of buyers and a plurality of suppliers; aggregating the transactions; associating the transactions with entities; and providing a computer-implemented tool for suggesting a marketing strategy for a supplier based on analysis of transactional data from the public records. In the aspect the transactional data is associated with a supplier, a buyer, region of interest, customs data, past shipment, country relevant experience, a number of shipments, a product category, a material, or a technique. The analysis of transactional data includes analysis of pricing, buyer behavior, or transactional data associated with a competitor of the supplier.

In another aspect of the invention, methods and systems, such as computer implemented methods and systems, include: using a computer implemented facility to collect and store a plurality of records of transactions among a plurality of buyers and a plurality of suppliers; aggregating the transactions;

associating the transactions with entities; and providing a computer-implemented tool for suggesting a marketing strategy for a buyer based on analysis of the transactional data from the records. In the aspect, the transactional data is associated with a supplier, a buyer, a region of interest, customs data, a past shipment, a country relevant experience, a number of shipments, a product category, a material, or a technique. The analysis of transactional data includes analysis of pricing, buyer behavior, or analysis of transactional data associated with a competitor of the buyer.

In another aspect of the invention, methods and systems, such as computer implemented methods and systems, include: using a computer implemented facility to collect and store a plurality of public records of transactions among a plurality of buyers and a plurality of suppliers; aggregating the transactions; associating the transactions with entities; and providing a user interface whereby a user may search for at least one of a supplier and a buyer and retrieve relevant information based on the aggregated transactions data. In the aspect, the interface allows a tuple-based search. The tuple-based search relates to a capability with respect to at least one of a product, a material and a technique. In the aspect, search results are ranked based on a supplier rating.

In the aspect, the rating is based upon a country context of a party, business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, or certifications with respect to specific vendor standards.

In the aspect, the search results are based on a risk profile.

In the aspect, the risk is related to counterfeiting, capacity, subcontracting, a political factor, a geographic factor, a weather factor, a geology factor, a financial risk, a probability of non-performance of a contract, a probability of termination of a contract, intellectual property, achieving a targeted delivery date.

In the aspect, the risk profile is provided with respect to a supplier based on transactional customs data for a party other than the supplier. The risk is related to counterfeiting, capacity, subcontracting, a political factor, a geographic factor, a weather factor, a geology factor, a financial risk, a probability of non-performance of a contract, a probability of termination of a contract, intellectual property, achieving a targeted delivery date, a buyer based on transactional customs data for the buyer, non-payment, or the likelihood that a buyer will move to an alternative supplier. In the aspect, the risk profile is provided with respect to a buyer based on transactional customs data for a party other than the buyer. The risk is related to non-payment or the likelihood that a buyer will move to an alternative supplier.

In the aspect, the risk profile is provided for a party using customs data and using the risk profile as a basis for determining terms and conditions of insurance. The results are based on an opportunity profile. The opportunity relates to the availability of pricing leverage for a buyer with respect to a supplier, consolidation of orders with a supplier. The opportunity relates to the availability of pricing leverage for a supplier with respect to a buyer or to increasing a share of a buyer's total spending for a supplier.

In another aspect of the invention, the methods and systems, such as computer implemented methods and systems, include: using a computer implemented facility to collect and store a plurality of public records of transactions among a plurality of buyers and a plurality of suppliers; aggregating the transactions; associating the transactions with entities; integrating the aggregated and associated transactions with data from at least on3 other data source to provide an integrated data facility; and adapting the integrated data facility for evaluating at least one of a supplier and a buyer. In the aspect, the public records include customs records. In the aspect, evaluations are ranked based on a supplier rating. In the aspect, the evaluation is based upon a country context of a party, business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, or certifications with respect to specific vendor standards.

In the aspect, evaluations are ranked based on a buyer rating, a country context of a party, business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, or certifications with respect to specific vendor standards.

In another aspect of the invention, methods and systems, such as computer implemented methods and systems, include: using a computer implemented facility to collect and store a plurality of records of customs transactions among a plurality of buyers and a plurality of suppliers; aggregating the transactions; associating the transactions with entities; and suggesting an opportunity based on analysis of the transactions. In the aspect, the opportunity relates to the availability of pricing leverage for a buyer with respect to a supplier, an opportunity for consolidation of orders with a supplier, the availability of pricing leverage for a supplier with respect to a buyer, the opportunity to increase a share of a buyer's total spending for a supplier, the availability of a discount for the buyer with respect to the supplier for a specified period, the availability of a committed time for delivery by the buyer to the supplier, the availability of bulk discount for the buyer with respect to the supplier, the availability of credit sales for the buyer with respect to the supplier, the availability of free delivery for the buyer with respect to the supplier, or the availability of liquidated damages for the buyer with respect to the supplier.

In another aspect of the invention, methods and systems, such as computer implemented methods and systems, include: using a computer implemented facility to collect and store a plurality of aggregated customs transactions; associating the transactions with a supplier; and using the aggregated transactions to inform a rating of the supplier based at least in part on analysis of the aggregated transactions. In the aspect, the aggregated customs transactions include a summary of transactions for a product type. The transactions are summarized over a period of time. The analysis of the aggregated transactions includes comparing the aggregated transactions for a supplier with a plurality of records of transactions for a buyer. The aggregated customs transactions include transactions for a plurality of suppliers. In the aspect, associating the transactions with a supplier includes predicting one or more suppliers to which the transactions can be associated.

In another aspect of the invention, methods and systems, such as computer implemented methods and systems, include: taking a plurality of input data records from at least one data source of transactions; matching the data records to an entity that is a party to a plurality of transactions; and automatically merging the data records associated with the same entity to form a merged data store of transactions. In the aspect, matching includes filtering the data records. Filtering suggests data records for merging. Filtering is based on search engine techniques, such as a lucene search engine technique. Filtering is based on kgram filtering that may include a kgram filtering group that consists of four consecutive characters. In the aspect, a kgram filtering threshold for suggesting data records to be merged is ten matching kgram filter groups. In the aspect, a plurality of data fields within a data record are combined for matching.

In the aspect, matching includes classification. Classification is performed on data records suggested for merging and optionally, filtering is used to suggest data records for merging. Classification includes at least one of canonical adaptation, text cleanup, multi-field classification, edit distance assessment, vector generation, machine learning, and decision tree processing. Canonical adaptation includes normalizing text strings among the plurality of transactions or changing equivalent text strings to a known text string. Text cleanup is based on at least one of geographic factors, regional factors, market verticals, industry norms, known variations, learned variations, and user preferences.

In the aspect, the text cleanups are associated with at least one type of data field in the data records. The type of data field includes at least one of a shipper, a consignee, a notify party, an also notify party, a weight, a quantity, a country, a date, a commodity, and a harmonic tariff system code. Classification is applied to a plurality of data fields in the data records or to combined data fields in the data records.

In the aspect, classification provides a vector that represents dimensions of similarity. The vector includes dimensions of similarity for at least two of canonical adaptation, text cleanup, multi-field classification, edit distance assessment, vector generation, machine learning, and decision tree processing.

In the aspect, matching includes clustering. Optionally, clustering includes p-percent clustering. In the aspect, a data record is merged when a p-percent value associated with the data record exceeds a p-percent threshold associated with the entity. Optionally the p-percent threshold is thirty percent. Alternatively p-percent clustering is based on a dynamic p-percent threshold. The dynamic p-percent threshold is based on a quantity of data records in a cluster associated with an entity.

In the aspect, the plurality of transactions contains party identifying data in a field of the data records. The party identifying data is stored in different fields of at least two of the plurality of data records. Optionally, party identifying data in a first record is a parent entity and a party identifying data in a second record is a child entity of the parent entity.

In the aspect, matching data records includes identifying data that is a variation of an entity name or an entity address. In the aspect, the party is one of a supplier and a buyer. Alternatively, matching includes two or more types of text association selected from a list consisting of: filtering, character group matching, thesaurus lookup, machine learning, natural language processing, search-based comparison, classification, known entity matching, clustering, and human-identified entities.

In another aspect of the invention, methods and systems, such as computer implemented methods and systems, include: taking a plurality of input data records from at least one data source of transactions; filtering the input data records to identify a set of filtered data records that are favorable candidates for automatic merging; classifying the filtered data records to produce a set of classified data records, each classified data record associated with a likelihood that the data record should be associated with a particular entity; and automatically merging the data records associated with the same entity to form a merged data store of transactions. In the aspect, the filtering is performed using a search engine, kgram filtering, or dynamic programming. I the aspect, classifying the data records is performed using at least one of canonical adaptation, specific cleanups, multi-field comparison, an edit distance algorithm, vector generation, machine learning, and a decision tree. In the aspect, filtering suggests data records for merging. Alternatively filtering is based on search engine techniques, that optionally include a lucene search engine technique. In the aspect filtering is based on kgram filtering. Optionally a kgram filtering group consists of four consecutive characters. Optionally a kgram filtering threshold for suggesting data records to be merged is ten matching kgram filter groups. In the aspect, a plurality of data fields within a data record is combined for matching.

In the aspect, classification is performed on data records suggested for merging. Optionally filtering is used to suggest data records for merging. In the aspect classification includes at least one of canonical adaptation, text cleanup, multi-field classification, edit distance assessment, vector generation, machine learning, and decision tree processing.

Canonical adaptation includes normalizing text strings among the transactions or changing equivalent text strings to a known text string.

In the aspect, text cleanup may be based on at least one of geographic factors, regional factors, market verticals, industry norms, known variations, learned variations, and user preferences. Optionally, text cleanups are associated with at least one type of data field in the data records. The type of data field includes a shipper, a consignee, a notify party, an also notify party, a weight, a quantity, a country, a date, a commodity, and a harmonic tariff system code.

In the aspect, classification is applied to a plurality of data fields in the data records or to combined data fields in the data records.

In the aspect, classification provides a vector that represents dimensions of similarity. Optionally, the vector includes dimensions of similarity for at least two of canonical adaptation, text cleanup, multi-field classification, edit distance assessment, vector generation, machine learning, and decision tree processing.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and classifying an entity as a buyer based on analysis of the aggregated transactions. In the aspect the aggregated transaction is associated with an industry, customs data, a past shipment, a likelihood of interest, or a number of shipments.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and using the transactions as a training set to predict association of a particular transaction with an attribute. In the aspect, the attribute is a type of industry, a type of supplier, a type of product, a product attribute, or related to a type of material. In the aspect, the particular transaction represents a shipment from a supplier to a buyer. The transactions are customs transactions. Alternatively, the entities are one or more of a supplier and a buyer. Optionally, the particular transaction is a rolled-up transaction.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and using the transactions as a training set to predict association of a particular transaction with an entity. In the aspect, the particular transaction represents a shipment from a supplier to a buyer. Alternatively, the transactions are customs transactions. In the aspect, an entity is one of a supplier and a buyer. Optionally, the particular transaction is a rolled-up transaction.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and predicting a minimum order requirement for an entity based on analysis of the transactions. In the aspect the entity is a factory, supplier, or a subsidiary of a supplier.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and providing a search facility for enabling a search for an entity, wherein the search facility allows searching based on geographic region, industry specialization, entities participating in the transactions, and likelihood of interest in a transaction with the searcher. In the aspect, the search facility is adapted to be used by a buyer searching for a supplier or adapted to be used by a supplier searching for a buyer.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and rating a sub-entity of a supplier based on analysis of the aggregated transactions. In the aspect, the sub-entity is a factory, a collection of factories, or a subsidiary. In the aspect, determining the sub-entity is based on analysis of the public records. Optionally, the public records are records of customs transactions.

In another aspect of the invention, methods and systems, such as computer implemented methods and systems, include: using a computer implemented facility to collect and store a plurality of aggregated public records of shipment transactions; associating the transactions with a supplier; and using the aggregated transactions to inform a rating of the supplier based at least in part on analysis of the aggregated transactions.

In another aspect of the invention, methods and systems, such as computer implemented methods and systems, include: using a computer implemented facility to collect and store a plurality of public records of transactions; associating the transactions with entities; and using the aggregated transactions to classify at least one of a supplier and a buyer according to type. In the aspect a buyer may identify like buyers, suppliers like those of the buyer, suppliers of a specified type, or suppliers like to prefer the buyer. In the aspect, a supplier may identify like suppliers, buyers like those of the supplier, or buyers of a specific type.

In another aspect of the invention, methods and systems, such as computer implemented methods and systems, include: using a computer implemented facility to collect and store a plurality of public records of transactions; associating the transactions with entities; and assessing whether a buyer has ceased doing business with a supplier based on the transactional data. In the aspect, the assessment is based on cycle time between shipments, departure of cycle time from a historical average, or based in part on a prediction as to inventory held by a buyer.

In another aspect of the invention, methods and systems, such as computer implemented methods and systems, include: using a computer implemented facility to collect and store a plurality of public records of transactions; associating the transactions with entities; and using the aggregated transactions identify at least one of a supplier of a specific item sold by a party other than the supplier. In the aspect, the specific item is a commodity.

In the aspect, the identification of supplier is based on region of interest, customs data, product category, past shipments, or a number of shipments. The specific item is a service.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 1 depicts a report showing an overall rating derived for a set of suppliers in a category of products.

FIG. 10 depicts fields that are derived from customs data associated with supply transactions.

FIG. 11 depicts a plurality of customs records with details that are relevant to buyer and supplier identification.

FIG. 12 depicts a user interface for identifying a buyer from one or more of a plurality of customs data fields.

FIG. 15 depicts how multiple customs transaction records can be used to assess buyer loyalty.

FIG. 16 depicts using transaction data that may be indicative of a supplier's degree of specialization.

FIG. 17 depicts customs data indicative of a supplier's degree of experience.

FIG. 18 depicts customs data record fields that may affect a supplier's rating based on the quality of the buyers served by the supplier.

FIG. 19 depicts a summary report showing top suppliers and an overall rating for a category of supplier of a particular product.

FIG. 20 depicts reports showing standout suppliers for a particular product, including suppliers with highest customer loyalty and customers with deepest experience shipping to the buyer's jurisdiction.

FIGS. 22A and 22B show a breakdown of supplier transaction experience for a selected time period.

DETAILED DESCRIPTION

Figure 2:
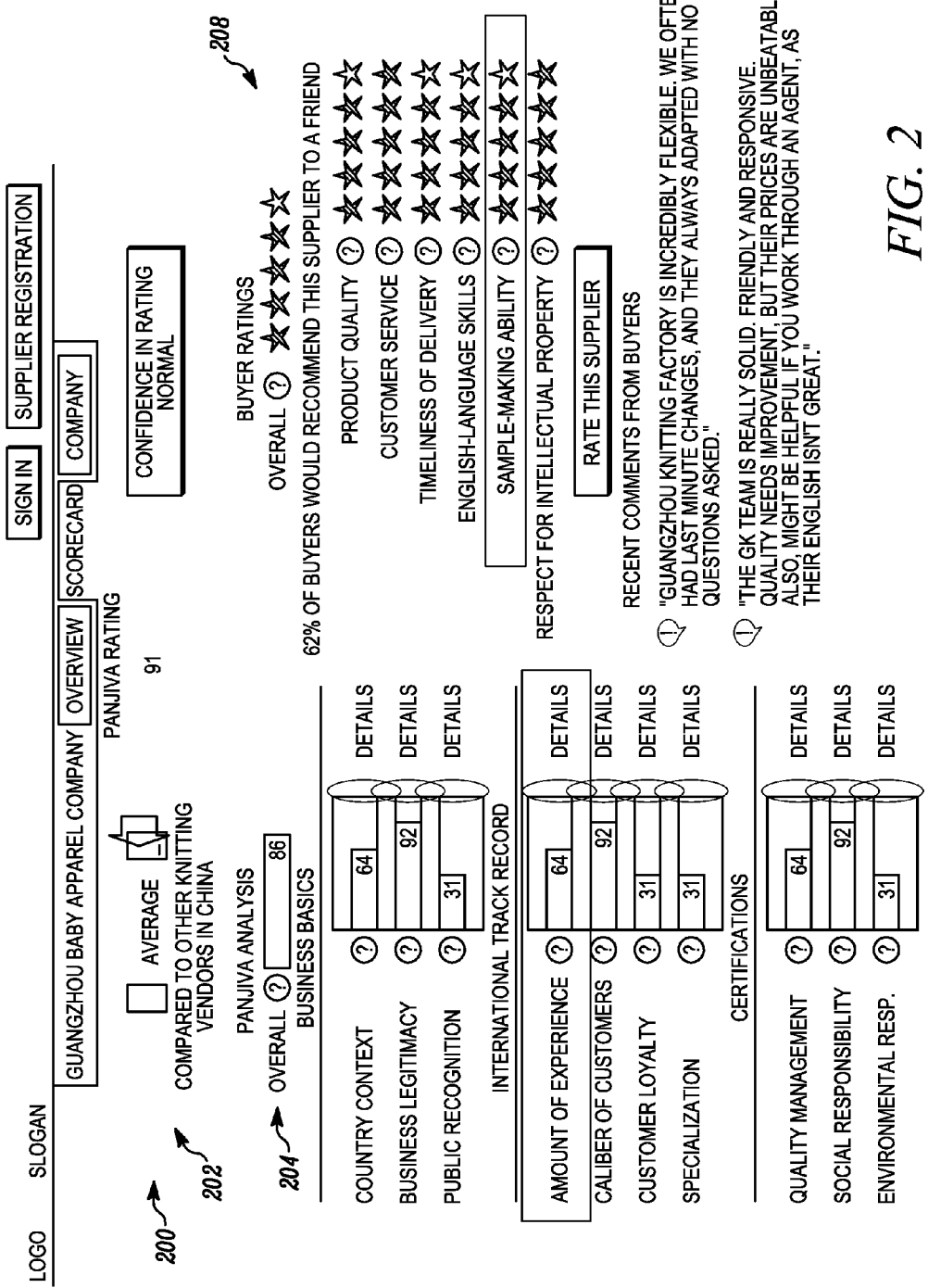
FIG. 2 depicts a more detailed report on a supplier with ratings along a number of dimensions of quality and ratings generated by past buyers who have worked with the supplier.

Methods and systems are provided herein for facilitating engagement of suppliers; thus, a supplier rating facility may make it easier for companies of all sizes to do business across borders by helping companies identify which suppliers they can trust. The suppler rating facility approach is to leverage a wide variety of quality data sources to rate suppliers around the globe. Behind each rating may be a detailed scorecard that evaluates suppliers along key dimensions. By comparing supplier scorecards, subscribers may determine which suppliers are right for them. In one preferred embodiment the rating system is used to rate apparel suppliers, but it should be understood that suppliers in other industries may be rated by the same or similar methods and systems, such as suppliers of consumer electronics, computer equipment, toys and games, consumer products, textiles, home goods, food, accessories, computer games, automotive parts, electronic parts and equipment, and a wide range of other goods and services, such as BPO, software development, call centers, and the like.

Presently, buyers can access a plurality of supplier directories for information about suppliers. However, those directories may only contain information provided by the suppliers themselves, and on occasion, third-party information on limited subjects, such as relating to creditworthiness. That information may not be particularly useful in helping customers to distinguish between good and bad suppliers. In certain preferred embodiments, the supplier rating facility disclosed herein may facilitate the generation of a plurality of reports that supplement or substitute for supplier-provided information, the reports generated by methods and systems disclosed herein and based on a wide range of data sources. In embodiments each supplier may receive a rating between 1 and 100. Behind this rating may be a detailed scorecard, each component of which being generated by an algorithm that operates on one or more relevant data sources, and that evaluates suppliers along dimensions that are important to customers.

A supplier rating facility as contemplated herein may provide buyers with concrete information about which suppliers are good and which suppliers are bad, which are trustworthy and which are not, which are experienced in a particular area, and the like. The ratings may feature a range of information about suppliers, including analysis generated by algorithms operating on relevant data sources and, in certain optional embodiments, ratings from previous customers. Analysis may include, among other things, using publicly available but currently fragmented information. In various embodiments, the supplier rating facility may rate suppliers along several dimensions, including without limitation amount of international experience, degree of specialization, and standards compliance.

In certain optional embodiments, ratings from previous customers may enable suppliers to gather and showcase feedback from their previous customers. Buyers may pay a subscription fee for access to ratings detail. Existing business-to-business sites may be able to embed the supplier rating facility in their directories and benefit from new revenue streams. Although apparel is being used as an embodiment of the invention, it should be understood that the invention may be applied to any industry, such as furniture, electronics, textiles, chemicals, toys, food, and the like. In addition, services in addition to a ratings service may be facilitated through the invention, such as for billing, transactional settlement, insurance, social networking for buyers, and the like. In embodiments, the invention may be applied to a broad spectrum of industries where buyers and sellers are located across diverse environments, and supplier-product information and ratings are fragmented.

Figure 1:
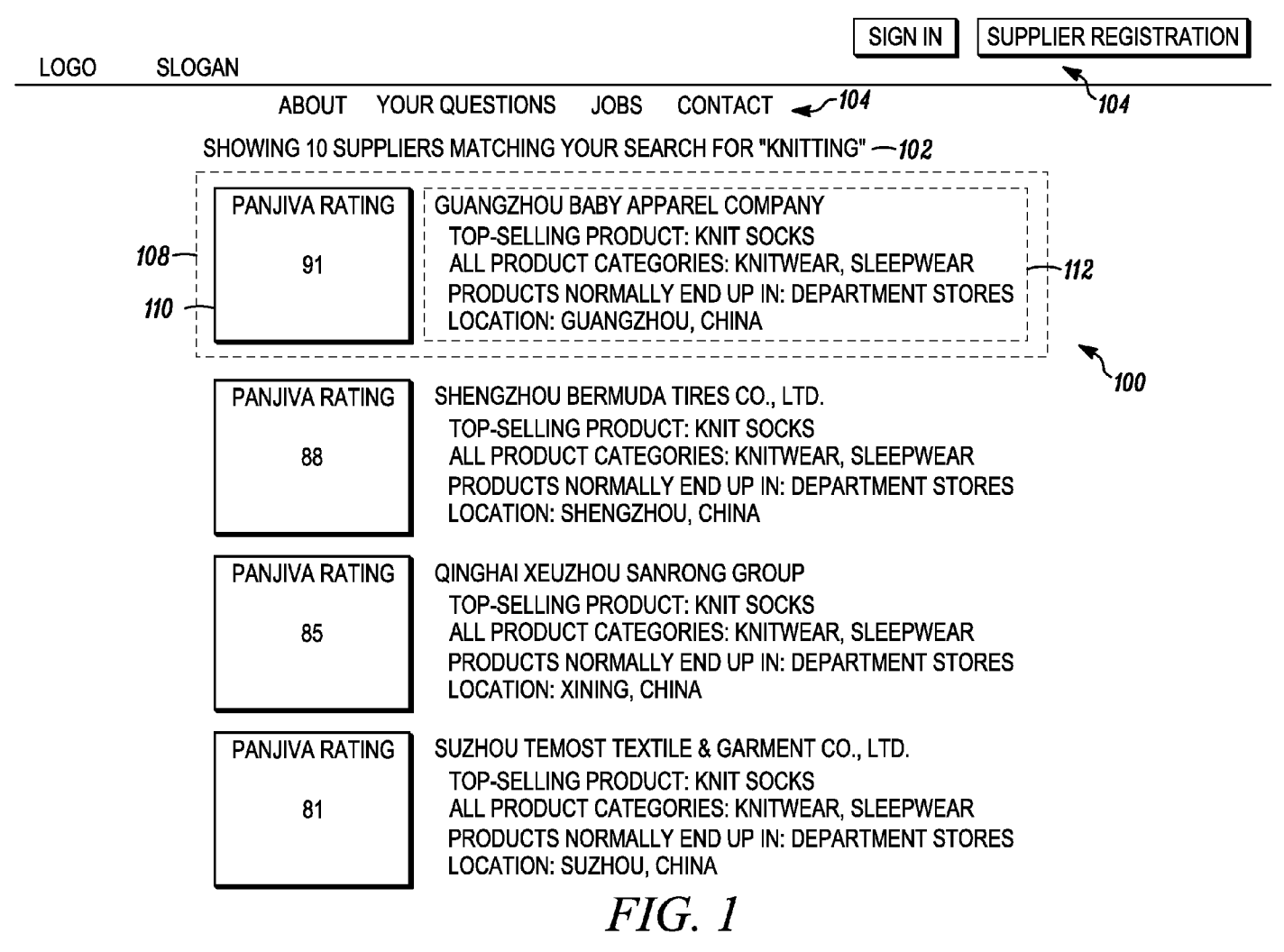

The supplier rating facility may provide a ratings platform where buyers/suppliers may compare and contrast potential suppliers/buyers. The ratings platform may generate and maintain ratings of suppliers, buyers, countries, geographic regions, marketplaces, commodities and the like. The ratings may be presented in various forms including a listing of supplier ratings as shown in FIG. 1. The supplier rating list 100 in FIG. 1 includes a keyword 102 around which the list is based. Although one keyword is shown in FIG. 1, a keyword phrase, group of keywords, logical combination of keywords, and the like may be used as a basis for the list 100. In an interactive embodiment of the list of FIG. 1 selecting the keyword 102 (e.g. knitting) may allow a user to make changes to the keyword 102 to present a revised list 100. Also in an interactive embodiment of the list of FIG. 1, a menu 104 may be provided to facilitate access to other aspect of the platform and to one or more webpages associated with the platform. The list 100 may include any number of suppliers that satisfy the keyword 102 criteria; in the example of FIG. 1 the list includes 10 suppliers. The number of suppliers presented may be limited to fewer than the total number that match the keyword 102 criteria. Aspect of the list 100, such as a limit on the number of supplies in the list 100 may be controlled by preferences (e.g. user, platform, supplier, and the like).

The list 100 may include entries 108 for each supplier that satisfies the keyword 102 criteria. An entry 108 may include an overall rating 110 also known as the "Panjiva Rating", the supplier name 112, selected bibliographic data 114, and the like. Preferences as indicated above may impact what information is presented in an entry 108 and the embodiment of FIG. 1 is only an example of one set of information to be presented. Each supplier may be given an overall rating 110 that may be based on a 100 point scale so that an overall rating 110 may be between one and one-hundred as shown in FIG. 1.

An alternate view of supplier rating is exemplified in FIG. 2 which depicts a supplier scorecard 200, which may be a detailed view of a supplier aspects related to the overall rating 110. The scorecard 200 enhance the overall rating 110 by providing details about the overall rating 110. A comparative rating 202 may show the supplier overall rating 110 in light of an average of other suppliers and may include an indication of a confidence in the overall rating 110. This scorecard 200 may assess the supplier's relative strength along a variety of dimensions. Leveraging a wide variety of data sources, the supplier rating facility may rate suppliers along key dimensions 204 also known as "Panjiva Analysis" ratings, in a plurality of categories such as business basics, international track record, certifications, and the like. The rating platform may also allow buyers to rate suppliers along several dimensions. The scorecard 200 may include the buyer ratings 208. In embodiments, the ratings platform may become a place where buyers go to hold suppliers accountable. In embodiments, reports such as the scorecard 200 may be made available to users in online and print forms.

In embodiments, a backend infrastructure may automatically generate customized documents by programmatically generating a representation of the document in a typesetting language such as Tex, LaTeX, and the like, which may then be processed and turned into a PDF document.

The "Business Basics" section of the Supplier Scorecard 200 may help a buyer assess whether a company is legitimate and worthy of consideration as a potential partner. Included in "Business Basics" may be information on whether a company has registered with authorities, as well as an assessment of a trading environment in the supplier's country, combining macro contextual information with data that is specific to an individual supplier and the like. A facility for determining a track record in a particular jurisdiction may use government and third-party data, and may assess the amount of experience a supplier has serving that jurisdiction, and the loyalty that a supplier's customers have demonstrated, and the like. The "Standards Compliance" section of the Supplier Scorecard 200 may document whether a supplier has been certified as meeting international standards for quality management, respect for the environment, social responsibility, product safety, and the like.

The ratings scorecard 200 may include a plurality of analysis dimensions, such as county context, business legitimacy, public recognition, amount of experience, caliber of customers, customer loyalty, specialization, quality management, social responsibility, environmental responsibility, and the like. Buyer feedback dimensions may include product quality, customer service, timeliness of delivery, language skills, sample-making ability, respect for intellectual property, and the like. Supplier information may include contact information, areas of expertise, caliber of customers, ratings, and the like. A confidence in buyer feedback may be established by determining that the feedback is being provided by a supplier who is or recently was receiving shipments from the supplier. This can be done by ensuring that transaction records validate that at least some supplier shipments were supplied to the buyer providing the feedback. In embodiments, information utilized in the formation of the ratings scorecard 200 may be from shipment history, such as frequency, quantity, and the like; shipment capacity estimation, which may be based on shipment data as opposed to information provided by the supplier.

Contact information may include making all contact information available to subscribers, so that they may directly contact suppliers. Areas of expertise may tell a buyer which products a supplier has shipped, which materials it has used, which techniques it has employed, and whether it has produced men's apparel, women's apparel, or both. Caliber of customers may tell a buyer which types of customers a supplier has served, such as premium, mass, discount, and/or niche customers. In embodiments buyers may rate suppliers with whom they have done business. After a buyer rates a supplier, the supplier rating facility may verify that that the two have actually done business together, such as by identifying a corresponding customs records that shows an actual import transaction in which the buyer imported goods from the supplier, from a bill of lading, from a bank-issued receipt, and the like. Thus, methods and systems disclosed herein include methods and systems for deterring fraudulent ratings by verifying the existence of the transaction purportedly rated by the buyer. This may prevent false ratings that are either too positive (such as by an affiliate or cohort of the supplier) or too negative (such as by a competing supplier posing as a buyer). After verification, the buyer's rating may become part of the supplier's scorecard. As part of the verification process, the buyer's identity may be revealed to the supplier. However, in embodiments the buyer's identity may be obscured so that it does not appear on the supplier rating facility's website and is not shared with anyone else. In embodiments buyer feedback may only be viewed by buyers who have provided feedback on their suppliers. In embodiments, a computer facility for recording transactions associated with one or more buyers with one or more sellers may include a user interface that may facilitate determination of entity score based on transactional data. The transactional data may be related to the shipping details of the goods and services associated with different entities. In an example, entities such as buyers may order goods and services from the sellers resulting in transactions. An aggregation facility may collect, combine or aggregate transactions associated with different entities. Subsequently, an association facility may facilitate association of transactions with different entities. The transactions may be analyzed by the analysis facility to generate an entity score corresponding to each entity.

In embodiments, rating a supplier, buyer, or other entity may result in a score that is at least partially based on predefined criteria, such as a user provided criteria. Alternatively, the system and methods herein may facilitate rating of a supplier, buyer, or other entity based one or more algorithms. The rating algorithms may be manually selected, or may be selected automatically based on a set of algorithm selection rules. In an example, a supplier may be known in the industry as highly credible. One or more rating algorithms may be applied to transaction data and may use predefined criteria for the algorithms to mathematically determine the credibility of the supplier. This determined credibility rating may be provided to the buyer through a user interface of the platform.

In embodiments, the entity score may be based in part on transactional data related to the shipments by the entity such as delivery data, amount shipped, location of shipment and the like. In an example, a supplier providing goods and services within the stipulated delivery date may garner higher ratings compared to the suppliers who failed to deliver on time.

In embodiments, the entity score may be based on one more factors including country context, business legitimacy information, public recognition, amount of experience, caliber of customers of the supplier, customer loyalty for the supplier, degree of specialization of the supplier, and feedback from previous customers or some other factors. Further, each factor or group of factors may include a list of parameters. A user interface may be configured to allow a user to select some or all the parameters from this group to generate an entity rating. In an example, the group country content may include variables such as GNI per capita, currency volatility, cost to export, political stability, and the like. The user interface may allow a user to select GNI per capita and cost to export to generate a country context value that would be applied to calculate an entity rating. Furthermore, determination of the entity score may depend partially or completely on some or all the parameters selected from some or all the groups, as described herein and elsewhere. In an example, a buyer who may be interested in knowing the quality of a product or service provided by a supplier may select feedback from previous customer groups on which to base an entity score for the supplier. This group may further include parameters such as timely delivery of goods, quality of goods, number of transactions and the like. Rather than choosing just the group rating to determine an entity rating, the buyer may choose some or all the parameters from this group to determine the entity score associated with the supplier. In another example, the score associated with the supplier may be determined based on two or more groups comprising multiple parameters, such as the group pertaining to the degree of specialization of the supplier and the group pertaining to feedback from previous customers. The buyer may select the group degree of specialization and one or more parameters from the group. Similarly, the buyer may select one or more parameters from the feedback from the previous customers group. The entity score may be determined based on parameters selected in each of the groups.

A user interface, such as the user interface of FIG. 2 may be used to present the various ratings, scores, and rating factors to be applied to the entity rating score.

In embodiments, a supplier rating facility or buyer rating facility may take ratings along each of key dimensions, weight the ratings to account for the fact that some dimensions are more important than others, calculate an overall rating 110, and the like. In embodiments, ratings may provide a measure of caliber, such as the caliber of a buyer or the caliber of a supplier.

The supplier rating facility may rate suppliers across a plurality of different dimensions, some of which may derive from actual transactional data, such as customs data, with others based on sources such as Dun & Bradstreet, the World Bank, auditing firms for various certifications, government sources, and the like. In embodiments, more weight may be given to recent data, data for larger transactions, data for higher quality buyers, or other types of data with respect to which there is an indicator that the data may have higher relevance than other types of data. The supplier rating facility may also provide a more intuitive understanding to ratings, by considering caliber of customers, customer loyalty, specialization, and the like. Caliber of customers may involve manually grouping buyers into distinct bands or tiers, such as premium, mass-market, discount, niche, and the like and then computing a sum based on the newness of each buyer-supplier relationship and the tier of each buyer.

In embodiments, rating for a supplier may be based on the aggregated transactional customs data, a user defined criteria, customs data related to transactions by the supplier with a third party or on some other parameters. In an example, a supplier may be rated based on the number of transactions done with a particular buyer. In another example, a user may define adherence to delivery data as a criteria for rating the supplier. In addition, the rating of the supplier may be based at least in part on loyalty as indicated by an analysis of customs transactions. Furthermore, the determination of rating for the supplier may based on an amount of supplier experience as indicated by customs transactions related to the number of shipments, duration of supplier experience as indicated by shipments, size of transactions as indicated by past shipments, extent of international experience as indicated by past shipments, extent of country-relevant experience as indicated by past shipments and the like.

In embodiments, a rating for a buyer may be based on aggregated transactional customs data, customs data related to transactions of the buyer with a third party or some other parameter. In an example, ratings for the buyer may be based on the feedback about the buyer provided by one or more suppliers. In addition, ratings for the buyer may also be based on two or more factors selected from a group including the country context of a party, the business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, and certifications with respect to specific vendor standards and the like.

In embodiments, the rating of the buyer may be based on loyalty as indicated by an analysis of customs transactions. In an example, a buyer may be rated based on the number of transactions with a particular supplier in a specific time frame. In addition, the buyer may be rated based on an amount of experience as indicated by customs transactions related to the number of shipments, duration of experience as indicated by shipments, size of transactions as indicated by past shipments, extent of international experience as indicated by past shipments, extent of country-relevant experience as indicated by past shipments and the like.

In embodiments, a rating may be made of customer loyalty for a supplier. A customer loyalty rating method may include analyzing the set of buyers who have done business with each supplier over the course of several years, and identifying 'loyalty periods,' intervals in which a buyer consistently sources from a given supplier, and 'switches,' where a buyer ceases obtaining a given set of products from one supplier and begins sourcing from another supplier. Suppliers for whom there have been many switches may be given lower ratings, while suppliers with long loyalty periods and few switches may be given higher ratings.

In embodiments, a rating may relate to the degree of specialization of a supplier. A specialization rating method may decompose supplier shipments into dimensions, such as product category, technique, material, gender, and the like. These dimensions may be independent of the rating dimensions or may be used as a factor in rating.

In embodiments, methods and systems may include methods for generating raw scores. Generation of raw scores may use a variety of techniques to transform raw customs data and other third-party data into meaningful ratings. Consideration may be given to customer loyalty, caliber of customers, amount of experience, specialization, country context, business legitimacy, environmental responsibility, social responsibility, quality management, public recognition, and the like. Customer loyalty rating may include identifying shipping patterns, buyer patterns, loyalty periods, and the like. Caliber of customer ratings may include assigning a buyer tier, length of time in that tier, age of buyer, and the like. Experience ratings may include evaluating number of shipments, duration of experience, size of transactions handled, and the like. Specialization ratings may include or reference a measure of the extent to which a supplier focuses on a narrow range of products, materials, and/or techniques. Business legitimacy ratings may be provided by a supplier having government registration records, a Dun & Bradstreet DUNS number, or other evidence of business legitimacy. Environmental, social, product safety, and quality management ratings may be derived from a supplier having appropriate certifications, and the like. Public recognition ratings may include reference to government and industry awards, and the like. In embodiments, high risk suppliers and high risk buyers may be identified, such as in association with individuals and organizations that work with high risk suppliers and high risk buyers. Country context ratings may be related to the country in which a supplier is located, as well as data supplied by the World Bank, International Monetary Fund, and other sources, about that country. Other sources may include GNI per capita, currency volatility, cost to export, political stability, credit_rank, export_cost, gci_efficiency_enhancers, and the like. A country context computation may include calculating a weighted sum of log(gni_per_capita), credit_rank, log (export_cost) and gci_efficiency_enhancers that may be then thresholded into final score buckets. The weights and thresholds used in the country context computation may have been determined using machine learning techniques (e.g. decision trees and principal component analysis) to determine the relevant features to weight, appropriate weights, and effective thresholds.

Generating ratings from raw scores may include a weighting, standardization or normalization factor applied to raw data to produce a standard score that may be centered on zero, and then normalized to a rating between 0 and 100. These values may then be applied to a scorecard 200 that presents the normalized data for a supplier. In embodiments, the ratings may be scaled linearly to provide a mean of approximately 50, as in a Gaussian distribution.

In addition, ratings may be customized to individual buyer preferences, such as by having buyer's rate suppliers with whom they have done business. Ratings may then be tuned to best match this empirical view of a buyer's preferences. Such an approach may use a machine learning technique such as a support vector machine. Over time, trends in ratings may then be captured and displayed to the buyer. Such trends may enable a graph-theory analysis (e.g., minimum cut, maximum flow, cliques, and the like) on buyer-supplier networks to determine the relationships between groups of buyers and suppliers, which may lead to additional value-added services such as improving production allocation for buyers.

Figure 3:
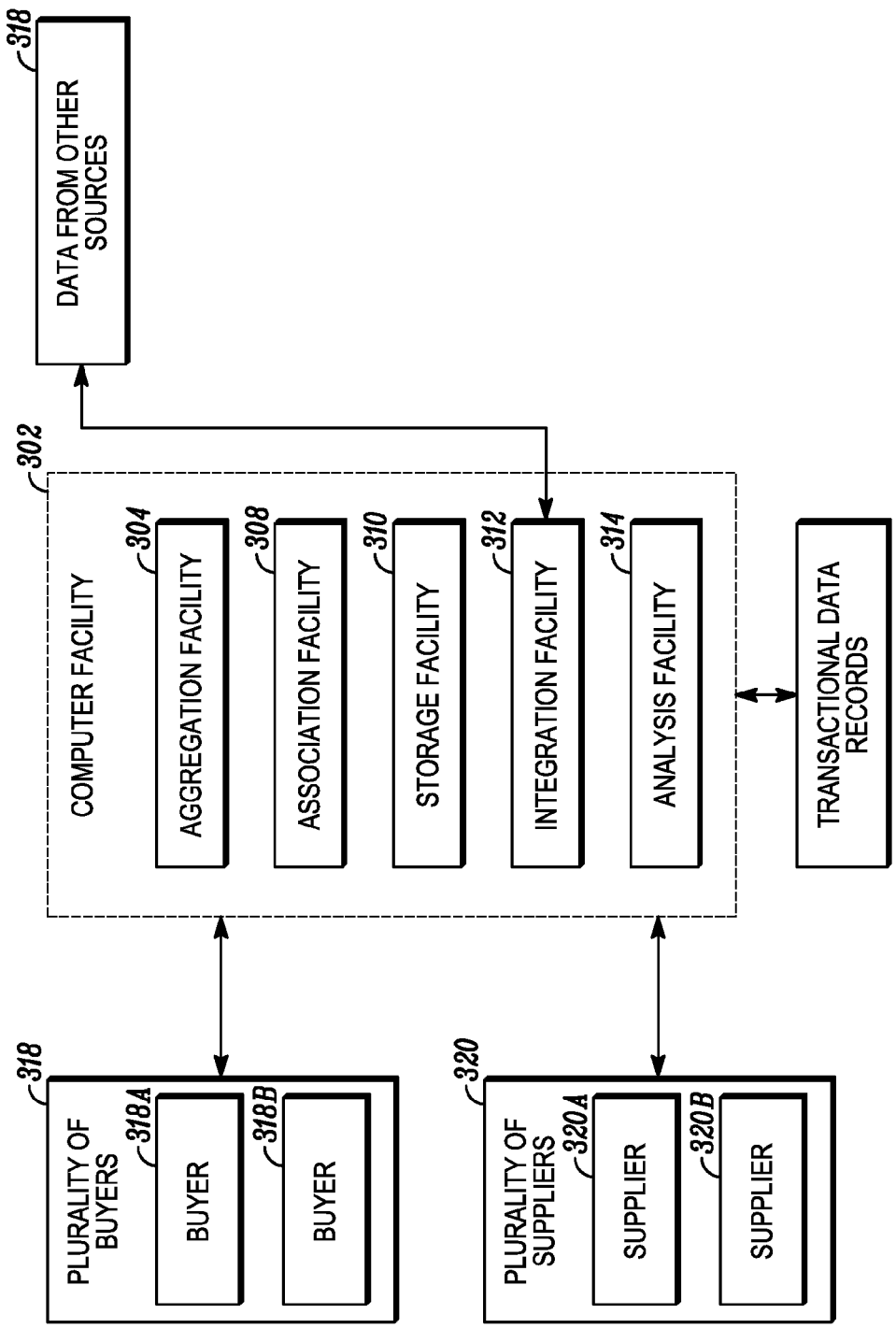
FIG. 3 depicts combining non-transaction data with transaction data in the platform.

Referring to FIG. 3, integration of transactional data with data from non-transactional data sources is shown. A computer facility 302 may receive transaction records associated with a plurality of buyers 318 such as 318A and 318B and/or a plurality of sellers 320 such as 320A and 320B. Furthermore, the computer facility 302 may include an aggregation facility 304, an association facility 308, a storage facility 310, an integration facility 312, an analysis facility 314, and the like. The aggregation facility 304 may collect and combine the transaction records associated with buyers 318 and suppliers 320 for processing at the association facility 308. The association facility 308 may enable association of transactions with different entities such as buyer 318A and supplier 320B. The association facility 308 may be coupled to any of the other facilities within the computer facility 302, such as the integration facility 312 which may receive non-transaction data from non-transaction sources 318. The analysis facility 314 may facilitate evaluation of suppliers 320 and buyers 318 based on the data integrated from other sources 318 and the data received from the association facility 308.

In embodiments, public records may include customs records apart from other records. The customs record may include information associated with an entity as captured by a customs organization. The information may be useful in identifying the different transactions associated with the entity's billing based on the entity's custom identification number.

Data sources may leverage data from several hundred data sources, such as, International Oeko-Tex Association, Social Accountability International, Worldwide Responsible Apparel Production (WRAP), Fifty-five ISO 9001 auditing firms, Forty-six ISO 14001 auditing firms, Forty-seven OHSAS 18001 auditing firms, Two GB/T 18885 auditing firms, United States Department of Homeland Security, Ministry of Commerce of the People's Republic of China, General Administration of Customs of the People's Republic of China, and the like. In embodiments, custom data may be from countries all over the world, covering exports and imports, where an import record may be matched up with an export record.

Tools used in the analysis of supplier and buyer data may include a merger tool, a suggestive merger tool, a buyer caliber tool, a buyer marketing tool, a name chooser tool, a country manager, an API, a product keyword manager tool, a statistics tool, a report generation tool, a supplier marketing tool, a name updater, and the like. Any of these tools may be embodied in the facilities of computer facility 302.

In embodiments, aggregated customs data may be processed to identify transactions associated with different types of entities such as buyers and/or suppliers. In addition, based on the transactions associated with different entities, an entity type may be determined from one or more entity types present in the transactions. In an example, an entity may supply woolen clothes and the transactions associated with the shipments of the woolen clothes may be recorded as being provided by 'ABC co'. In another transaction, the same entity may be recorded as 'ABC Company'. This variation may be due to a difference in recording of transactions of customs data due to variations in filling data in the customs form rather than the entities being different entities. A data merging facility may allow automatic merging of transaction records described above under a single entity based on the inference made on grounds of similarity of data. In this example, the variations 'ABC co' and 'ABC Company' may form a valid case of merging of data based on the minor variation in entity name. Alternatively to automatic merging, or in addition to it, suggestions for merging similar data based on similarity in data elements may be provided to a user. In the above example, records relating to transactions 'ABC co' and 'ABC Company' may be presented to the user with a suggestion to merge them under a single entity based on similarity of data elements. The similarity of data element in the records may be determined by the data merging facility. Based on the user's response, automatic merging of the two entity names may be learned by the platform.

An entity may be associated with one or more names for performing transactions that may be captured in customs records. As described above, the difference may be due to a variation in recording of the customs data. The systems and methods described herein may facilitate merging of any number of transactions that should be associated with a particular entity even though the records show a plurality of similar but varied entity names.

In addition to facilitating processing aggregated customs data so as to associate a set of transactions with an entity, a plurality of transactions that are properly associated with a plurality of entities may be merged under an entity type for purposes of evaluating the transactions and entities associated therewith. The merged records may be useful in evaluating a market segment, consortium of companies, industry segment, regional results, class of entities, and the like. In an example, transactions associated with several entities may be merged based on the basis of the transactions being associated with a single buyer. Even though the transactions call out different suppliers in different industries, the single buyer is a basis for processing the transactions as if they were merged.

An entity type may be defined based on any aspect of an entity that may be used to process customs transaction records. The methods and systems of filtering, classification, and clustering of transactions as described herein may be applied to identify transactions that are mergeable under an entity type. In an example, a buyer may initiate purchase transactions with four suppliers of components to produce an item. The transactions between any of the four suppliers and the common buyer can be merged (or tagged as mergeable) as having a common entity type such as "supplier to common buyer". Other suppliers who ship items to the common buyer may have their transactions with the common buyer merged under the same entity type.

Figure 4:
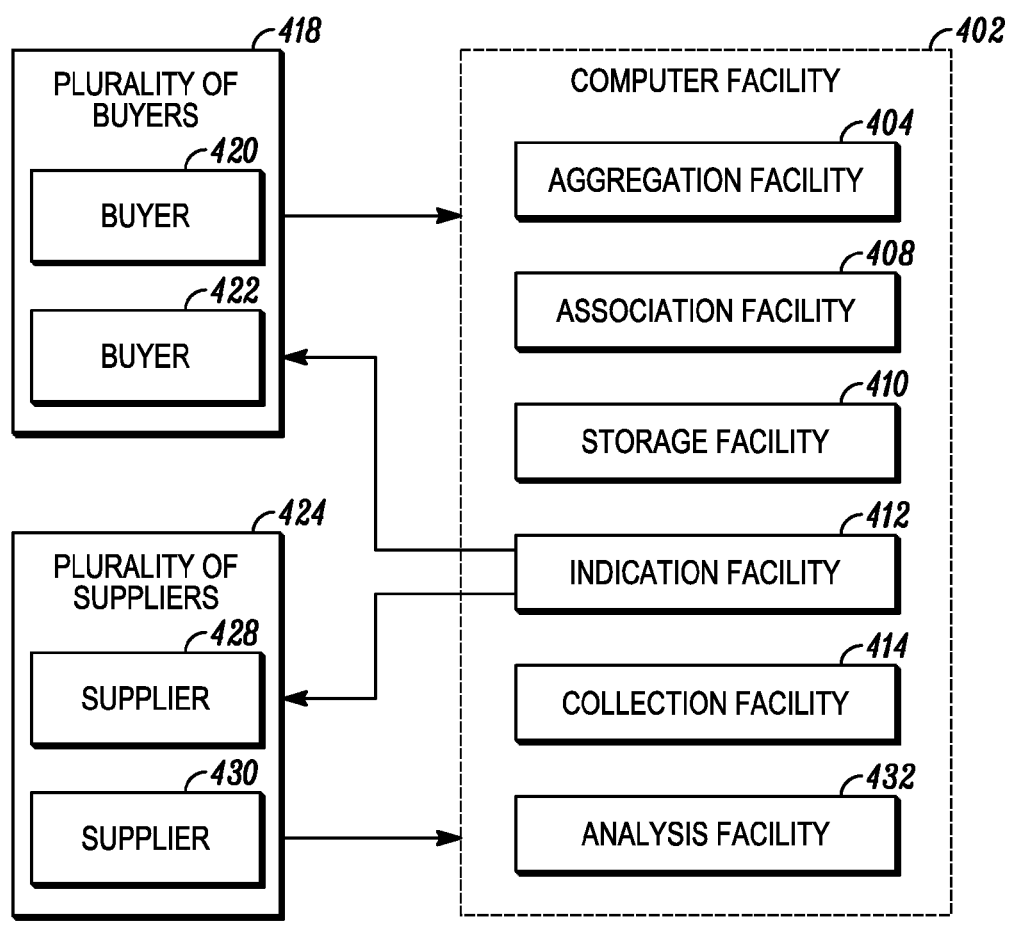
FIG. 4 depicts providing an indicator of economic leverage.

In many cases multiple data records exist for a single supplier, but the relationship of those records to that single supplier is ambiguous. In an example, the name of the supplier might appear in one field in one record, but in a completely different field in another record. This is often the case in customs data, where forms are filled out with information in various fields, notwithstanding the purported standardization of the forms. In embodiments, a merger tool may be used to merge data records of two apparent suppliers that should really be one supplier. The merger tool may evaluate an address, and if the same in two records, select a parent record and identify child records, upon which records are merged into a single record. In embodiments, a merger tool may merge records that are on the same page or more generally merge records across a database. In embodiments, a merger tool may use a pattern matching technique to identify potential candidates for merging of records As shown in FIG. 4, an indicator of economic leverage may be provided. The economic leverage may be based on an analysis of customs transactions data. The indication of the economic leverage may be provided by an indication facility 412 of the computer facility 402. The computer facility 402 may also include a collection facility 414, a storage facility 410, an aggregation facility 404, an association facility 408, and an indication facility 412. The collection facility 414 may collect a plurality of records of customs transactions of a plurality of buyers 418. In addition, the collection facility 414 may collect a plurality of records of customs transactions of a plurality of suppliers 424. In an example, the collection facility 414 may collect the record of customs transactions of buyer 420 and buyer 422. In addition, the collection facility 424 may collect the record of customs transactions of supplier 428 and supplier 430. The storage facility 410 may store the plurality of records of customs transactions of the plurality of suppliers 424 and the plurality of buyers 418. The aggregation facility 404 may aggregate the transactions. The association facility 408 may associate the transactions of the plurality of suppliers 424 and plurality of buyers 418. The association facility 408 may associate the transactions with entities. The entities may include, but may not be limited to, companies, buyers, sellers, suppliers, distributors, factories, subsidiaries of a supplier and the like. An analysis facility 432 may analyze the aggregated transactions. The indication facility 412 may provide an indication of economic leverage with respect to an entity based on an analysis of the aggregated transactions. In an example, the indication facility 412 may indicate to the buyer 420 that it would be economical to buy 40 tons of silk fabric from the supplier 428. Similarly, other economic indicators may be provided to the plurality of buyers 418 or the plurality of suppliers 424.

In embodiments, the indicator of economic leverage may be with respect to the supplier 428 based on transactional customs data for the supplier 428. In embodiments, the indicator of economic leverage may be with respect to a supplier 428 based on transactional customs data for a party other than the supplier 428. In embodiments, the indicator of economic leverage may be with respect to a buyer 420 based on transactional customs data for the buyer 420. In embodiments, the indicator 420 of economic leverage may be with respect to a buyer 420 based on transactional customs data for a party other than the buyer 420.

Figure 5:
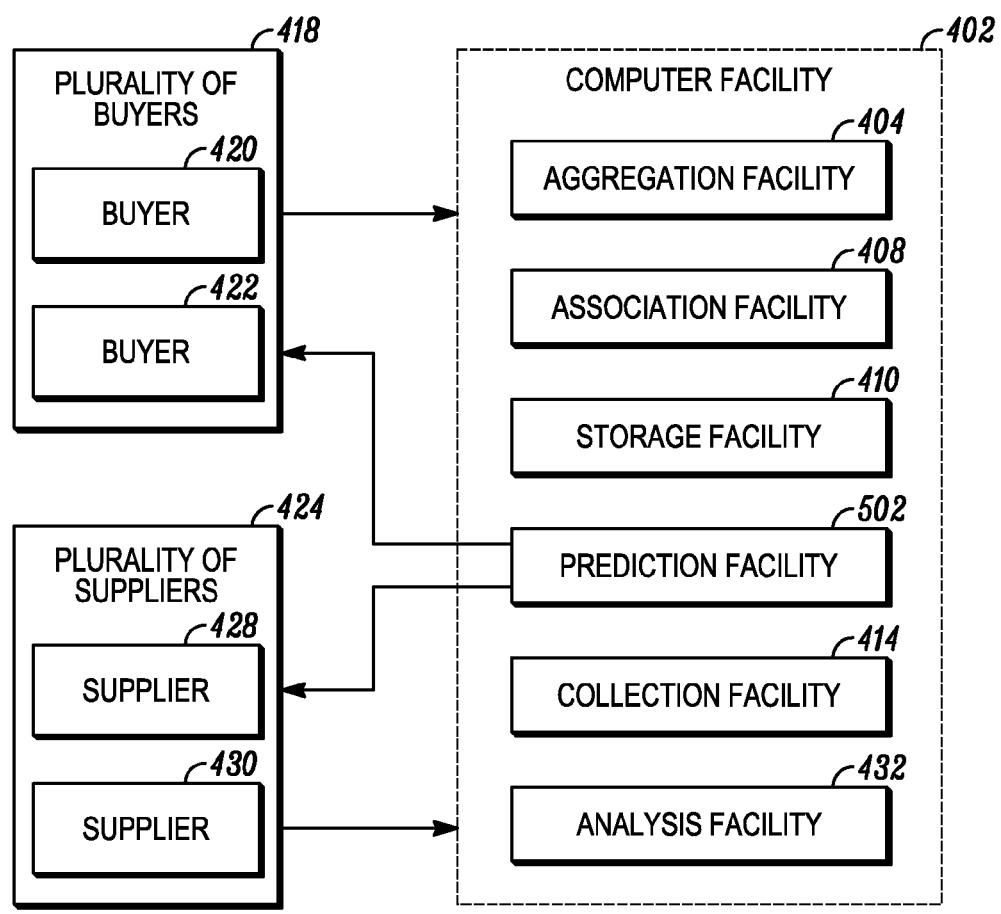
FIG. 5 depicts predicting an action based on customs transactions.

In embodiments, as shown in FIG. 5, a prediction facility 502 may predict an action of an entity. The action may be based on the analysis of the aggregated transactions. The prediction may relate to whether the supplier 428 will work with the buyer 420 of a given size. The prediction may also relate to whether the supplier 428 will work with orders of a given size.

In embodiments, the prediction may be of an action of the buyer 420 based on an analysis of customs data for the buyer 420 transactions. The prediction may be related to a price, a change in price, a change in supplier, a quantity ordered by the buyer 420 and the like. In embodiments, the prediction may be of a buyer action of based on an analysis of customs data for transactions by a party other than the buyer 420. In embodiments, the prediction may be of a supplier action based on an analysis of customs data for transactions by the buyer 420. In embodiments, the prediction may be of a supplier action based on an analysis of customs data for transactions by a party other than the buyer 420. In embodiments, the prediction may be related to a potential closure. The closure may be of a subsidiary, a factory, a company and the like. Those skilled in the art would appreciate that the prediction facility 502 may provide the predictions to the plurality of buyers 418, plurality of suppliers 424 or some other entities.

Figure 6:
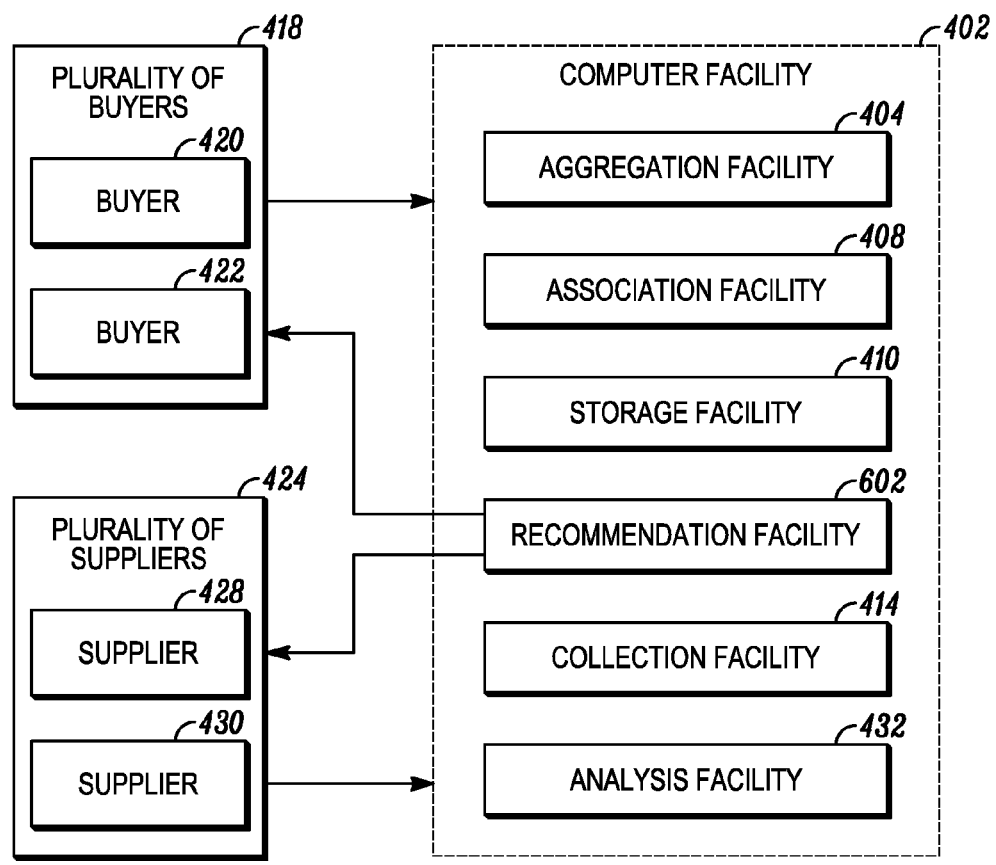
FIG. 6 depicts making a recommendation based on customs transaction analysis.

In embodiments, as shown in FIG. 6, a recommendation facility 602 may provide recommendations based on analysis of customs transactions. In an example, the recommendation facility 602 may recommend to the buyer 420 to buy 40 tons of silk fabric at a discounted price from the supplier 428 based on transaction records indicating that the supplier has received returns of the silk from buyers. Similar recommendations may be provided to the plurality of buyers 418 and to the plurality of suppliers 424.

In embodiments, the recommendation may be based on analysis of customs data for the buyer 420 transactions. In embodiments, the recommendation may be based on analysis of customs data for transactions by a party other than the buyer 420. In embodiments, the recommendation may be based on analysis of customs data for transactions by the buyer 420. In embodiments, the recommendation may be based on analysis of customs data for transactions by a party other than the buyer 420.

In embodiments, the recommendation may be based on prioritization of factors by a user. In an example, the buyer 420 may require 40 tons of silk within 4 days. The recommendation facility 602 may recommend buying 40 tons of silk from supplier 430 based on its manufacturing capacity of 50 tons per day and ability to provide the required silk within the stipulated time. In embodiments, the recommendation may be based on a user-specified rating factor.

In embodiments, a suggestive merger tool may use more sophisticated techniques to suggest which buyers or suppliers should be merged together, such as the supplier in question listed, then producing potential matches. Such techniques may use text similarity metrics on the name and the address and performing algorithmic steps such as sorting the tokens by alphabetical order, so word transpositions do not change lexical distance of names in pattern matching. Such techniques may determine how each word in a given buyer or supplier's name or buyer's name contributes to the uniqueness of the name, and uses this information to make relevant suggestions for merging. In embodiments, a suggestive merger tool may use a machine learning approach to perform pattern matching or otherwise suggest merger of records, such as a technique with boosted trees or other machine learning techniques.

A buyer caliber rating may be assigned manually by checking a box based on a facilitator's or host's assessment of the caliber of the buyer, or by automated techniques. In embodiments, a search link may be provided for each buyer, such as one that retrieves search results from a search engine, directory, rating system or other source of information about the buyer. In embodiments, an interface, such as an overall buyer manager, may assist suppliers in searching for different buyers.

In embodiments, a buyer marketing tool may break down data for a particular supplier, such as addresses (from customs data), raw customs records, records that show customer loyalty periods and switches to other suppliers, specific breakdowns of what the supplier has shipped (e.g. in terms of product category, material, technique, gender of the shipped garments, and the like), breakdowns of the size of the shipments the supplier has made, breakdowns of the number of shipments that the supplier has made each month over some time period, as to determine the estimated capacity of a supplier, and the estimated minimum shipment that a supplier is willing to produce. In an example, a tool may show a breakdown of suppliers (e.g. showing a number of suppliers, such as 35 suppliers in ratings for each), where it is possible to see a history of which suppliers buyers have used. This may allow marketers to evaluate their performance relative to other suppliers with whom they compete.

A country manager tool may be used to add data on countries (such as for the country context dimension of an overall rating 110 or analysis).

In embodiments, an application programming interface may be provided for the platform described herein, whereby other computer programs may access the reports generated by the platform, such as accessing overall ratings 110, specific components of ratings, results of particular algorithms, or data sources used in the platform. Thus, other parties that engage in global trade, such as clients of the facilitator and partners, may obtain access to the platform, allowing the ratings managed by the platform to become a standard measure by which suppliers are rated.

A product keyword manager tool may provide an ontology or hierarchy for a search interface, such as using graphs, charts, and the like. The manager may allow a facilitator to add or delete sub-categories to a category. Keywords associated with each of the categories may be useful for: (1) getting the data (allowing a user to scan through raw text of customs data, looking for these keywords, which is one way for the facilitator to know that a supplier has shipped something within a category; In an example, a search for infant clothing might search for all sub-categories, using words such as baby, infant, kiddy, kid, layette, maternity, newborn, toddler, and the like); and (2) using keywords for text entry into the search field (such as synonyms to get better search results). In an example, in a hierarchy of materials, there are sub-materials of materials, and each has keywords associated with it. In embodiments, a facilitator may engage in a process (manual or automatic) to generate key words, such as using glossaries that list all of the products and materials, with specific definitions. In embodiments, algorithms may be used to determine the market vertical (e.g., apparel supplier or electronics supplier, etc.) of a supplier based on the aggregate contents of all of its shipments. In embodiments, customs records may be utilized to identify what industry or vertical the material is in.

A statistics tool may assist in providing distributions of data. Thus, a facilitator may support statistical distributions for all dimensions of data analyzed by the methods and systems of the platform.

A bucket boundary check tool may assist in testing that suppliers that fall within specific rating "buckets" or bins (e.g., Excellent, Unproven, etc.) by showing suppliers that are at the high and low boundary of each bucket.

A report generation tool may automatically build PDF reports or reports in other output formats, such as PowerPoint, Excel, Word, and the like. The report generation tool can be used as an administrative tool, or as a tool to allow users or clients to build custom reports, such as ones that incorporate some or all of the data generated by the platform. In an example, a user may specify which supplier or suppliers the report should include. A report could be made vertical-specific, covering a number of suppliers in a vertical, such as a theme or characteristic grouping, or it could relate to standout suppliers (such as ones with high customer loyalty ratings, top amounts of experience, or the like). In embodiments, a user may turn on or off various sections. In embodiments, the end product of a report may be a link that allows the user to download the report (in PDF format or some other format) or which sends the report via email (in PDF format or some other format).

In embodiments, a buyer marketing tool may provide information about what product materials, product techniques, and the like particular buyers require from their suppliers. Such a tool may also provide information relating to how many shipments particular buyers imported over time, as well as the breakdown of shipment sizes.

Figure 7:
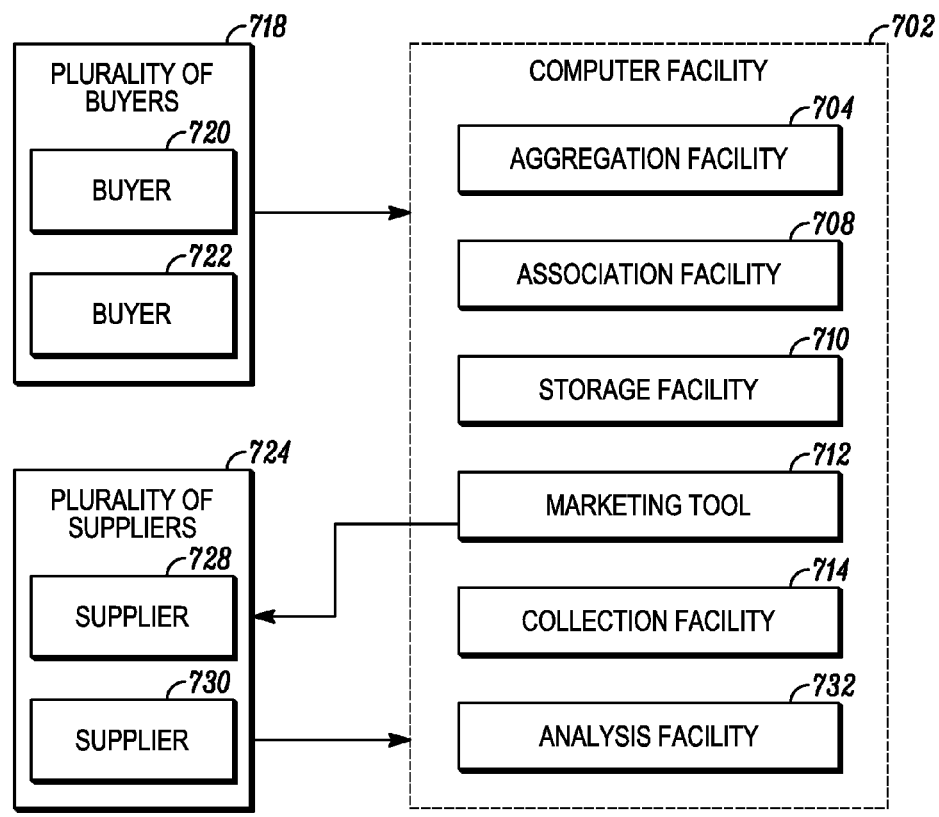
FIG. 7 depicts a marketing tool for a supplier
Figure 8:
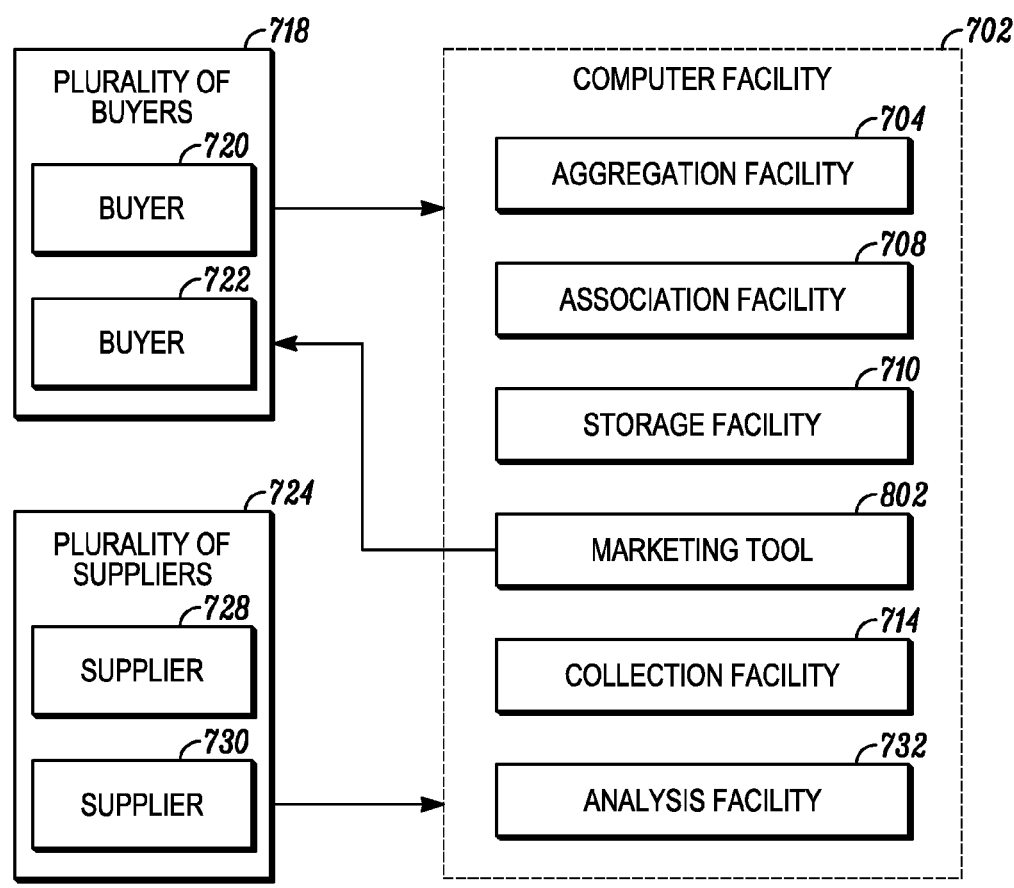
FIG. 8 depicts a marketing tool for a buyer

A marketing tool may be used by an operator of the platform to at least identify opportunities of marketing the products and services associated with the platform to suppliers, buyers, and others. The marketing tool can also be accessed by suppliers as shown in FIG. 7 and by buyers as depicted in FIG. 8. However, when used by the operator or owner of the platform or of an implementation of a portion of the platform, the marketing tool has significant capabilities. The marketing tool may work collaboratively with other elements of the platform, such as elements that perform aggregation, association, merging, storage, collection, analysis, user interface and the like. A marketing tool may be used to identify instances of potential scenarios (e.g. suppliers in financial distress) to offer entities that may be potentially impacted by the scenario instance (e.g. the supplier's shippers, buyers, suppliers of raw goods, and the like) with services and products available through the methods and systems described herein.

The marketing tool may also work cooperatively with a user interface to facilitate an operator entering parameters of marketing opportunity scenarios that the marketing tool can evaluate. The entered scenario parameters and attributes may be applied to an analysis of customs transaction data and marketing opportunities may be presented to the operator through the user interface.

As shown in FIG. 7, a marketing tool 712 may be provided for a supplier 728. The marketing tool 712 may be provided in a computer facility 702. As explained in the description for FIGS. 4, 5 and 6, the computer facility 702 may include a collection facility 714, a storage facility 710, an aggregation facility 704, and an association facility 708. The collection facility 714 may collect a plurality of public records of transactions among a plurality of buyers 718 and a plurality of suppliers 724. In an example, the collection facility 714 may collect the public records of transactions between buyer 720 and supplier 722. The storage facility 710 may store the plurality of public records of transactions among a plurality of buyers 718 and a plurality of suppliers 724. The aggregation facility 704 may aggregate the transactions. The association facility 708 may associate the transactions with various entities that may include, but may not be limited to companies, buyers, sellers, suppliers, distributors, factories, subsidiaries of a supplier and the like. An analysis facility 732 may analyze the aggregated transactions. The marketing tool 712 may suggest a marketing strategy for the supplier 728 based on analysis of transactional data from public records. In an example, the marketing tool 712 may suggest to the supplier 728 that it would be lucrative to sell 100 tons of silk fabric every week to the buyer 720 located in the United States of America. Those skilled in the art would appreciate that the marketing tool 712 may suggest marketing strategies to a plurality of suppliers 724 simultaneously.

As shown in FIG. 8, a marketing tool 802 for the buyer 720 may be provided. The marketing tool 802 may be provided in a computer facility 702. The marketing tool 802 may suggest a marketing strategy for the buyer 720 based on analysis of transactional data from public records. In an example, the marketing tool 802 may suggest to the buyer 720 that it would be lucrative to buy 50 tons of silk fabric on a monthly basis from the supplier 728 located in China. Those skilled in the art would appreciate that the marketing tool 802 may suggest marketing strategies to a plurality of buyers 718 simultaneously.

Processing customs transactions and other records may involve a multi-step method. Data from customs organizations, such as US Customs may be provided on a removable computer memory such as a CD, DVD, flash memory, memory stick, USB memory card, and any other type of removable or portable memory device. Alternatively the customs data may be acquired via a network, such as the Internet, a dialup connection, a virtual private network, a dedicated network, and the like. The data may also be converted from a proprietary format for further processing by the platform. Each customs organization, and within any customs organization for a particular country may have a different format or storage device for records. Conversion may be performed on the data so that the end result is independent of the physical format of delivery and the logical formatting of the information. In this way data in a substantially unified format may be processed by the methods and systems of supplier rating and the like that are herein disclosed. In an example, US customs data may be provided on a CD and may be in a COBOL format. The data on the CD may be retrieved and automatically loaded to a server. The server or another computing device may convert the data from the COBOL format to an XML format. The XML formatted data may be loaded to a database such as a Postgres database for further processing. In this example XML format represents a unified format for the customs data.

Processing the converted transaction data may include multiple steps of data analysis in which a confidence level may be applied. Confidence levels may be grouped into confidences bands that may help target each transaction toward one of merging (high confidence band), suggest human-aided merging (medium confidence band) and do not merge (low or lacking confidence band). Analysis of the transaction data may reveal important information about the entities involved in the transactions. In an example, a single entity may appear as a buyer in one transaction, a shipper in another and a supplier in a third. Ensuring that each transaction is properly associated with the entity as its intended function (buyer, shipper, and supplier) may be accomplished through various analysis and assessment techniques including, similarity assessment, filtering, classification, clustering, and the like.

Processing of customs data may also include text mining. Text mining may include searching for key words, terms, or phrases that are known, predetermined, or specified for the mining operation. An ontology of terms, such as 'gender dyeing' may be applied in text mining. In addition, synonyms of keywords may be mined. Text mining also facilitates populating reports with various data, such as time series data of shipments per month and weight of shipments per month.

Data may be further analyzed with a monitoring tool that may look for anomalies, such as peaks, and other statistical measures to identify potentially important events that are captured in the transactions. Analyzing data for peaks and the like may help with activating buyers, suppliers, shippers, and other entities for use in the platform. A statistical event, such as a spike in orders by a buyer that otherwise had little transaction history may trigger an indication that the buyer should be activated for use in ratings of buyers, suppliers, and the like. Alternatively, or in addition, an entity may be activated based on the transactions for the entity complying with criteria such as a shipment quantity threshold, and the like.

Merging data ensures that all records of transactions associated with an entity (buyer, supplier, or the like) are properly recorded against the correct entity. However, due to the large number of data sources, substantial variations in how an entity may be identified in records from the data sources, parent-subsidiary entity relationships, transaction system limitations (e.g. limiting the number of characters in an entity name), regional differences, dialect differences, use of short hand for entity information, various coding schemes used by buyers, suppliers, and the like proper merging of data is complex and difficult.

In a fundamental example, merging is taking two records for the same entity that each has entity information that varies substantially one from the other and ensuring that the records are properly recorded against the one entity rather than being assigned to two separate entities. A merger tool may provide robust, accurate, and efficient merging of data by resolving the variations, some of which are described above so that records for a single entity are merged, while ensuring that records for a different entity are kept separate from the single entity.

Within any given country, industry, region, or language there is no universal entity identifier that could be applied to the data records to uniquely identify which entity is associated with each transaction record. Also, with data records being provided by sources from many countries, in many industries, and across many languages the merging challenge is increased. A way to meet this challenge today is to perform processing of the text that is present in the records to determine which records should be merged under an entity. Various techniques of text association, filtering, character grouping, thesaurus lookup, machine learning, natural language processing, search-based comparison, classification, known entity matching, clustering, and the like may be applied to identify mergeable records. The complexity and challenge present in merging may require applying each technique in an intelligent way so that highly computation intensive processes such as classification are used appropriately.

One objective of merging is to take a set of input records and match them to entities that are already known to the platform, such as entities already included in an entity database or other database of the platform. When a match cannot be determined automatically with a sufficient confidence level, then information may be presented to an operator or user of the platform to make a final determination of the entity associated with the record(s).

The methods and techniques for identifying mergeable records may be programmed into a processing unit and run in a sequence that facilitates rapid and robust merging of records. At least three types of processing may be performed on records for merging assessment: filtering, classification, and clustering. Each processing type will be described now.

Because classification and clustering may be very expensive in terms of compute/processing time, filtering is applied to distinguish candidate records for classification from records that are unlikely to be mergeable under a single entity. Filtering provides various techniques to help identify only the records that classification may have any chance of merging. Filtering for the purposes of merging may be considered a coarse sort of the records, capturing candidates for classification and passing through those records that appear to be far removed from the captured records. Filtering may be performed by a variety of filter-type algorithms. In one example filtering may be performed by search engine software, such as the open source lucene search engine applied. In another example of filtering, sometimes referred to as "kgram filtering", several small consecutive strings of characters are captured from each of two records and compared. Kgram filtering may be based on techniques of dynamic programming. In an application of kgram filtering, when a sufficient number of the character strings match between the records, the records may be identified as potential candidates for further processing such as classification and clustering. One benefit to kgram filtering is that it offers the filter designer many options, such as allowing overlapping character strings, defining the length of each character string, determining the quantity of matching strings required to mark the record(s) as classification candidates. In this way, an entity name or entity identifying information (that may include entity name, logo, phone number, address, and the like) need not be an exact match, but instead needs enough matching character strings to exceed a kgram filter threshold. In an example, a kgram filter may compare overlapping character strings (kgram filter group) of 10 characters and may require that at least 10 of the character strings must match (kgram filter threshold) for the record to be identified as a potential candidate for classification and clustering. Because records received and processed by the platform may have information within certain fields that may be incorrectly placed there (a personal name in an entity name field) filtering can be used to quickly separate out records that are incorrect.

Another merge technique is called classification. Classification may be performed on any records, although records that have been identified by filtering as candidates for classification may yield faster and more robust classification results. Because records with non-matching entity information may be records of a single entity, classification uses text, language, mathematical, and other analysis techniques to identify a likelihood that two records are from the same entity. Classification includes a variety of techniques including canonical adaptation, specific cleanups, multi field comparison (name, address, phone number, etc), edit distance algorithms, vector generation, machine learning, decision tree, and the like.

In canonical adaptation, entity information in records is adapted to eliminate differences that should not impact classification. Differences such as abbreviations of words (rd. for road, ave for avenue, CA for California, and the like) can be normalized in the records. Punctuation and other characters that may have minor impact on a classification may be removed or marked to be ignored during various classification and clustering techniques. In addition to canonical adaptation targeted cleanups may be applied to further normalize the data. Cleanups may help to resolve deficiencies in the records such as an incorrect country of origin, which is a common deficiency. Cleanups may be based on information about the domain of the records to further enhance entity identification and merging. Cleanups may be based on geographic or regional knowledge, market verticals, industry norms, and the like. In an example, within a market vertical, variations of textile suppliers names may be applied to quickly align the various names to a normalized or canonical entity name; thereby reducing the degree of complexity that further classification techniques will have to deal with. The result may include less complex mathematical computation. Cleanups may be targeted at specific aspects of the records, such as entity names, city names, street names, phone numbers, and the like. Any number of these cleanups may be applied sequentially or in parallel to data records to improve mergability of the records.

To account for differences in data entry that may result in a very low classification score, classification techniques herein are applied to individual fields (entity name field, address field) as well as to combinations of fields (entity name+address field) so that a record with an entity name in an address field can still be identified as mergeable with other records that have the address in the address field.

Data that has been cleaned or adapted as described above and elsewhere herein may be processed through edit distance metric algorithms such as Wagner-Fischer, Levenshtein, Jaro-Winkler, and the like. The result of which may be a complex vector of numbers that represent dimensions of similarity associated with the various classification techniques applied. The vectors of similarity may be based on other classification and text analysis techniques as may be know to those skilled in the art. All such classification and analysis techniques may be applied to the records by the platform and are included herein.

Machine learning and other artificial intelligence techniques may be applied to determine if similarity vectors of pairs of records identify records that can be merged under a common entity. Through the use of training vectors, and decision tree logic, record mergability may be further assessed and a measure of such mergability may be made available to clustering techniques. The result may include an identification of pair-wise matches among all of the classification candidate records.

Training vectors may be derived from transaction data. A set of transactions may be identified as a training set that may be useful in establishing prediction parameters for associating shipments with attributes such as a type of entity, type of supplier, type of product, product feature or attribute, type of material, and the like. A training set may also be useful for facilitating association of a shipment with an entity by enabling development of prediction parameters that may be used therefore. By identifying candidate relationships between shipments and attributes or entities, training sets of transaction records may reduce the computational load required for comprehensively filtering, classifying and clustering. In an example, a record may be presented to a processing facility such as an analysis facility J32. The processing facility may select prediction parameters based on one or more data fields in the record. Certain fields in the transaction record may be compared to a portion of the prediction parameters to predict an entity to associate to a transaction record.

Prediction of an attribute associated with a transaction or customs record may be useful for rolled up, aggregated, or otherwise cumulative transaction data. Because transaction records may be individual shipment records, aggregated transaction records, rolled up or summarized transaction data, and the like, predicting an attribute that may be associated with rolled up transactions may allow the platform to gain significant benefit from otherwise non-specific data. In an example, US customs records may record each shipment from China as an individual customs transaction record but the transactions may not identify the supplier, just the shipper and buyer. However, China may only provide a rolled up transaction that cumulates similar shipments over a period of time, such as a calendar month. The rolled-up transaction data from China may have some data elements that distinguish it partially, such as a product identifier, source region, shipper, supplier, and the like. The US customs transaction data for a calendar month may be used to identify prediction parameters that may be applied to the China transaction data to predict the supplier. When US customs training set data such as shipment quantity, shipper, and the like are applied to the China data, a supplier may be predicted for the rolled up China transaction data.

An objective of clustering is to cluster as many data records that should be merged under a common entity as possible. Clustering may result in all of the variations of one entity being identified as one entity. A technique for clustering that may be applied is referred to herein as p-percent clustering. In p-percent clustering, a pair match threshold is established and any record that matches at least the threshold percent of records in any given cluster will be added to the cluster. In this way, although pair-wise matching identifies all pairs of matched records, clustering allows records that do not all match each other to form a cluster. In an example, if a p-percent threshold is 25% then any record that pair-wise matches at least 25% of cluster members may be added to the cluster. In an embodiment, dynamic p-percent may allow dynamic adjustment of p-percent based on an aspect of the cluster, records, and the like. In an example, p-percent may be set low for a small cluster and may be increased for a large cluster. P-percent clustering ensures that records that have strong matches to some of the members of the cluster can be properly included in the cluster. P-percent offers significant advantages over single dimension (single link) clustering techniques.

Filtering, classification, and clustering are important and facilitate merging of intra data source records (e.g. new transactions for an existing company) as well as external data source records (e.g. US to China customs data records). Also these techniques may be useful in classifying entities into industries or markets.

Industry or vertical classification may be accomplished by using data associated with a shipping record and/or other data sources to determine which industry an entity (buyer, supplier) is associated with. As described above, machine learning techniques such as decision trees can be used to classify individual data records.

The customs transaction data can be mined to automatically build training data for vertical classification. Standardized codes such as the Harmonic Tariff System (HTS) codes embedded in the free text commodity fields can be extracted and used to determine a vertical associated with a record. Along with the HTS code text in the commodity field maybe mined to train a vertical classifier facility. The vertical classifier facility can then be used to predict or determine a vertical classification of customs records. In an example, a commodity field of a record may be "HTS 6209180 Red cotton pants".—The extracted HTS code 6209180 may be determined to be associated with a garments industry vertical. The extracted label "red cotton pants" may be recognized as apparel in our training data. If "red cotton pants" is not recognized, then it can be added to the apparel training data. Generally only a small fraction of customs data has HTS codes; therefore training a classifier and applying the trained commodity entries to new records may facilitate classification of the remainder of the transaction record. Because the vertical classifier may be a self-learning facility, each new record processed by the classifier can enhance the vertical classifier ability to classify new records. In addition, hand-labeling of records may be used to improve the vertical classifier training data.

In embodiments, a name updater may provide tools to clean the name of a supplier or buyer, such as making commas, periods, capitalization of acronyms, fixing common misspellings, making common abbreviations, and the like consistent. This may be an automated process of cleaning up those names, as well as a manual interface to go through groups of names by glancing at them.

Figure 9:
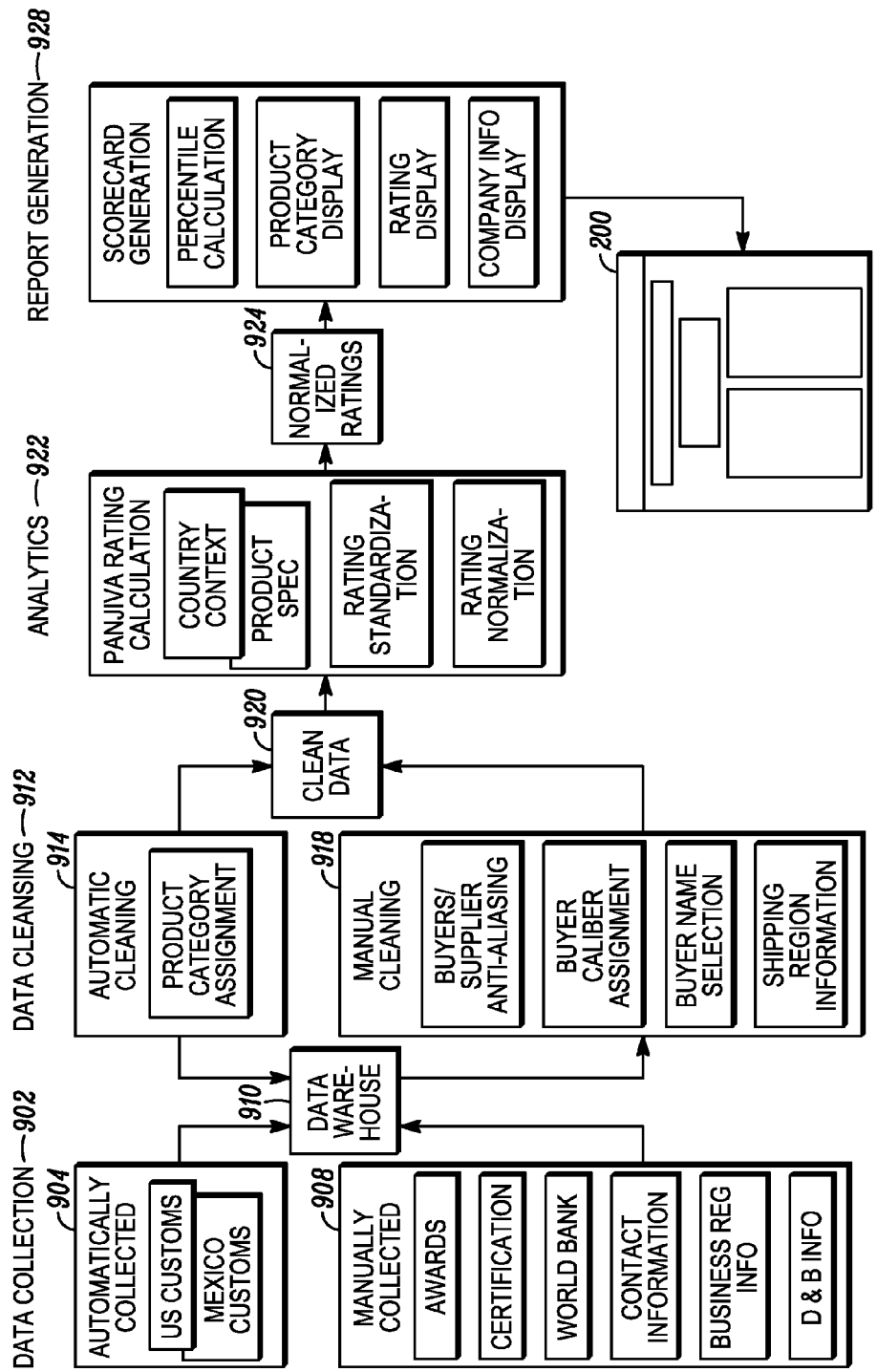
FIG. 9 depicts a flow diagram for an overall analysis methodology for rating suppliers.

FIG. 9 depicts a flow diagram for an overall analysis methodology for rating suppliers. Data may be collected 902, automatically 904 or manually 908 from a variety of sources, such as customs data from databases of United States customs transactions (or similar databases for other jurisdictions), sources of data regarding awards, certifications, and the like, databases of banking organizations, such as the World Bank, databases of contact information (such as yellow pages, white pages and other business databases), data sources with business registration information, such as containing information about formation of corporations, limited liability companies, partnerships and other entities, data sources with information about qualification to do business in various jurisdictions, data sources relating to business licenses and other licensing activities, and data sources relating to various substantive characteristics of a business, such as Dunn and Bradstreet data, data regarding corporate records, data with securities filings and similar information, data from securities analysts, and various other sources. Such data may be brought into a data warehouse 910, which may be a data mart or similar facility for handling data from disparate sources. Once brought into the warehouse 910, data may be cleansed 912 by a variety of automatic cleaning 914 or manual cleaning 918 processes, such as by automatically assigning a product category to data records associated with a supplier, based on pattern matching or similar techniques, such as machine learning techniques, as well as undertaking steps of anti-aliasing, assigning a caliber rating to the buyer (such as associated with a transactional record), selecting or declaring a name for a buyer (such as when a record has names for more than one party), and assigning a geographic region of shipping. Other data cleansing steps may be undertaken as would be understood by those with familiarity with data handling and manipulation. Once clean, clean data 920 may be delivered to an analytics facility 922 for analysis according to various methods described throughout this disclosure, including population of modules for calculating, based on data from the records derived from the data sources, the various ratings described herein, including the overall ratings 110 and various component ratings. The analytics facility 922 may determine a country context, a degree of product specialization, a measure of buyer loyalty, a buyer rating, or other rating. In the analytics facility ratings may be standardized, normalized or weighted, and an overall rating 110 may be calculated. Once normalized ratings 924 are generated by the analytics facility 922, ratings may be used to generate reports 928, such as an overall scorecard 200 with various constituent ratings as disclosed throughout this disclosure. Report generation 928 may also involve developing and presenting percentile calculations, product categories, ratings, and company information.

Weights may be applied to rating algorithms, data, and the like in the methods and systems disclosed herein. Weights may be applied in the process of determining ratings so that certain factors that affect a rating may have a greater impact on a rating than other factors. Weights may also be variable and may be based on a combination of factors. Weights may be applied based on a timeliness of data. Timeliness of data may be important to be weighted because, for instance, very new data may not yet be verified or old data may no longer represent a buyer-supplier relationship. Weighting of data may also be important because some data may be of suspect quality independent of age, data may not have a high degree of relevance to a rating, and many other data quality related factors. In this way, weights may be given in the rating process based on timeliness of data, size of transaction, quality of the transacting parties, prior rating of a transacting party or entity, relevance of the data. Weighting factors may be based on human-aided assessment of an entity, financial health of an entity, and the like.

An overall rating 110 of a supplier or buyer may be a combination of sub-ratings such as rating associated with amount of experience, certification dimensions, county context, business metrics, customer loyalty, and the like. An overall rating 110 and any sub-rating may be weighted, normalized, and curve fitted to ensure the rating is providing a consistent reliable measure of a supplier, buyer, and the like. Additionally, the weighting may be customer specified to enable a customer to identify portions of the ratings that are most important.

One sub-rating metric is customer loyalty. Determining a customer loyalty rating for a supplier is computationally intense and algorithmically rich because it measures how well a supplier is at keeping customers, or how well a buyer sticks with a supplier. In some industries, such as in apparel, it is quite common for buyers to change almost half of their suppliers every year. Understanding the factors that determine how this activity impacts customer loyalty is a key benefit of the present invention.

Customer loyalty may be determined by looking at individual buyer-supplier pairs. One technique to determine a customer loyalty rating for a supplier is to determine a customer loyalty rating for each buyer (customer) of that supplier and then combine the individual ratings. Factors that may impact customer loyalty include, a buyer buying pattern, buying frequency, number of purchases, time since first purchase, and the like. Each transaction can be analyzed to determine if the buyer is buying from a second supplier and if the purchase is for an item that was previously purchased from a first supplier. In this situation, customer loyalty of the first supplier is compromised. However, simply measuring transactions may not provide a quality measure of customer loyalty. Factors such as if the first supplier has stopped selling the item that the buyer is now buying from the second supplier are important to include.

Transaction data may often only be available as free text data (UPC and other codes may not be included in the records). Therefore the text processing, normalization, and canonical adaptation techniques described herein may be beneficially applied to determining a customer loyalty rating for a supplier. Certain aspects of buyer-supplier relationships may have greater importance than others so exponential weighting on some dimensions may be useful. In an example, a longer relationship of fewer transactions may be more important than a large number of transactions over a shorter duration. Factors included in a customer loyalty calculation include duration of relationship, count of orders/shipments, the weight of each order/shipment (determines size/value of shipment), and the like. In an example if a buyer buys the same item from two suppliers and consolidates orders to just one of the two suppliers, a customer loyalty rating of the other supplier may be significantly impacted because of the known cutoff in the supplier-buyer relationship.

For merging records, determining an overall rating 110, and other activities and results associated with the platform, determining parent-subsidiary relationships may be important. In addition to parent-subsidiary relationships, other relationships may be important in determining overall rating 110, customer loyalty rating, and the like. A buyer that switches from one subsidiary to another subsidiary under a single parent may have little impact on the parent rating, but may have significant impact on the subsidiary rating.

An aspect of the platform that facilitates determining parent-subsidiary relationships may use various sources of information such as business records from Dunn and Bradstreet, web news feeds, search engine results of business news sites, crawling of supplier web sites, press releases of suppliers, and the like. An acquisition of a subsidiary by a parent may be identified through one or more of these data sources and the parent-subsidiary relationship may be factored into overall rating, customer loyalty rating, merging, and the like. Parent-subsidiary relationships may also be determined based on predetermined heuristics such as same city—similar name, same buyer—similar name, and other heuristic combinations of customs data record elements. Parent-subsidiary relationships can be determined for suppliers and for buyers.

FIG. 10 depicts fields that are derived from customs data associated with supply transactions. The records depicted in FIG. 10 may comprise a portion of a buyer record of customs data 1000. Note that information that may be associated with a buyer's identity may reside in various fields. FIG. 10 further illustrates fields from customs records 1002. A buyer record of customs data 1000 may include, without limitation, fields such as shipper 1004A, consignee 1004B, notify_party 1004C, also_notify 1004D, weight 1004E, quantity 1004F, BL number 1004G, country 1004H, data 1004I, commodity 1004J, and HS code 1004K. Certain fields may facilitate identification of possible buyers based on information contained one or more fields; these fields may be referred to as buyer identity candidate fields 1008. In an example, one way of identifying a buyer may be by using the consignee 1004B. In another example, notify_party 1004C may be used to identify the buyer. In yet another example, also_notify 1004D may be used to identify the buyer. The buyer identity candidate fields 1008 may be combined in various ways to facilitate identifying a buyer.

Referring to FIG. 11 depicts a plurality of customs records with details that are relevant to buyer and supplier identification and for merging customs records while avoiding duplication in counting the same transaction as a result of it being characterized in different records. Records 1102 and 1104 record the same Shipper 1004A "Shanghai Bada Textile", Consignee 1004B "No Fear Inc.", and HS Code 1004K "621143". However the date 1004I is different for each record indicating that while the records may be associated with the same buyer and supplier they are not duplicate entries. Record 1108 records the same shipper 1004A as records 1102 and 1104. It also records a buyer that may be the same as the buyer of records 1102 and 1104 through the data in the also_notify 1004D field "No Fear". Therefore, it may be appropriate to conclude that the buyer and seller of record 1108 is the same as those in records 1102 and 1104. However, because the HS code 1004K "621149" is not the same, record 1108 is not a duplicate of 1102 or 1104. Record 1110 records a potential buyer in consignee 1004B "No Fear" that may be the same as the buyer in records 1102, 1104, and 1108. However, because the shipper 1004A "Guangzhou Textile Co" may be identified as a different supplier than the shipper in records 1108, 1104, and 1108, it may be readily determined that record 1110 is not only not a duplicate of 1102, 1104, and 1108, but it also identifies a different supplier-buyer relationship.

Figure 12:
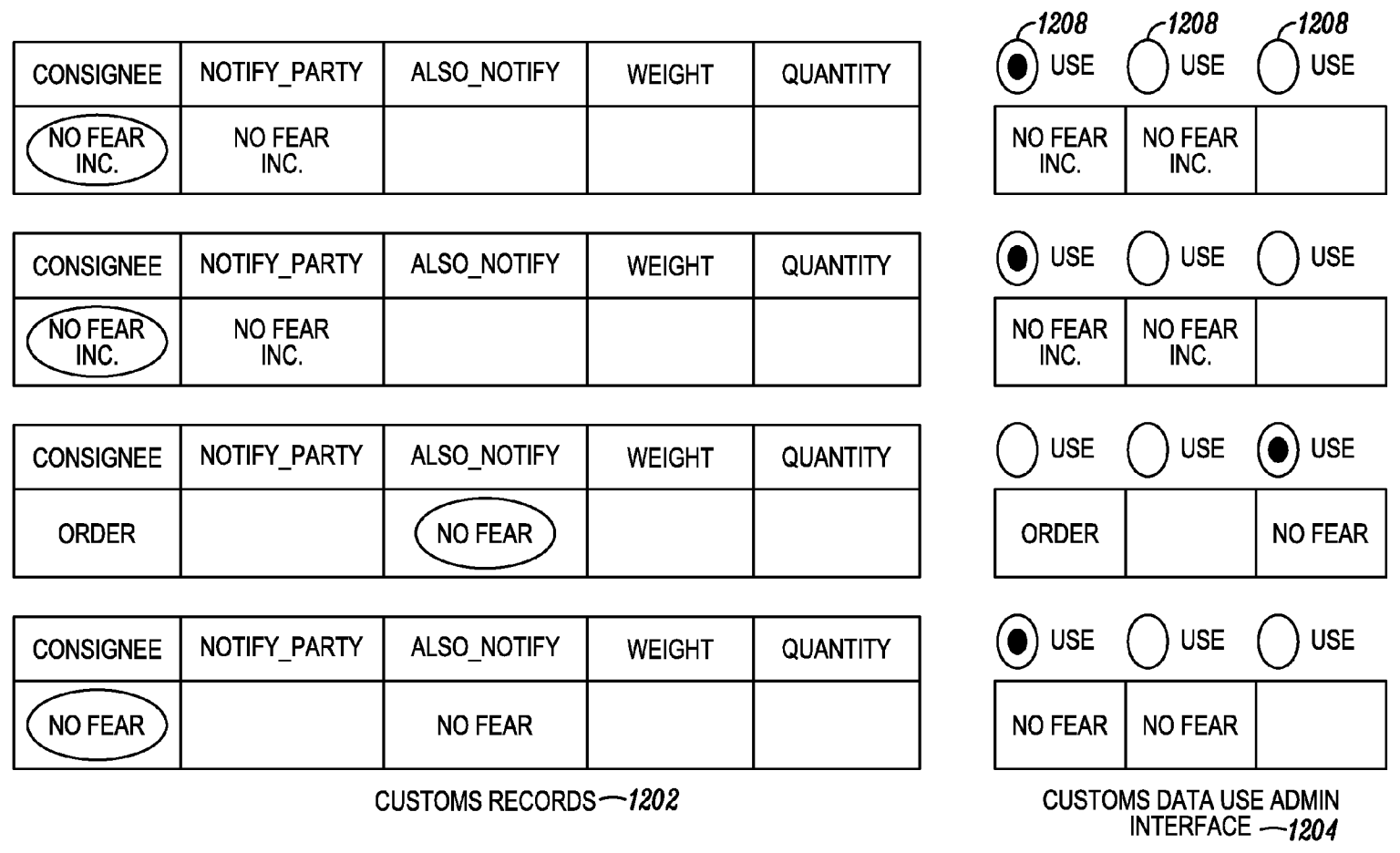

Referring to FIG. 12, a customs data user interface 1204 that may facilitate selecting among a plurality of potential buyer names that are provided in customs records 1202. The interface 1204 may include one or more buyer name use buttons 1208 or some other type of selection means for selecting which field in each of the customs records 1202 represents a buyer name. As described in reference to FIG. 10, buyer identity candidate fields 1008 may include consignee 1004B, the notify_party 1004C, and the also_notify 1004D fields. The buyer name use buttons 1208 may be associated with each field in the buyer identity candidate fields 1008 so that an operator of the platform may signal which buyer identity data item associated with each customs record 1202 should be used for merging, de-duplication, and other actions within the platform. The customs data user interface 1204 is only exemplary and other arrangements of buttons, data fields, and the like, as well as various presentations of the data before and after selection are possible and herein included.

A name chooser tool, such as the one described above and depicted in FIG. 12 may assist with identifying a buyer name or supplier name in a record. The tool may allow a user to manually identify a buyer, seller, shipper, and the like for each transaction records. As described herein, there may be automated processes to deal with entity identification in transaction records. Automated or manual processes use key words like "logistics," "trading company," and "shipping company" to distinguish shippers from buyers or suppliers.

Figure 13:
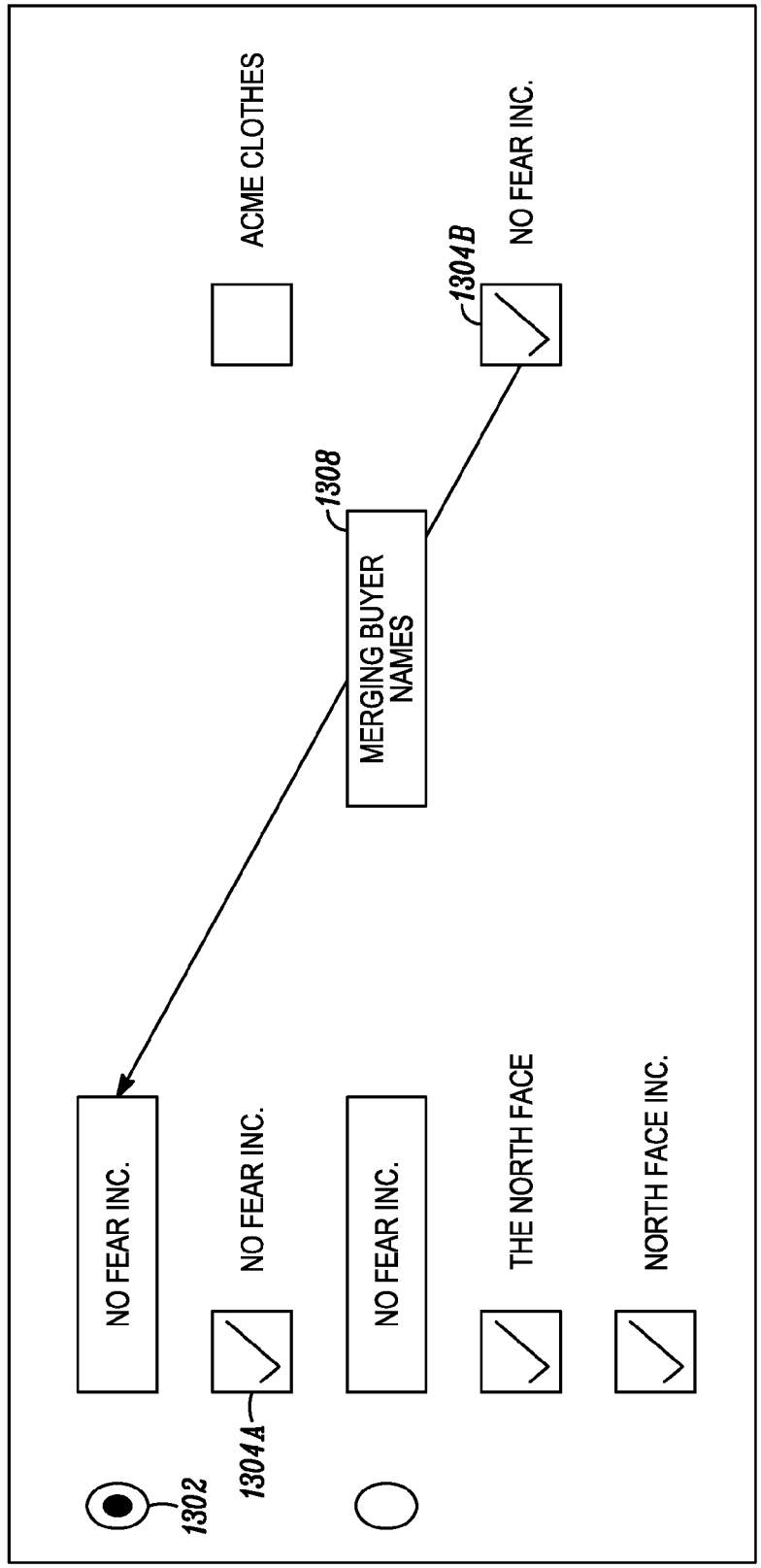
FIG. 13 depicts mapping variations of buyer names to a primary buyer.

Referring to FIG. 13, a GUI 1300 depicting configuring merging parameters to guide automatic merging of variations in buyer name is shown. An option button 1302 allows selection of the consignee 1004B. In addition, the variation to the consignee 1004B may be listed below the option button along with check box 1304A enabling selection of one or more variations to the consignee names 1004B. Another set of check boxes 1304B listing the different variations to the consignee names 1004B may be provided on the right side of the GUI. Selection of the option button 1302, the check box 1304A and the check box 1304B may facilitate merging of supplier names on initialization. In an example, the option button corresponding to No Fear Inc. may be selected along with the check box showing No Fear Inc. Subsequently, the variation in the names of the buyer can be merged.

Figure 14:
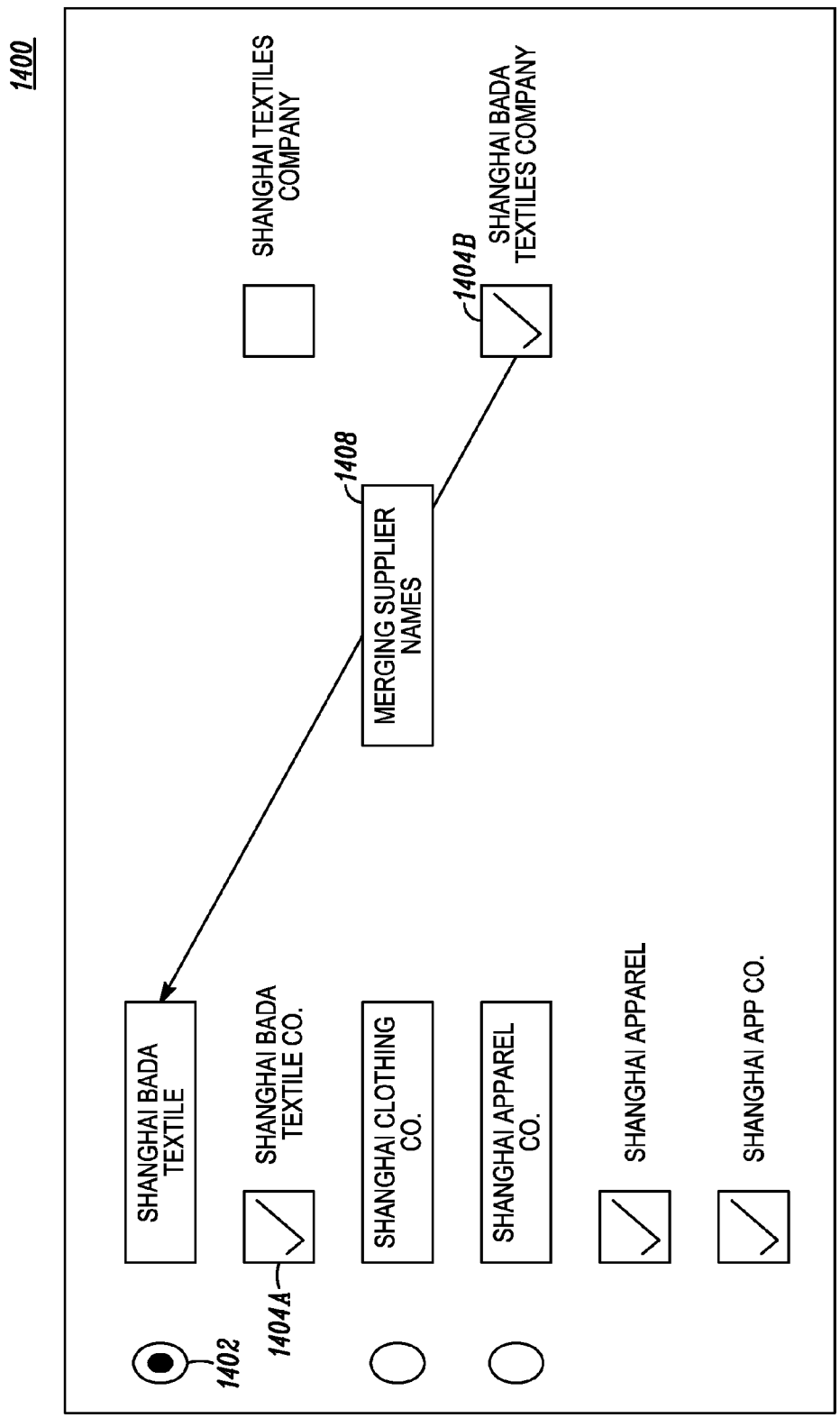
FIG. 14 depicts mapping variations of buyer names to a primary seller.

Referring to FIG. 14, a GUI 1400 depicting configuring merging parameters to guide automatic merging of variations in supplier name is shown. An option button 1402 allows selection of the consignee 1004B. In addition, the variation to the consignee 1004B may be listed below the option button along with check boxes 1404A enabling selection of one or more variations to the consignee names 1004B. Another set of check boxes 1404B listing the different variations to the consignee names 1004B may be provided on the right side of the GUI. Selection of the option button 1402, the check box 1404A and the check box 1404B may facilitate merging of supplier names on initialization. In an example, the option button corresponding to Shanghai Bada Textile may be selected along with the check box showing Shanghai Bada Textile Co. Subsequently, the variation in the names of the buyer can be merged.

FIG. 15 depicts identifying factors relevant to assessing buyer loyalty from transaction records. After a series of transactions 1502, 1504, 1508 with one supplier, a subsequent transaction 1510 indicates that the buyer may have switched to another supplier for a similar product. Thus, an initial loyalty period represented by transaction 1502, 1504, and 1508 can be calculated, the duration of which may be the time between the first order 1502 and the last order 1508 of a product from the supplier. A switch to another supplier may terminate the loyalty period. Also the switch itself may be considered one indicator of the quality of the suppliers (in particular suggesting higher quality for the new supplier and lower quality for the old supplier). In an embodiment, a negative factor may be attributed in rating the former supplier as a result of the switch, which may balance, or even outweigh, the positive factor associated with the previous loyalty period.

FIG. 16 depicts using transaction data that may be indicative of a supplier's degree of specialization. Customs data 1602 may include an HS Code field 1004K that may provide an indication of supplier specialization by looking at the range of values in the HS Code field 1004K for transactions records associated with a specific supplier. A larger number of categories may suggest less specialization, while a smaller number of categories suggest more specialization.

FIG. 17 depicts steps for obtaining data indicative of a supplier's degree of experience. A number of units shipped, a number of orders, and a duration over which products are shipped may be factors in determining an experience rating. Data from individual customs transaction records 1702 may be aggregated and processed to determine experience factors. In an example from FIG. 17, a duration factor of expertise may be calculated by determining the number of days between the first shipment (Jan. 2, 2005) and the last or current shipment (Mar. 8, 2005). Expertise may be in terms of how much of each product type a supplier has shipped, such that users may better determine what suppliers have their greatest experience, their least experience, and the like.

FIG. 18 depicts customs data record fields 1802 that may affect a supplier's rating based on the quality of the buyers served by the supplier. A buyer may be identified in the customs data record fields 1802 through the consignee 1004B field, the also_notify 1004D field, or a combination thereof. A caliber of the identified buyer may be determined manually, such as by a facilitator, or by an algorithm based on various attributes, such as size of business, number of employees, presence on a stock market, profitability, knowledge of brand among customers, surveys or ratings by third parties, awards, certifications, or a range of other measures. The caliber may be stored by the platform in association with other information about the buyer. Alternatively, the caliber may be calculated from stored and retrieved information as described above. The platform may calculate the caliber, a portion of the caliber, or may be provided with the caliber through an interface, such as a network interface.

FIG. 19 depicts a portion of a summary report 1900 showing top suppliers including rating 1904 of the supplier, name of the supplier 1908, supplier's location 1910 and reference details 1912. The summary may be for an industry or product category, such as women's apparel (e.g. blouses, skirts, dresses and the like). In one embodiment, a company may give an overall rating 110 within a given category of suppliers for one of the products, i.e., women's blouses. Further, the top suppliers of this category (such as the top 50 suppliers) may be listed even though less than 50 suppliers are shown in the embodiment of FIG. 19. The report 1900 may include a greater or lesser number of top suppliers. Also the report 1900 may include an executive summary portion that provides guidance using the summary. The ratings 1904 may be accorded to the suppliers based on a plurality of factors such as timely supply, quality, pricing of the product and the like. Each rating 1904 may be scaled on a normalized scale, such as a one hundred point scale, with particular ratings depicted graphically, such as in a bar graph, to make it easier to see the relative performance of the supplier in that category of rating. The ratings 1904 may also be depicted as qualitative labels such as "Excellent", "Good", "Fair", and the like. The supplier information, in context of the overall rating, may be provided in one or more sections of the detailed report.

FIG. 20 depicts a report 2000 showing standout suppliers (e.g. for a particular product), including suppliers with the highest customer loyalty and suppliers with the deepest experience in shipping to the buyer's jurisdiction. The stand-out supplier report 2000 may include a table 2002A of top suppliers with the highest customer loyalty, and a separate table of most experienced shippers 2002B. Each table 2002A and 2002B may include a plurality of columns related to the supplier's information; in an example, loyalty rating 2004A, experience rating, 2004B supplier name 2008, location 2010, and details 2012 of the supplier. In the present illustration, table 2002A may include the top five suppliers that have the best customer loyalty. Table 2002B may list the top suppliers with the most experience in shipping to the U.S. In the present illustration, a list is provided for top four suppliers that may have the maximum experience in shipping with their corresponding customers in the United States.

Figure 21:
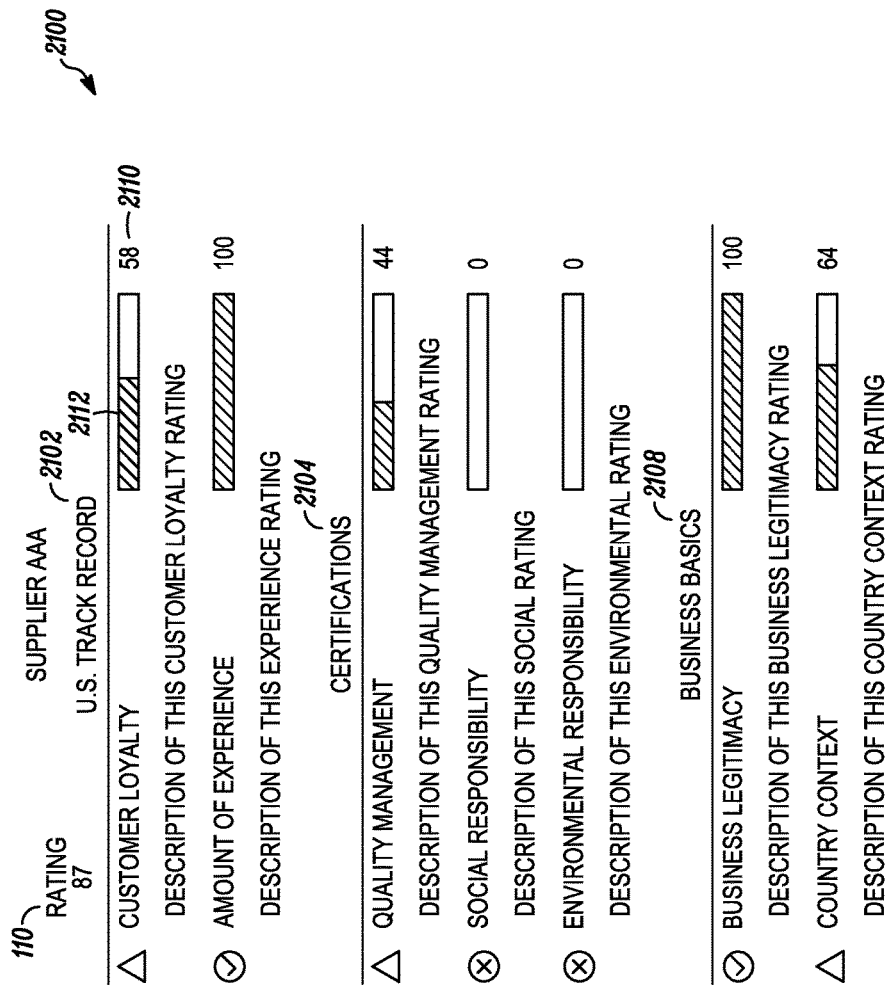
FIG. 21 shows a detailed report with ratings of a supplier overall and according to various dimensions of quality.

FIG. 21 shows an exemplary detailed report 2100 that breaks down the overall rating 110 according to various dimensions of quality. In the example detailed report 2100, dimensions of quality may be grouped into performance aspects 2102 such as track record that may include customer loyalty, amount of experience and the like; certifications 2104 that may include quality management, social responsibility, and environmental responsibility; and business basics 2108 that may include business legitimacy and country context. Each rating may be scaled on a normalized scale, such as a one hundred point scale 2110, with particular ratings depicted graphically, such as in a bar graph 2112, to make it easier to compare the supplier performance in each dimension to each other dimension. Ratings may alternatively be depicted as qualitative labels such as "Excellent", "Good", "Fair", and the like.

Figure 22A:
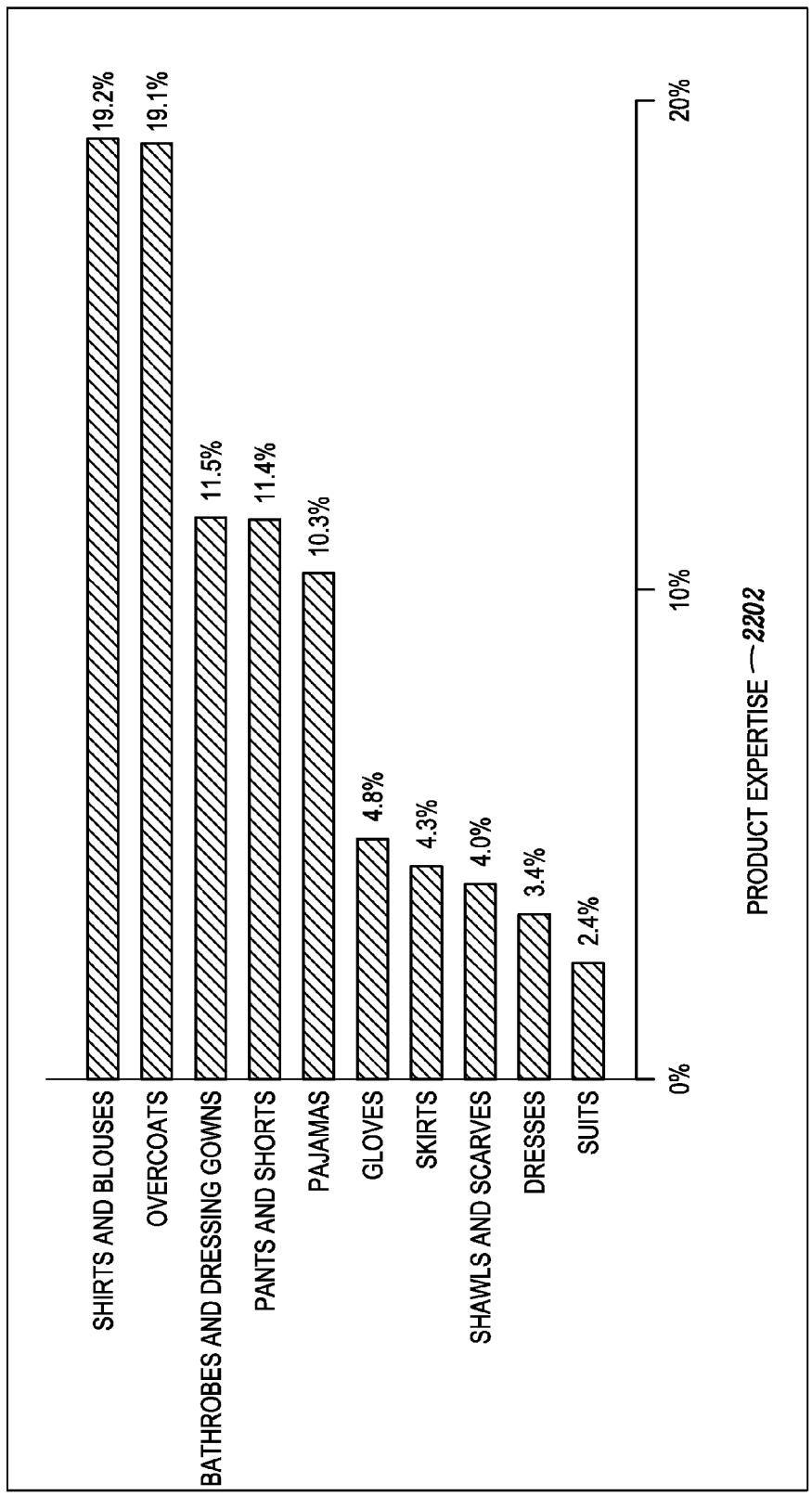

FIGS. 22A and 22B show a breakdown of supplier transaction experience for a selected time period, which may allow prospective buyers to draw inferences as to what areas of experience are deepest for the supplier. The breakdown may include product expertise 2202 of the supplier, technical expertise 2208 of the supplier, and material expertise 2204 of the supplier. The product expertise 2202 may further include the percentage distribution for a number of products; in an example, shirts and blouses, gloves, skirts, and the like. The technical expertise 2208 may include the percentage distribution of the technology applied and used by the supplier; in an example, non knitting and knitting of the material. The material expertise 2204 may include the percentage distribution of the material used for the synthesis of a plurality of products; in an example, silk, cotton, etc.

Figure 23:
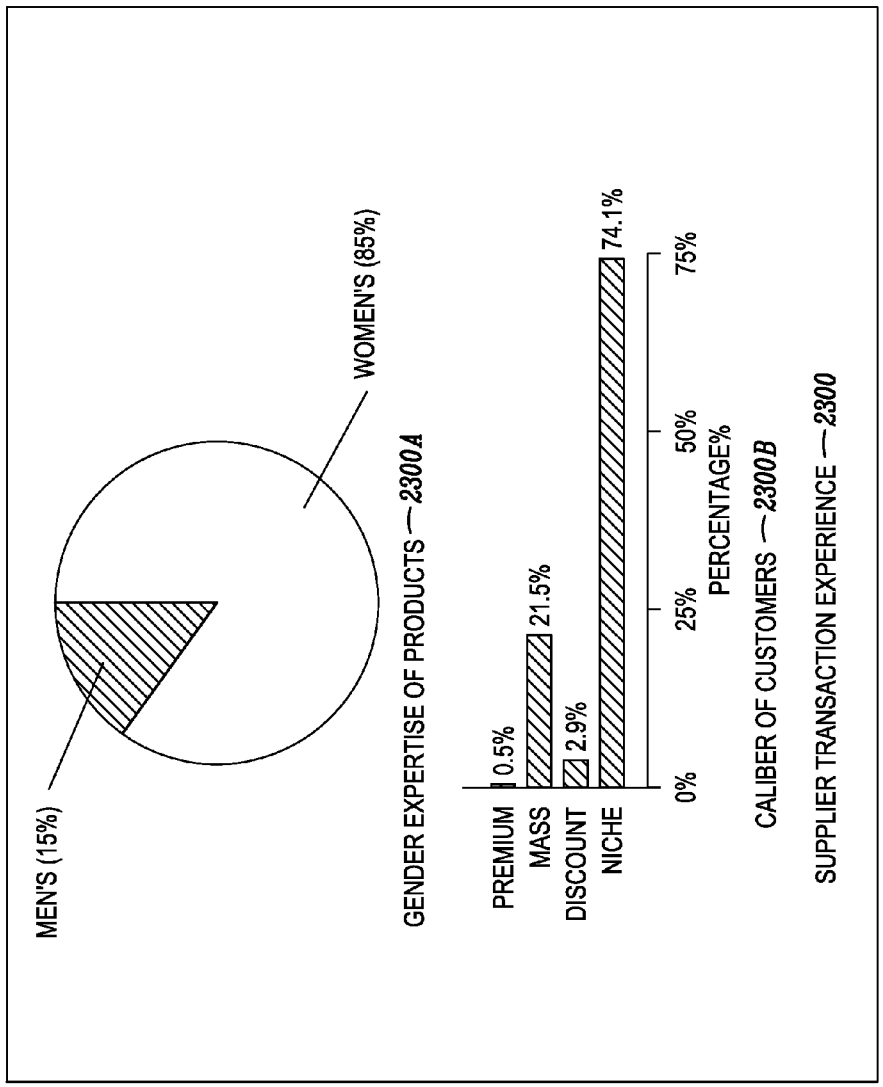
FIG. 23 shows a breakdown of supplier transaction experience according to selected factors.

FIG. 23 shows a report 2300 presenting a breakdown of supplier transaction experience according to selected factors, including a gender chart 2300A, and a customer caliber chart 2300B. These charts may be based on a variety of supply factors including product, material, technique, shipment history, estimated minimum shipment size, average shipment size, and the like. Report 2300 may allow the buyer to assess whether and to what extent the supplier is likely to have expertise applicable to the buyer's position in the marketplace.

Figure 24:
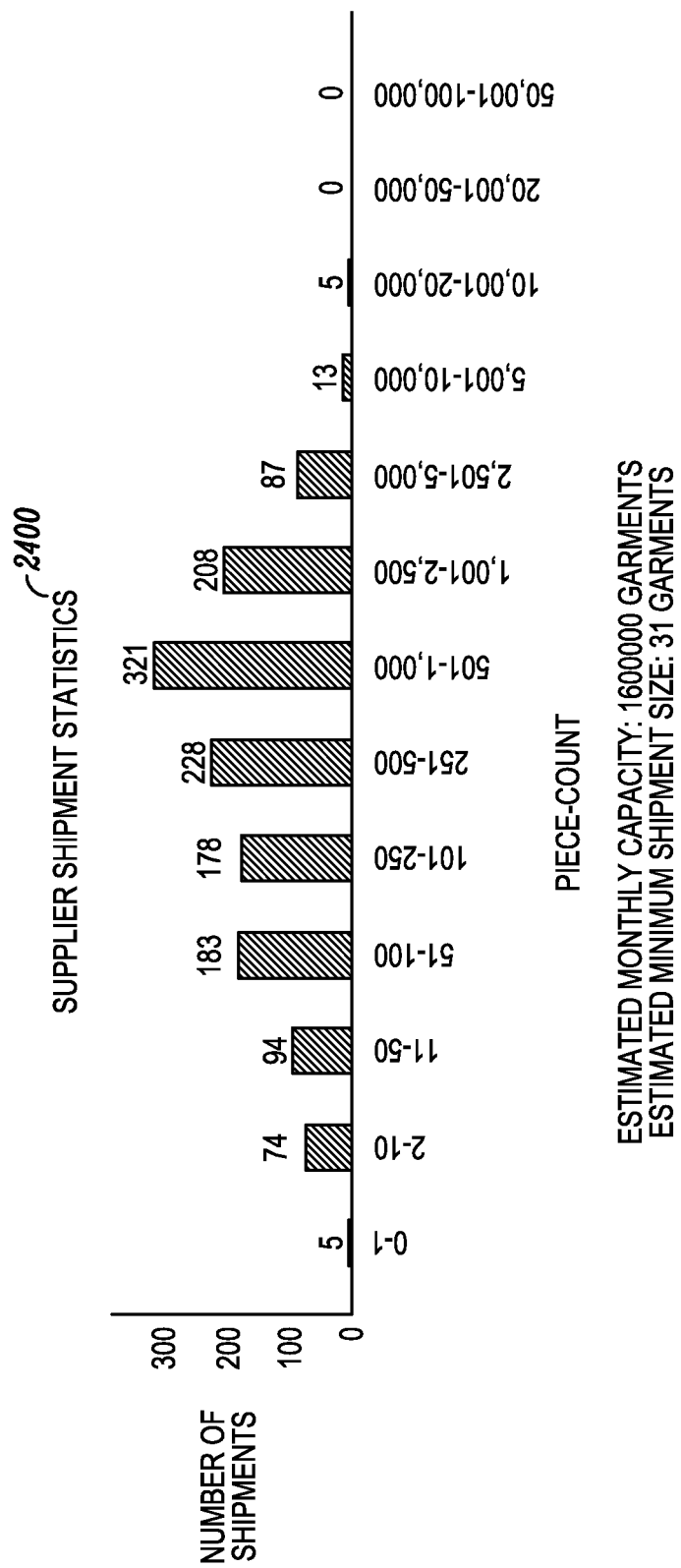
FIG. 24 shows a breakdown of shipment history broken down by piece count.
Figure 25A:
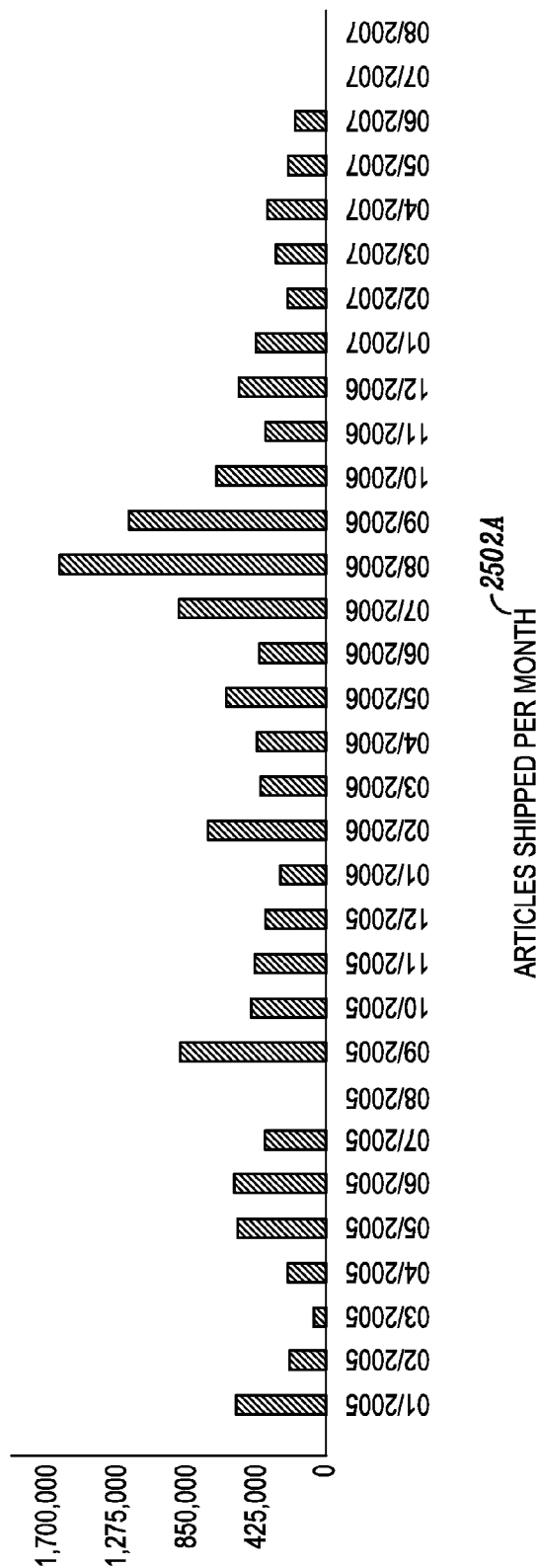
FIGS. 25A and 25B show a breakdown of shipment history broken down by month.
Figure 25B:
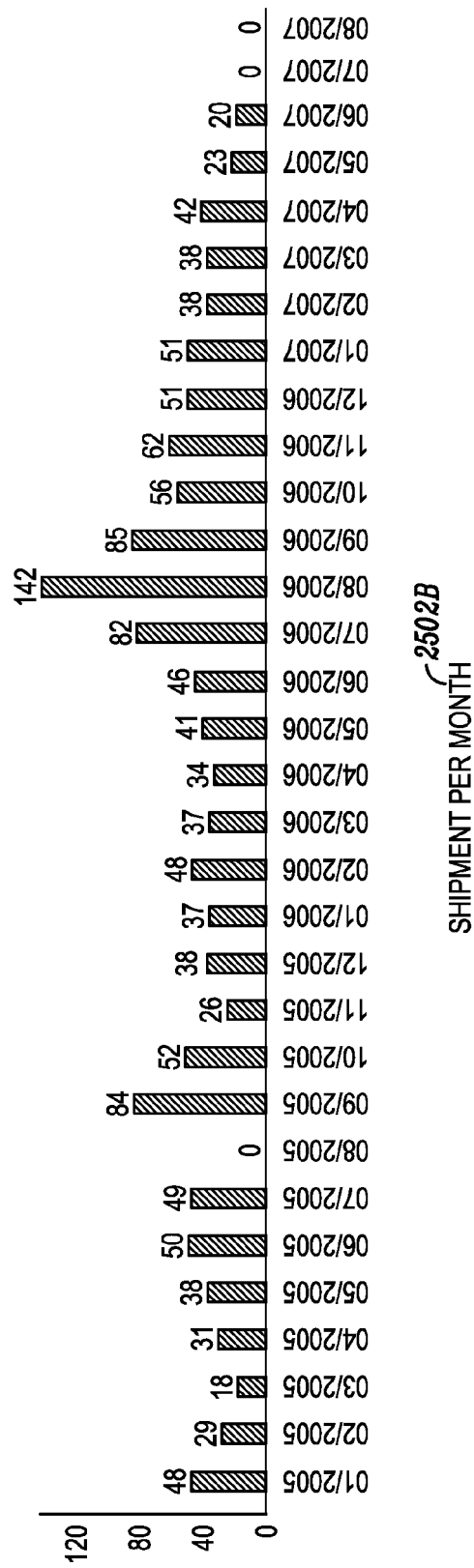

FIGS. 24 and 25A-B show a breakdown of supplier shipment history, where shipment history may be broken down by piece count, by month, by month to a certain country, and the like. FIG. 24 depicts a breakdown of shipment history as a piece-count chart 2400. FIGS. 25A-B break down shipment history into a monthly article chart 2502A and a monthly shipment count chart 2502B. In embodiments, the product may include shipment history graphs which show trends and volumes of shipments (quantified in terms of shipping containers) made over some period of time. Embodiments may also show the number of articles, garments, pieces, or, generally, entities, of the shipped product shipped over time based on algorithms that take into account the weight of the container and the assumed weight of each individual entities inside the container. Embodiments may also include a characterization of how large a supplier's shipments tend to be in terms of number of entities per shipping container. Such a characterization may allow a further characterization of whether a supplier may be able to fulfill small orders, if they will be willing to fulfill large orders, and the like. Embodiments may also include estimates of a supplier's monthly capacity and their smallest shipment size.

Figure 26:
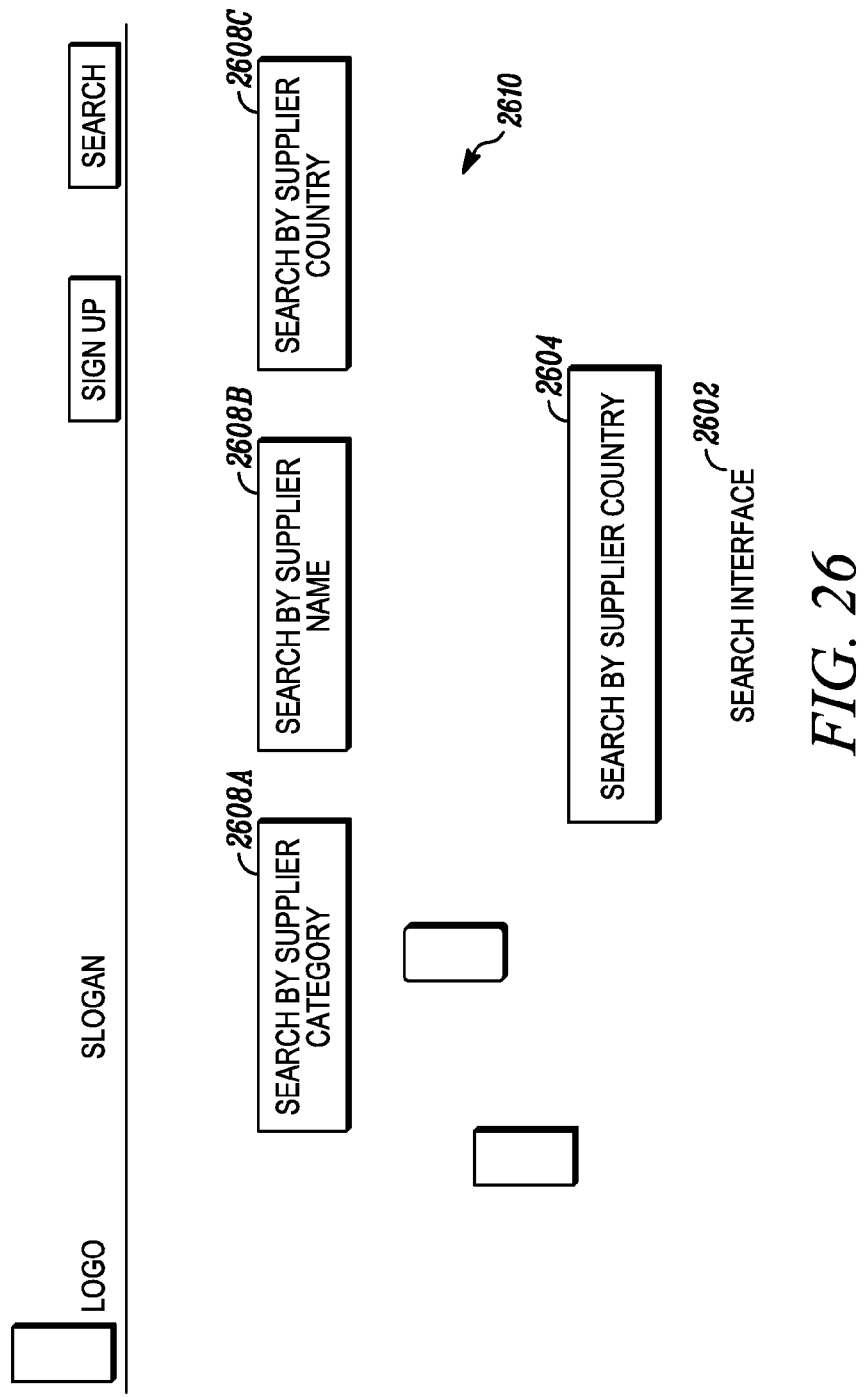
FIG. 26 shows a search window for searching by country.

FIG. 26 shows a user interface through which users may search for suppliers. The supplier search interface 2602 may allow a user to search for suppliers based on category 2608A, name 2608B, and country 2608C. In FIG. 26, a user has selected to search for a supplier based on the supplier's country 2608C. A user may enter text in the text entry box 2610 that may be useful in determining a country and then the user may select search control 2604 to search for suppliers within a country that may be determined from the text input into box 2610.

Figure 27:
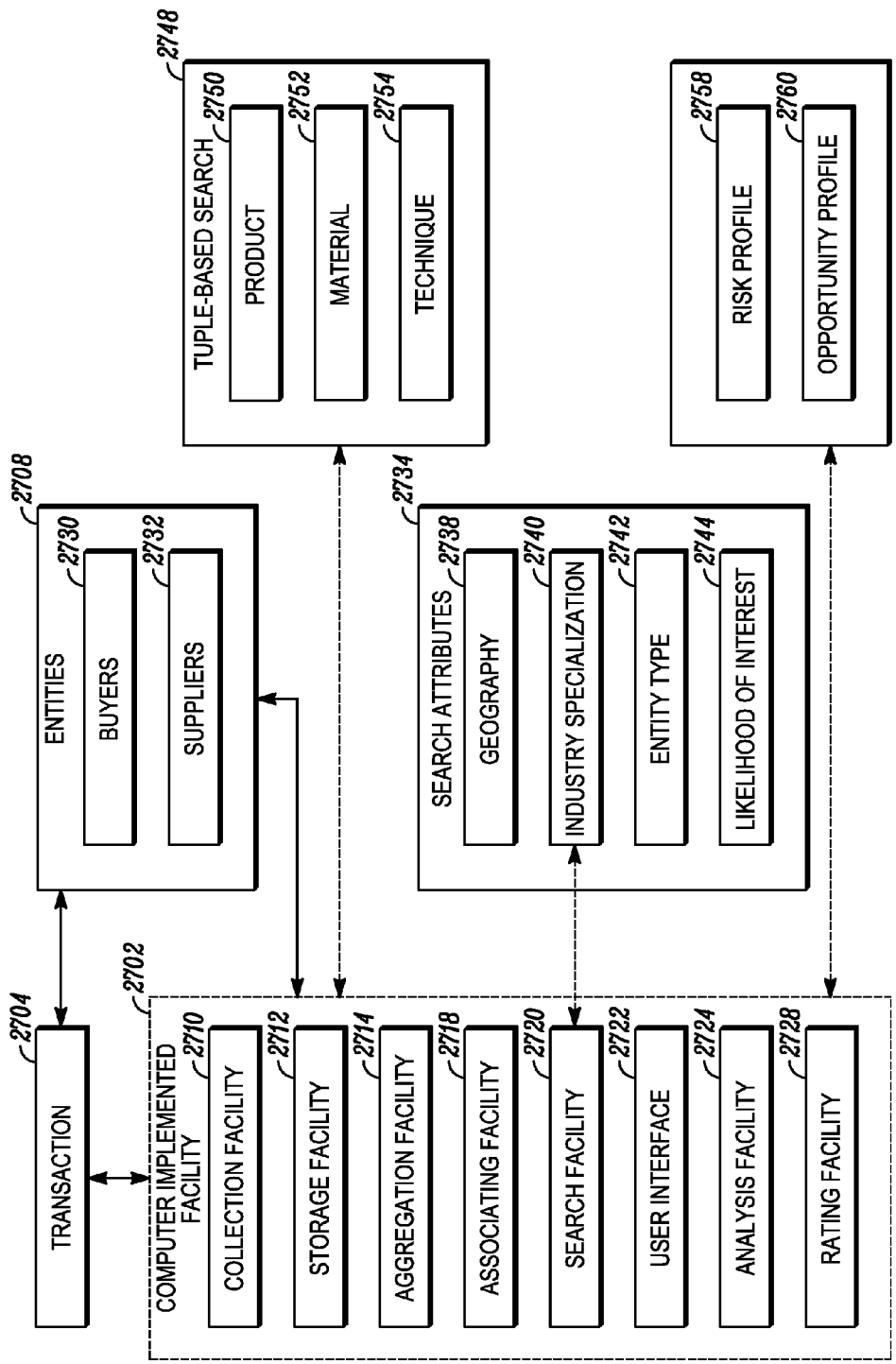
FIG. 27 depicts an aggregation search user interface.

Referring to FIG. 27, the search may also be conducted to obtain information regarding the various entities 2708 such as suppliers 2732 and buyers 2730. The computer implemented facility 2702 may collect and store a plurality of public records of transactions 2704 among a plurality of buyers 2730 and suppliers 2732. The transactions 2704 may be aggregated and associated with the entities 2708 (suppliers and/or buyers). A user interface 2722 may be provided that may facilitate a user who may be searching for at least one of the entities 2708 and the information associated with the at least one of the entities 2708 from the aggregated transactions data. The user may be any person interested in retrieving the above information; the user may also be a supplier, a buyer, a third party, and the like. The examples of user interface 2722 may include a Graphical User Interface, Web-based User Interface, Touch Interface, and some other types of user interfaces.

In an embodiment, the user interface 2722 may facilitate a tuple-based search 2748. The tuple-based search 2748 relates to a capability of searching for entities 2708 related to a specific parameter. Such parameter may relate to a product 2750, a material 2752, and/or a technique 2754. In an example, a supplier 51 may like to conduct a search for buyers available in the United States for 'Aluminum based packaging sheets formed by extrusion.'

In accordance with an embodiment of the present invention, the search results obtained from the above described searches for the entities 2708 may also be ranked. In an embodiment, the ranking may be based on a supplier rating.

In an embodiment, the rating may be based on the context of a party, the business legitimacy of a party, an assessment based on the trading environment of a country, macroeconomic information, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, certifications with respect to specific vendor standards, risk profile 2758, opportunity profile 2760, and some other types of factors and parameters.

Referring to the above example again, upon searching, a supplier 2732 may obtain a list of buyers 2730, which may be interested in buying 'Aluminum based packaging sheets formed by extrusion'. In addition, the supplier may like to ascertain the best buyers. For this purpose, the supplier 2732 may also obtain a ranking of the buyers 2730 based on selected parameters such as feedback reports, risk associated with each buyer, geographical location, and some other type of parameter. The rating may be in the form of a value, integer, percentage, and some other forms of ratings. Based on this rating, a ranking may be provided to each of the buyers 2730. This ranking may in turn facilitate the supplier 2732 in making the judgment regarding the appropriate buyer. Risk may be related to counterfeiting, capacity, subcontracting, political factor, geographic factor, weather factor, geology factor, financial risk, probability of non-performance of a contract, probability of termination of a contract, intellectual property, targeted delivery date, transactional customs data for a party other than the supplier and/or buyer, likelihood that a buyer will move to an alternative supplier, non-payment and some other types of risk factors.

An opportunity profile 2760 may be an assessment of the potential for new business opportunities determined from customs transaction data. By analyzing transactions in customs data, buyers and suppliers can identify potential business opportunities such as to establish a new relationship, reduce costs, increase availability, and the like. While companies guard much of their internal information related to costs and profit, the transaction information available in public customs records can provide great insight into ongoing buy and sell activity. In an example of opportunity profile 2760 assessment, a buyer may decide there is an opportunity to push a supplier harder to reduce a price. The buyer may be able to determine that the supplier has made fewer sales (e.g. as evidenced by lower shipment quantities in customs transaction records) over time. One potential reason for this is that a competitor of the supplier is offering a lower price. Therefore the supplier may need to reduce price to remain competitive. 27ikewise the supplier can review the same records and determine that the competitor is selling at a lower price under certain conditions, so the supplier can device a counter pricing strategy accordingly. In another example, a supplier may spot an opportunity to sell additional types of products to an existing buyer by examining the transactions of the buyer. The supplier may determine that the buyer is purchasing a type of product from a competitor that the supplier also offers but is not currently selling to the buyer. The supplier could provide the buyer with the opportunity to potentially improve the buyer costs by ordering the product from the supplier rather than the competitor. Factors such as combined volume pricing, reduced accounting overhead, lower shipping costs and the like may be key benefits that the supplier can use to entice the buyer.

Likewise the platform or an operator of the platform may use the customs transactional data to identify and suggest opportunities to buyers and/or suppliers. The transactional data may be analyzed for factors that indicate the potential for an opportunity and the opportunity may be prepared as an offer to one or more of buyers, suppliers, and the like. Opportunities may include availability of pricing leverage for a buyer with respect to a supplier; consolidation of orders with a supplier, pricing leverage for a supplier with respect to a buyer, increasing a share of a buyer's total spending for a supplier, and the like.

A risk profile 2758 may be determined based on analysis of customs transaction data. A risk profile for a supplier or a buyer may be based on customs transaction data for the supplier, the buyer, or a third party. A risk profile that may be determined from customs transactional data may include risk related to counterfeiting, capacity overload, subcontracting, political factors, geographic factors, weather, geology, finances, probability of non-performance to a contract, probability of termination of a contract, intellectual property, achieving a targeted delivery date, non-payment, selecting an alternate supplier, order cancellation, order push-out, and the like. A risk profile that may be derived from customs transaction data may be a basis for determining terms and conditions of insurance, and the like.

The above description disclosed that the search interface may be utilized for searching entities 2708 based on the aggregated transactional data. In an embodiment, the suppliers 2732 may also be searched based on the region of interest (geography) 2738, industry specialization 2740, customers (entity types) 2742, and the interest displayed in forming relationship (likelihood of interest) 2744. This may be explained in detail in conjunction with FIG. 27.

Referring to FIG. 27 again, the computer implemented facility 2702 may collect and store the public transaction records 2704 and associate these transactions with the entities 2708. A search facility 2720 may search for an entity based on a particular search attribute 2734. The search attribute 2734 may be a type of entity 2742, geographic region 2738, industry specialization 2740, and likelihood of interest in a transaction with the user or the search 2744.

In embodiments, the search facility 2720 may be adapted to be used by a buyer for searching a supplier. Alternately, the search facility may also be adapted to be used by a supplier for searching a buyer.

In an example, a buyer 2730 may like to search for suppliers (in US) of 'automotive machine parts' that may be willing to do business with a small offshore firm outside United States. Therefore, in the above scenario the likelihood of interest that the suppliers may display may be based on the location and size of the firm.

In embodiments, methods and systems disclosed herein may include an interface by which buyers may search for suppliers, as disclosed above. The search interface may allow buyers to query a database of supplier information organized in a hierarchy according to product categories, in order to find suppliers who provide products in a selected category. A buyer may then select particular suppliers and obtain an online profile or report, as described throughout this disclosure, as to attributes of a particular supplier. In embodiments, the search interface allows the buyer to search by product category, material used to make the product, or technique used to make the product, among other attributes. Filtering tools may be provided in the interface to allow the buyer to sort data by product type, material, technique, caliber of customer, or other attributes, to expand or group data, to drill down into particular categories or sub-categories, and the like.

In embodiments, the database of supplier information includes an ontology of product categories, which may include a tree of categories and sub-categories of all types of products found in various data sources, such as customs records databases.

In embodiments, filters may be enabled, allowing a buyer to search along dimensions of the data. In an example, if a buyer wishes to search for suppliers who work with a particular material, a filtering algorithm may take the union of all materials used by suppliers and present those materials as filters by which a set of suppliers may be selected by buyers for further analysis. The filters may be presented in a graph or tree structure, so that a user may check a box to expand or contract a particular portion of the tree, thereby allowing filtering by sub-category down to the leaf node in a tree. In embodiments, data are represented in tuples and results for a particular filter are ordered, such as by overall rating of the supplier. Results for a particular filter may also be ordered by other features, such as most specialized and the like.

Filters may include construction techniques, dyeing, washing and embellishing techniques, gender of the product, company type, country of supplier, and the like. When data are represented in tuples, all products a supplier has made may be represented by material, sub-material, and technique (e.g., cotton—poplin—-knitted sweater). In an example, when a search is conducted for a cotton poplin sweater, the suppliers who have made cotton poplin sweaters can be retrieved (not the union of ones who have made cotton or poplin sweaters in this example). The tuple concept applies to children of each concept in a hierarchy, so if the user selects cotton, the user will receive results for cotton and all children of cotton in the materials hierarchy.

In embodiments, the search interface may include a non-tuple-based search mode in which suppliers would be suggested as possible matches for the user's query that would be the union of the search terms. In an example, if a supplier has worked with silk, and has produced pants, the system predicts that this supplier could make silk pants.

In embodiments, a user interface may include paid or sponsored links in addition to search results derived from the rating platform described herein.

In embodiments, methods and systems disclosed herein may include private and public versions of reports, where a searcher can get to a public profile by an Internet site but requires some additional relationship (possibly involving payment) in order to drill down to receive more information, such as a complete profile of a supplier.

In embodiments, various icons, filters, sliders or other techniques may be provided in a user interface to allow a user to explore information about a supplier. In embodiments, a user can click for "details," thereby pulling up a ranking a supplier has for a given dimension, with information about the data source and a reminder of the purpose of that dimension. In embodiments, icons may show if a score is high, medium or low, thereby bucketing suppliers into general categories. In embodiments, filters or sliders may allow users to refine results, such as to show suppliers only if the product in question represents at least a minimum percentage of that supplier's product mix.

In embodiments, an interface may be provided for rating a supplier, such as on dimensions including an overall rating, product quality, customer service, timeliness, English language capability, sample-making ability, respect for intellectual property, and the like. Buyer ratings may be averaged or otherwise normalized and reported as part of a supplier's overall rating 110. In embodiments, transactional data may be used to ensure that a transaction occurred (to keep ratings unpolluted). If a buyer rating is good, this can give a significant boost to an overall rating 110.

In embodiments, buyers could specify which dimensions are most important to them, and the overall rating 110 could be customized and weighted according to the buyer's preferences.

In embodiments, suppliers may be suggested to buyers based on the types of qualities the buyer seems to appreciate, and the types of products the buyer has produced in the past.

Figure 28:
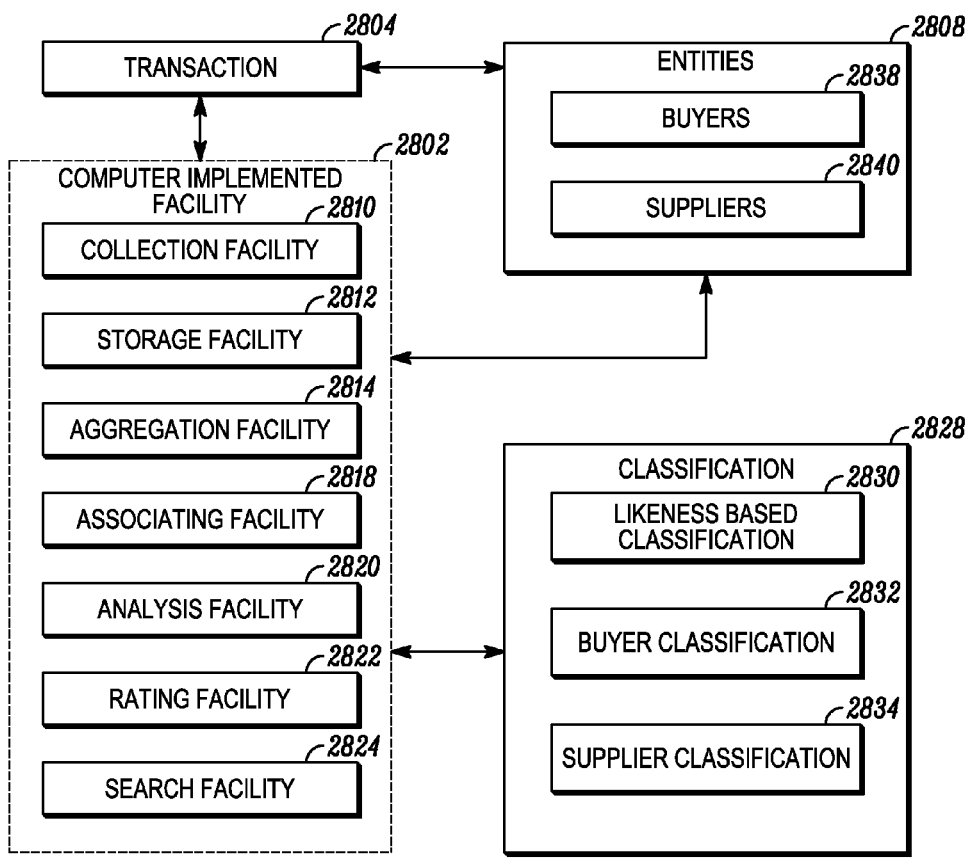
FIG. 28 depicts using public transactions for merging records.

The capability to identify and classify various buyers and suppliers as 'friends' or the like may also be facilitated by using public transaction records 2804, as shown in FIG. 28. The examples of public records may be government registration records, evidences of business legitimacy, custom records, data sheets and reports for work order, audit records, bank records and some other types of public records depicting various transactions. This may in turn help both the buyers and the suppliers to identify similar buyers and suppliers, and in turn help them make decisions regarding collaborations, competition, and some other types of strategic positioning.

Referring to FIG. 28, a computer implemented facility 2802 may be used to collect and store public records of transactions 2804. The public records may be government registration records, evidences of business legitimacy, custom records, data sheets and reports for work order, audit records, bank records and some other types of public records depicting various transactions. The transaction records 2804 may be associated with various entities (such as corporations, items, buyers, suppliers, third parties, etc.) and may generate information that may be aggregated transaction information (transactions associated with said entities). An analysis may be performed for classification 2828 of entities 2808. The classification 2828 may be a likeness based classification 2830. The likeness based classification 2830 may indicate that the suppliers, buyers and the third parties may be classified according to the type, or degree of likeness, types of qualities appreciated, past experience or some other characterization parameter. It may be noted that the classification may be conducted to classify at least one of a supplier and a buyer according to any one of the characterization parameters.

In embodiments, a buyer may identify like (similar) buyers. Similarly, a supplier may identify similar suppliers.

In other embodiments, a supplier may identify buyers like those of the supplier. A buyer may also identify suppliers like those of the buyer.

In embodiments, a buyer may identify suppliers of a specified type. Further a supplier may identify buyers of a specified type.

In embodiments, a buyer may identify suppliers most likely to prefer a particular buyer. Similarly, a supplier may identify buyers that would prefer a specific supplier.

In embodiments, the public records of transactions 2804 may also be used for classification of buyers 2838. This has been explained in conjunction with FIG. 28. The public records of transactions 2804 stored in the computer implemented facility 2802 may store transaction records 2804 relating to various suppliers 2840 and buyers 2838. The information associated with the public records of transactions 2804 in relation to various entities 2808 may be further analyzed. Based on the analysis, buyer classification 2832 may be performed to classify various entities identified in the transactions into buyers' category. It may be appreciated that the above described process and the system may also be used for classification of various entities into suppliers' category (supplier classification 2834).

In embodiments, an interface may include a capability for buyers to network, chat or otherwise interact with each other with respect to suppliers. Such a network may include a capability of identifying other buyers as "friends" or the like, thereby allowing sharing of information only among trusted parties. In such a case, information about suppliers for particular buyers might be automatically populated, simplifying the sharing of information about experiences with particular suppliers used by a network of buyers.

In embodiments, analyses could be used to assess and/or identify credit worthiness of suppliers or buyers.

In embodiments, ratings could be embedded into other media such as other websites, emails, print media, and the like. Such embeddings could be a result of calls to an Application Programming Interface (API), or other methods.

In embodiments, ratings may be grouped into buckets, such as "excellent," "good," "fair," "poor," and "not trade worthy." Various methods may be used to group suppliers into such buckets. In an example, "excellent" ratings may be given to suppliers who have business legitimacy and are in the top quartile in both loyalty and experience, "good" ratings may be given to suppliers who have business legitimacy and are in the top half in both loyalty and experience, "fair" ratings may be given to suppliers who have business legitimacy and are in the top half in either loyalty or experience, "poor" ratings may be given to other suppliers who have business legitimacy, and "not trade worthy" ratings may be given to suppliers who do not have indicia of business legitimacy.

In embodiments, methods and systems disclosed herein may assist suppliers in generating leads among buyers for opportunities to supply products. Information about how to improve ratings may be used to assist suppliers in generating high quality leads.

The methods and systems of the platform may facilitate identifying a supplier of an item type that is disclosed in a transaction record even if the supplier is not a party to the transaction. Identifying a supplier of an item, or a type of item may benefit buyers, suppliers, and the like by identifying potential new relationships between buyers and suppliers. A buyer may use the resulting supplier identification and other information in transaction records, such as declared customs value, to compare a current supplier cost with a different supplier cost for the same item. A buyer or a potential buyer may use at least transaction cost and delivery information to identify suppliers from which the buyer may request a quote for supplying the item. Suppliers may identify buyers of products that the supplier also provides. This may lead to efficient marketing and sales activity for the supplier because the supplier would know that buyer has a significant interest in the item being purchased. By examining other information in the transaction, such as buyer behavior, transaction history and the like, the supplier may identify an offer profile of the buyer and present a very well targeted offer to the buyer.

Figure 29:
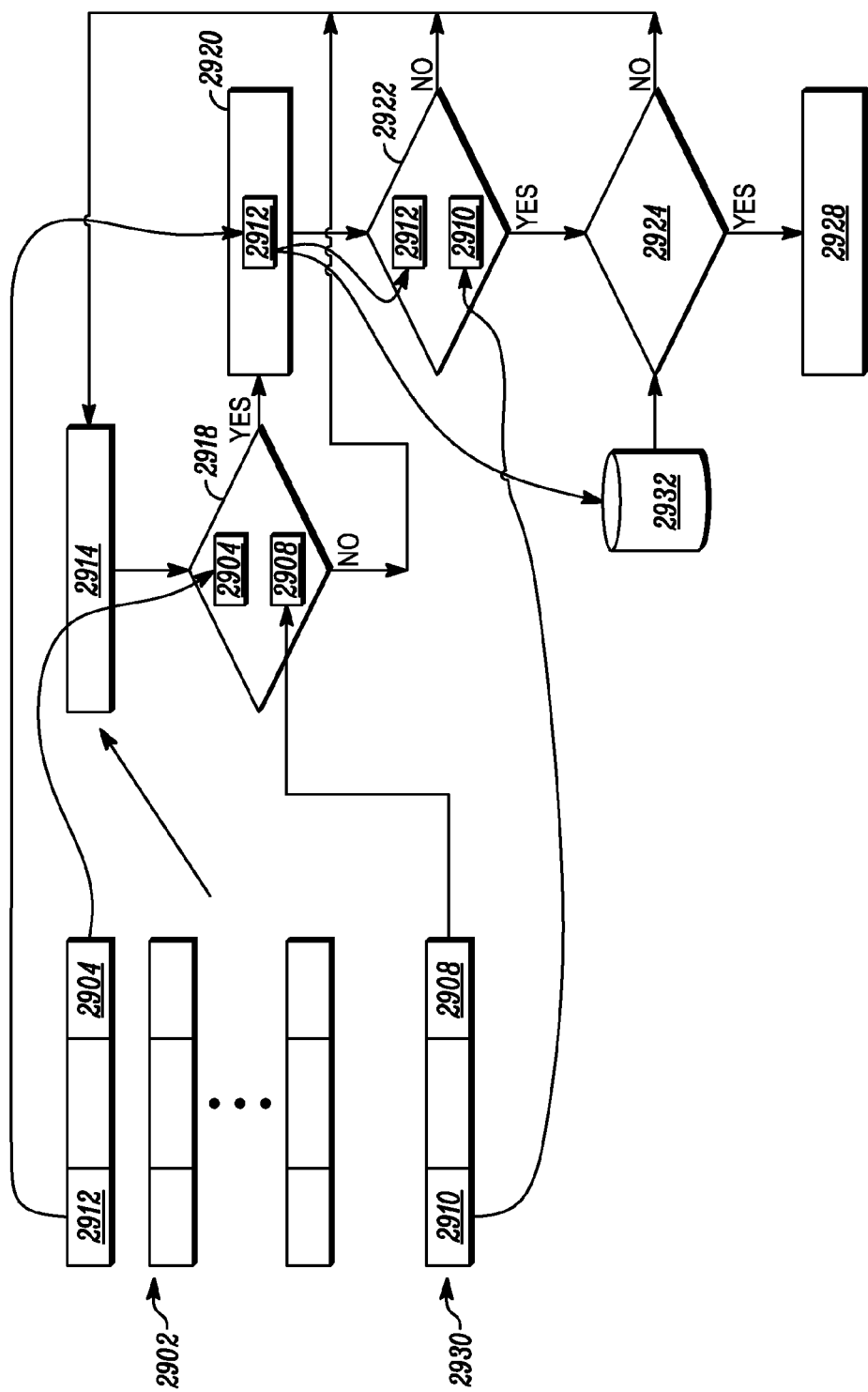
FIG. 29 depicts classification of buyers from public records.

FIG. 29 depicts a process for gaining these advantages from the methods and systems herein. The process depicted supports identifying a supplier of an item in a first transaction record by comparing the item in the first record to a second record. When a match is found, the supplier identified in the second record may be determined to supply the item. After other conditions are met, such as country preference, supplier restrictions, and the like the supplier can be reported. The process can be repeated for any number of second transactions. The process could be performed in a similar way for determining a buyer of an item. In particular, a plurality of transaction records 2902 may be collected and presented to the process 2914. A reference record 2930 that includes a reference product identifier 2908 or even just a product identifier 2908 can also be an input to the process. After retrieving one of the pluralities of transaction records 2902 through the retrieval step 2914, the product identifier 2904 of the retrieved transaction record is compared in step 2918 to the reference identifier 2908. If there is a sufficient match between the two product identifiers 2904 and 2908, the supplier identity 2912 is captured from the retrieved transaction record in step 2920. If the supplier in the retrieved transaction record 2912 is determined in step 2922 to be different than the reference supplier 2910, additional conditions, such as the supplier location and the like may be evaluated in step 2924 by looking at the retrieved transaction record and other data 2932 associated with supplier 2912 that may be available to the platform. If the other conditions are not met in step 2924, additional transaction records may be retrieved in step 2914. The process may be repeated any number of times based on various parameters that can be used to control the process, such as a number of potential suppliers to identify, a number of records to retrieve, a number of transaction records that are available, and the like. In the embodiment of FIG. 29, elements 2912 and 2910 could represent a buyer instead of a supplier. Also in step 2922, a desirable outcome may be a match between 2912 and 2910. These and other variations in the process of FIG. 29 that facilitate matching buyers or suppliers with an item or product type are included herein.

In accordance with an embodiment of the present invention, the information from the aggregated transactions may also be utilized for supplier assessment. Supplier assessment may involve determining if a specific buyer has ceased business operations with a supplier. Such a determination may be based on a cycle time between shipments which may be based on historical shipment data derived from transaction records. A calculation of cycle time of shipments for an item from a supplier to a buyer may indicate an approximate date of a next shipment. If a transaction record reflecting the next shipment does not show up in the transaction records within some period of time beyond the indicated next shipment date, the methods and systems may indicate that the buyer may have stopped business operations with the supplier. The nature of the stoppage may be further determined if transaction records indicate that the buyer has begun receiving shipments of the item from a different supplier. Cycle time calculations may also be used to evaluate a supplier's delivery performance. Significant increases in cycle time may indicate delay of shipment by the supplier. An assessment of supplier-buyer transaction status may also include factoring in buyer inventory. Buyer inventory may be factored in as a prediction or estimate of inventory.

In an embodiment of the present invention, methods and systems may be provided for rating an entity based on rolled up customs data. Rolled up customs data may include aggregated, cumulative, summary, or similar methods of combining a series of transactions into roll-up data. Rolled-up data may include a total of shipments over a period of time for a buyer-seller-product association. Rolled-up data may include total shipments over a period of time for product-shipper association. Any and all types of consolidation of transaction data that may be based on a time interval, a frequency, a region, an industry, a product, a supplier, a buyer, a shipper, a source region, an exchange rate, and the like are herein included. In an example, rolled-up transaction data may include a supplier's total output in each product category over a calendar month. In another example a country may report a total export of a product during a week. In both cases critical transaction information that may be missing may be estimated or predicted in order to develop otherwise useful information from the rolled-up information. The computer implemented facility 2902 may collect and store the rolled-up public records of transactions 2904 and aggregate them to form aggregated transactions.

In an embodiment, the transaction records may relate to the shipment transactions.

Further, the aggregated transaction records may be associated with a particular supplier. This associated information may be analyzed to determine and convey the rating for the supplier.

It may be appreciated that this procedure may be conducted periodically (In an example, every three months). In another embodiment, the change in rating of a specific supplier may be presented as an alert.

In an example, the embodiments described above may be utilized by a company dealing in an improved form of pesticide that may wish to determine the ratings of a specific supplier of raw materials situated in a different country. Therefore, the aggregated and associated shipment transaction information (regarding the shipment time, schedule, price and delivery) for the supplier may be used to determine its rating among a plurality of similar suppliers. Subsequently, this rating may be instrumental in helping the above company make supply related business decisions.

Figure 30:
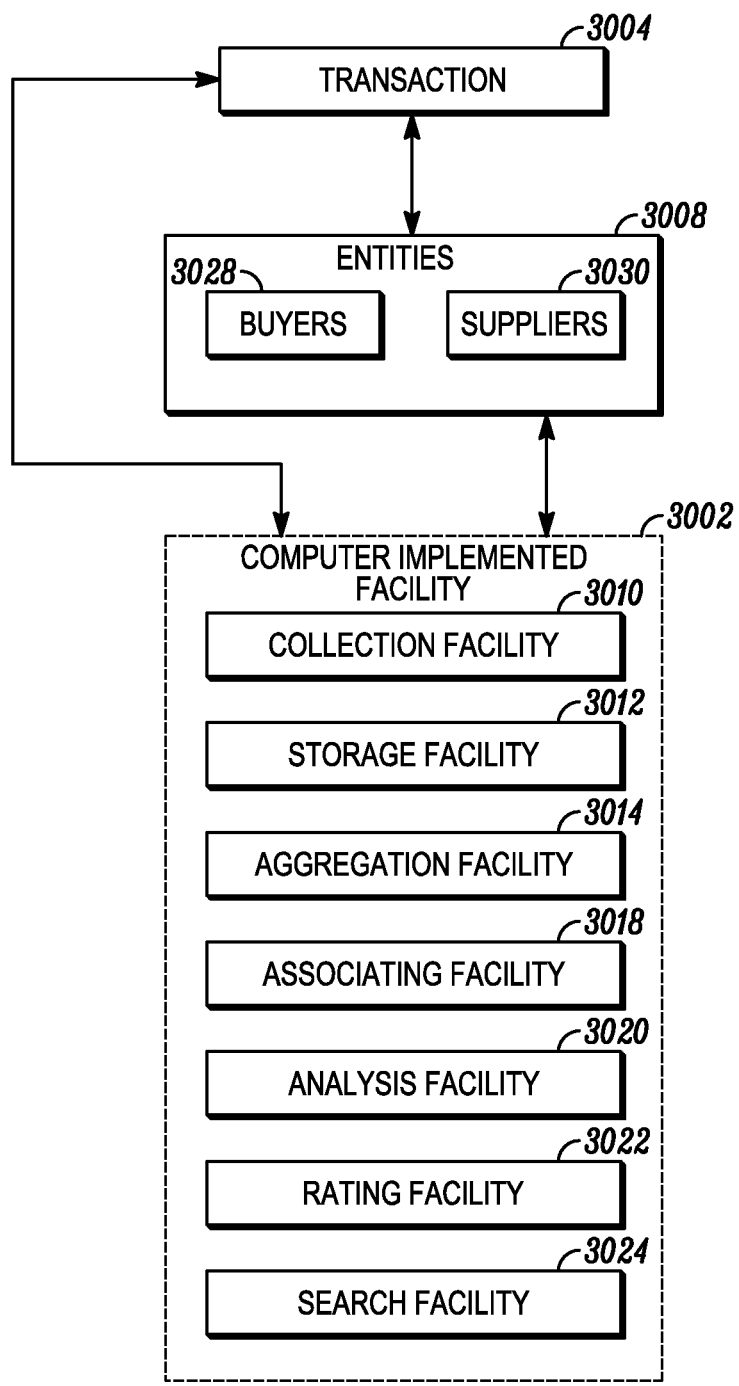
FIG. 30 depicts predicting minimum order requirements.

The public records of transactions may also be utilized for predicting minimum order requirements for a factory. Referring to FIG. 30, the computer implemented facility 3002 may collect a plurality of public transaction records 3004. The collection step may be performed by a collection facility 3010. The collected records may be stored by a storage facility 3012. Upon collection and storage the plurality of public transaction records 3004 may be aggregated by the aggregation facility 3014 and associated with various entities 3008.

In an embodiment, the entity may be a factory.

In another embodiment, the entity may be a supplier.

In yet another embodiment, the entity may also be a subsidiary of a supplier.

In an example, information regarding the public transaction records 3004 such as transaction receipts for a candle supplier selling a batch of factory-made candlesticks from a candle manufacturer may be aggregated and associated by the computer implemented facility 3002. The analysis facility 3020 may perform detailed analysis of this information to generate various types of results. In an embodiment, the analysis facility 3020 may predict the minimum order requirement for an entity, based on the analysis of the transactions. As described in the above example, the analysis facility 3020 may predict the number of batches that the candle manufacturer may need to sell in order to cross the minimum profit mark. In another example, the analysis facility 3020 may predict the minimum number of candlestick batches that may need to be supplied to a third party in order to fulfill the required terms laid down in a mutual contract. In yet another scenario, the analysis facility 3020 may also facilitate predicting the minimum order requirements that a subsidiary of a supplier may need to supply among the batch of suppliers.

In embodiments, methods and systems are disclosed herein for using disparate data sources, including transactional records, such as from customs transactions, as a basis for rating suppliers of products. In embodiments, transactional data from actual transactions are used to generate experience ratings, specialization ratings, customer loyalty ratings, or other ratings.

In embodiments, a rating system is provided in which buyers rate suppliers of products, wherein transactional data, such as from customs records, are used to verify the legitimacy of the feedback, such as to verify that a rated transaction actually occurred.

In embodiments, methods and systems allow buyers to search for suppliers, including with filters based on product category, material or techniques offered or used by the suppliers, and to retrieve ratings information about the suppliers, including ratings derived from transactional data (such as customs data) or ratings derived from other buyers.

In embodiments, a platform for enabling searches for suppliers and ratings of suppliers may include various tools, such as tools for merging records, merging supplier names, and the like.

In embodiments, methods and systems disclosed herein may include a quote tool by which buyers may identify suppliers and then generate a request for a quote from selected suppliers.

In embodiments, algorithms may be used for determining a pricing leverage metric, such as based on transactional data, such as customs records. In an example, a supplier's pricing leverage may depend on the percentage of a supplier's shipments that are going to a single buyer, the proximity to a recent switch in supplier by one or more buyers, a supplier's overall score, a supplier's customer loyalty score, a supplier's experience in an area, and global factors, such as overall demand for a product offered by a supplier. Thus, an interface may allow buyers to assess pricing leverage based on calculations using one or more of these factors, normalized or weighted to provide an overall estimate or score as to pricing leverage of a supplier.

In embodiments, access to the database may be restricted by the capacity of a supplier, and the ability of a supplier to ship small quantities. For instance, large buyers may need access to the entire database, while smaller buyers may need special access to suppliers that specialize in smaller orders.

A user interface may include various alerts, such as an alert for when a new supplier satisfies a search criterion of a buyer.

Methods and systems disclosed herein may include methods for syndicating data, such as delivering overall scores, category ratings (e.g., "excellent," "good," "fair," or "poor") or the like, to third parties, such as for presentation in connection with other business data, such as data presented to securities analysts, data presented to buyers for other purposes, and the like. Users will be able to provide subjective ratings of suppliers on such third party presentations using an API.

In embodiments, methods and systems disclosed herein may include collaborative filtering techniques, such as to allow buyers to see information relevant to other buyers who share characteristics with the buyer (such as conducting similar searches, using similar suppliers, or having similar transaction records). Collaborative filtering may also allow suppliers to access information relevant to other suppliers with similar characteristics, such as ratings for suppliers to supply the same types of products, to the same types of buyers, and the like.

In embodiments, a buyer scorecard 200 may be provided that shows summary data for a supply chain of various suppliers, such as to indicate how the buyer's suppliers collectively compare to suppliers of other buyers, such as competitors of the buyer.

In embodiments, a supplier comparison tool may be used to compare suppliers on various attributes.

In embodiments, buyers may be rated on behalf of suppliers, such as based on loyalty to suppliers.

In embodiments, ratings of suppliers or buyers as described throughout this disclosure may be used for third parties, such as, in embodiments, financial analysts. In an example, an analyst could evaluate the quality of a company's supply chain based on collective supplier ratings. Similarly, an insurance company could use data about suppliers of a buyer to assess supply chain risk, such as for analyzing risk associated with insurance associated with activities of suppliers.

In embodiments, buyers may supply data to the platform described herein in order to assist with developing ratings, but that data may be maintained as proprietary to the buyer, such as to keep ratings generated based on that data private to the buyer.

In embodiments, information about suppliers may be syndicated to desk software tools, such as tools used by purchasing managers and buying staff within buyer organizations. Thus, reports or ratings may be fed so that they appear within the interface of one or more other desktop or web-based tools used by such users.

In embodiments, methods and systems disclosed herein may include filtering tools for sorting data retrieved from customs records according to an industry hierarchy, such as a hierarchy of products, materials and techniques.

In embodiments, a search interface may allow for a search based on supplier capability, such as based on information retrieved from transactional data, such as customs records.

In embodiments, a data analytics platform may be provided for analyzing supplier capabilities, such as based at least in part on transactional data about supplier activities, such as transactional data from customs records.

In embodiments, a rating system may be based on a combination of customs data and other data, such as data based on an internal database of transactions made by an agent on behalf of buyers transacting with suppliers.

In embodiments, a platform may include a transactional facility, such as for allowing buyers to transact with suppliers that have been identified by the search and ratings facilities described herein. Such transactional facility may include modules related to ordering, pricing, payment, fulfillment, and the like.

Figure 31:
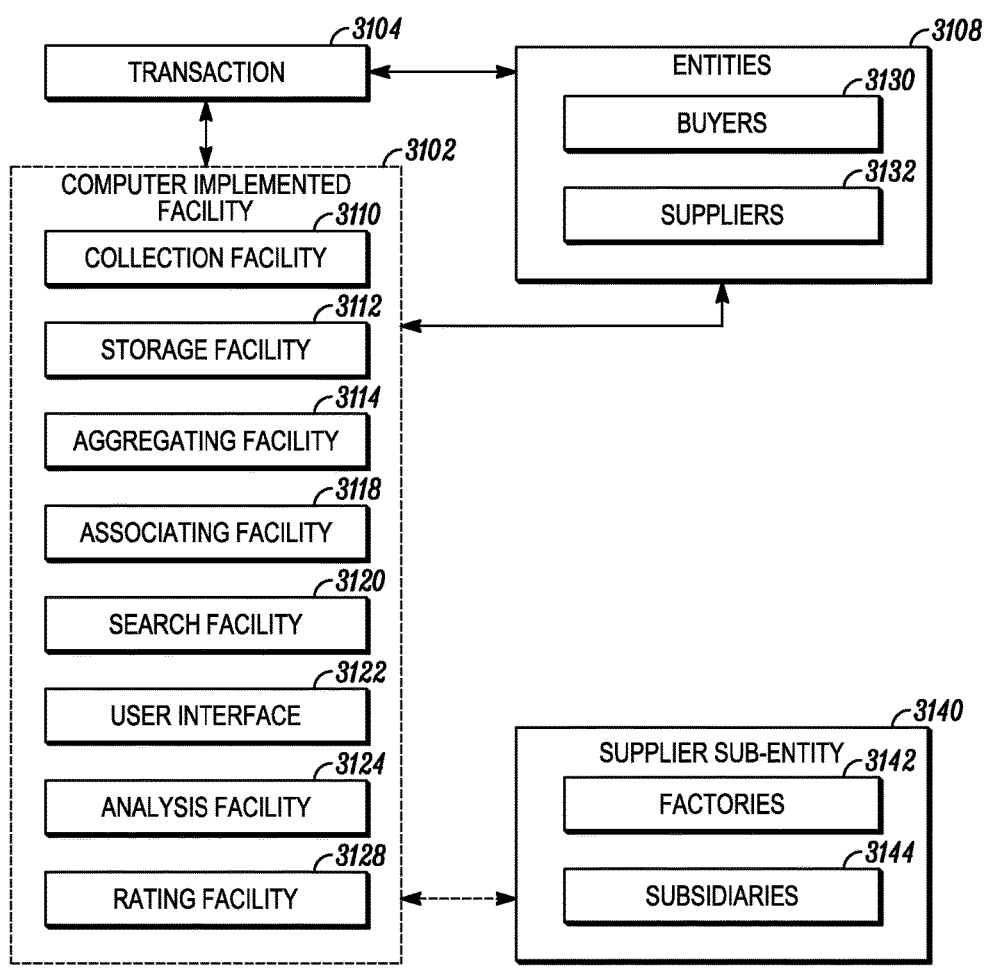
FIG. 31 depicts rating a sub-entity of a supplier.

Referring to FIG. 31, in accordance with the methods and systems described herein, the public records of transactions 3104 may be utilized for rating a sub-entity of a supplier 3108. The computer implemented facility 3102 may collect and store the public transaction records 3104 among the plurality of buyers 3130 and suppliers 3132. Upon aggregating and associating the transactions 3104 with the entities 3108 (such as buyers and suppliers), an analysis may be performed regarding the sub-entities of the suppliers 3132. Examples of sub-entities 3140 may include a factory, a group of factories 3142, subsidiaries 3144, and some other types of entities.

In an example, the aggregated transactions information may reveal a .list of twenty entities doing business in an uptown market. A searcher may utilize the methods and systems disclosed herein to determine a list of seven entities that may be sub-entities for a specific supplier 51. In accordance with the embodiments of the present invention, these seven entities may be rated based on the transactional data. The seven entities (say 2 factories, 3 subsidiaries, and 2 sales divisions) may be rated based on the timeliness of the delivery, feedback from the buyers, and so on.

In an embodiment, the analysis facility 3124 may determine the sub-entities 3140 for a supplier from the group of entities. The determination of sub-entities may be based on the analysis of the public transaction records 3104. In an embodiment, the public transaction records 3104 may be customs transaction records.

In another embodiment, the sub-entities 3140 of the supplier may be rated based on the analysis of the aggregated transactions and other information and parameters as explained throughout the disclosure.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law. All documents referenced herein are hereby incorporated by reference.

What is claimed is:

1. A method, comprising:

using a computer implemented facility to collect and store a plurality of public records of transactions among a plurality of buyers and a plurality of suppliers;

determining an inferred entity identifier for each of the plurality of records;

detecting groups of inferred entity identifiers that each connote a common entity, based on a similarity of data in the records associated with each of the inferred entity identifiers;

processing the groups of inferred entity identifiers with a computer searching algorithm, as a computer performance improving action, to remove records that are inferior candidates to be merged under a single entity, thereby obtaining filtered groups of inferred entity identifiers requiring reduced computing resources to be merged into a common entity record set relative to unfiltered groups of inferred entity identifiers;

for each filtered group of inferred entity identifiers, merging the records of the group into a common entity record set;

aggregating the transaction records for the common entity record set; and providing a user interface whereby a user may search for an entity and retrieve relevant information based at least in part on the aggregated transactions records.

2. The method of claim 1, wherein search results are ranked based on a supplier rating.

3. The method of claim 2, wherein the overall rating is based upon a country context of a party.

4. The method of claim 2, wherein the overall rating is based upon an assessment of a trading environment in a country.

5. The method of claim 2, wherein the overall rating is based upon feedback on timeliness of delivery.

6. The method of claim 2, wherein the overall rating is based upon feedback on language skills.

7. The method of claim 1, wherein inferior candidates to be merged under a single entity are identified for removal by the computer searching algorithm based on a ppercent clustering technique that employs a pair match threshold, wherein the inferior candidates do not satisfy a pair match threshold for a single entity.

8. A method, comprising:

using a computer implemented facility to collect and store a plurality of public records of transactions among a plurality of buyers and a plurality of suppliers;

determining an inferred entity identifier for each of the plurality of records;

detecting groups of inferred entity identifiers that each connote a common entity, based on a similarity of data in the records associated with each of the inferred entity identifiers;

processing the groups of inferred entity identifiers with a computer searching algorithm, as a computer performance improving action, to remove records that are inferior candidates to be merged under a single entity, thereby obtaining filtered groups of inferred entity identifiers requiring reduced computing resources to be merged into a common entity record set relative to unfiltered groups of inferred entity identifiers;

for each filtered group of inferred entity identifiers, merging the records of the group into a common entity record set;

aggregating the transaction records for the common entity record set; and providing a user interface whereby a user may search for an entity and retrieve information that is relevant to the entity based at least in part on the aggregated transactions records, wherein the relevant information is ranked based on an overall entity rating.

9. The method of claim 8, wherein inferior candidates to be merged under a single entity are identified for removal by the computer searching algorithm based on a ppercent clustering technique that employs a pair match threshold, wherein the inferior candidates do not satisfy a pair match threshold for a single entity.

* * * * *